US012759003B2

(12) United States Patent
Puck et al.

(10) Patent No.: US 12,759,003 B2
(45) Date of Patent: Oct. 13, 2026

(54) SELF-PROPELLED LIQUID DELIVERY VEHICLE

(71) Applicant: Puck Custom Enterprises, Inc., Manning, IA (US)

(72) Inventors: Jeremy Benjamin Puck, Manning, IA (US); Dylan Gerard Gross, Manning, IA (US); Todd Michael Muell, Manning, IA (US)

(73) Assignee: Puck Custom Enterprises, Inc., Manning, IA (US)

( * ) Notice: Subject to any disclaimer, the term of this patent is extended or adjusted under 35 U.S.C. 154(b) by 715 days.

(21) Appl. No.: 18/175,116

(22) Filed: Feb. 27, 2023

(65) Prior Publication Data

US 2023/0278056 A1 Sep. 7, 2023

Related U.S. Application Data

(60) Provisional application No. 63/315,716, filed on Mar. 2, 2022.

(51) Int. Cl.

| | |
|---|---|
| ***B05B 13/00*** | (2006.01) |
| ***A62C 27/00*** | (2006.01) |
| ***B05B 1/36*** | (2006.01) |
| ***B05B 13/02*** | (2006.01) |
| ***B25J 5/00*** | (2006.01) |

(Continued)

(52) U.S. Cl.

CPC .............. *B05B 13/005* (2013.01); *B05B 1/36* (2013.01); *B05B 13/02* (2013.01); *B25J 5/005* (2013.01); *B25J 13/006* (2013.01); *B60F 3/0015* (2013.01); *A62C 27/00* (2013.01)

(58) Field of Classification Search

CPC ......... B05B 13/005; B05B 13/02; B05B 1/36; B25J 13/006; B60F 3/0015; A62C 27/00

See application file for complete search history.

(56) References Cited

U.S. PATENT DOCUMENTS

| | | |
|---|---|---|
| 3,384,047 A | 5/1968 | Remley |
| 5,176,098 A | 1/1993 | Royle |

(Continued)

FOREIGN PATENT DOCUMENTS

| | | |
|---|---|---|
| WO | 2012039600 A1 | 3/2012 |

OTHER PUBLICATIONS

Amphibious Excavator, Eddy Pump, Jun. 27, 2018, 15 pages.
Amphibious Equipment, Waterking, Jun. 9, 2013, 3 pages.

*Primary Examiner* — Stephen P Avila
(74) *Attorney, Agent, or Firm* — Christopher A. Proskey; BrownWinick Law Firm

(57) ABSTRACT

In one or more arrangements, a self-propelled liquid delivery vehicle is presented which has a frame assembly, drive members (e.g. a pair of track assemblies), a power system, and a liquid delivery system. In one arrangement, the pair of track assemblies are configured to facilitate propulsion of the self-propelled liquid vehicle when on land. In one arrangement, the pair of track assemblies are configured to facilitate floating of the self-propelled liquid delivery vehicle when in a liquid. In one arrangement, the drive members (e.g. a pair of track assemblies) are configured to move between an extended position and a retracted position. In one arrangement, an extension assembly is configured to move the drive members between an extended position and a retracted position.

26 Claims, 54 Drawing Sheets

(51) Int. Cl.
*B25J 13/00* (2006.01)
*B60F 3/00* (2006.01)

(56) References Cited

U.S. PATENT DOCUMENTS

| | | | | |
|---|---|---|---|---|
| 5,755,226 | A | 5/1998 | Carim et al. | |
| 6,918,801 | B2 * | 7/2005 | Wilson, Jr. | B63B 35/38 440/12.63 |
| 7,159,889 | B2 | 1/2007 | Nuhn et al. | |
| 7,478,817 | B1 | 1/2009 | Carrier | |
| 7,780,097 | B2 | 8/2010 | Puck | |
| 7,797,789 | B2 | 9/2010 | Nuhn | |
| 7,833,071 | B2 | 11/2010 | Gaither | |
| 8,191,202 | B2 | 6/2012 | Nuhn | |
| 8,336,163 | B2 | 12/2012 | Nuhn | |
| 8,548,646 | B1 | 10/2013 | Gariepy et al. | |
| 8,632,370 | B2 | 1/2014 | Fritsch | |
| 8,894,452 | B2 | 11/2014 | Tiew | |
| 8,899,165 | B2 | 12/2014 | Puck | |
| 8,944,758 | B2 | 2/2015 | Nuhn | |
| 9,462,741 | B2 | 10/2016 | Puck | |
| 9,488,190 | B2 | 11/2016 | Nuhn | |
| 9,572,297 | B2 | 2/2017 | Puck | |
| 9,694,636 | B2 * | 7/2017 | Nuhn | B63H 25/02 |
| 10,066,629 | B2 | 9/2018 | Nuhn | |
| 10,124,638 | B2 | 11/2018 | Nuhn | |
| 10,212,879 | B2 | 2/2019 | Nuhn | |
| 10,694,661 | B2 | 6/2020 | Nuhn | |
| 10,710,422 | B2 | 7/2020 | Nuhn | |
| 10,757,853 | B2 | 9/2020 | Nuhn | |
| 10,788,052 | B2 | 9/2020 | Nuhn | |
| 10,808,707 | B2 | 10/2020 | Nuhn | |
| 10,974,557 | B2 | 4/2021 | Nuhn | |
| 11,358,425 | B1 | 6/2022 | Nuhn | |
| 11,448,224 | B2 | 9/2022 | Nuhn | |
| 11,491,835 | B2 | 11/2022 | Puck | |
| 11,541,708 | B2 | 1/2023 | Nuhn | |
| 2005/0003715 | A1 * | 1/2005 | Hewitt | B62D 55/084 440/12.5 |
| 2005/0014425 | A1 | 1/2005 | Wilson | |
| 2008/0303268 | A1 | 12/2008 | Puck | |
| 2014/0112093 | A1 * | 4/2014 | Puck | B01F 35/2205 366/182.2 |
| 2014/0288763 | A1 | 9/2014 | Bennett et al. | |
| 2016/0222972 | A1 | 8/2016 | Nuhn | |
| 2020/0408217 | A1 | 12/2020 | Nuhn | |
| 2022/0290786 | A1 | 9/2022 | Nuhn | |
| 2022/0381252 | A1 | 12/2022 | Nuhn | |
| 2023/0064726 | A1 | 3/2023 | Nuhn | |
| 2023/0092599 | A1 | 3/2023 | Nuhn | |
| 2023/0228273 | A1 | 7/2023 | Nuhn | |

* cited by examiner

DETAIL C
SCALE 1 : 5

SELF-PROPELLED LIQUID DELIVERY VEHICLE

CROSS REFERENCE TO RELATED APPLICATIONS

The present application claims priority to U.S. Provisional Application No. 63/315,716 titled SELF-PROPELLED LIQUID DELIVERY VEHICLE filed on Mar. 2, 2022, the entirety of which is hereby incorporated by reference herein, including any figures, tables, drawings, and other information.

FIELD OF THE DISCLOSURE

This disclosure relates to a self-propelled liquid delivery vehicle. More specifically and without limitation, this disclosure relates to a self-propelled vehicle capable of pumping liquid which, by way of example and not limitation, may be used in association with agitating a manure lagoon.

OVERVIEW OF THE DISCLOSURE

Livestock operations produce a large amount of manure. In many applications, this manure is stored in large holding ponds or lagoons prior to being used in various ways, such as being applied as a fertilizer. Many manure lagoons are ponds having sloped sides with fluid impermeable pits of varying depths and varying sizes. Manure that accumulates in these lagoons often settles out with fluids on top and solids on the bottom. As part of the emptying process, prior to the manure being removed, in many applications the manure must be mixed or agitated such that the liquid portions and solid portions form a homogenous slurry mixture prior to being pumped out. Due to the size and depth of these lagoons, agitating and mixing these lagoons is a complex and dirty task. Many systems and devices have been developed to mix or agitate these lagoons. However, the existing mixing mechanisms fall short and suffer from many disadvantages and limitations.

Therefore, for all the reasons stated above, and the reasons stated below, there is a need in the art for an improved mechanism for agitating manure lagoons which is easily inserted and removed from the lagoons, and capable of self-propelled travel when outside of a lagoon. Thus, it is a primary objective of the disclosure to provide a self-propelled liquid delivery vehicle that improves upon the state of the art.

Another objective of the disclosure is to provide a self-propelled liquid delivery vehicle which is safe to operate.

Yet another objective of the disclosure is to provide a self-propelled liquid delivery vehicle which is able to comply with road width travel restrictions.

Another objective of the disclosure is to provide a self-propelled liquid delivery vehicle which has a base which is able to expand in order to provide stability when in operation.

Yet another objective of the disclosure is to provide a self-propelled liquid delivery vehicle which is relatively easy to build.

Another objective of the disclosure is to provide a self-propelled liquid delivery vehicle which is relatively friendly to build.

Yet another objective of the disclosure is to provide a self-propelled liquid delivery vehicle which can be built relatively quickly and efficiently.

Another objective of the disclosure is to provide a self-propelled liquid delivery vehicle which is easy to operate.

Yet another objective of the disclosure is to provide a self-propelled liquid delivery vehicle which is relatively cost friendly to manufacture.

Another objective of the disclosure is to provide a self-propelled liquid delivery vehicle which is relatively easy to transport.

Yet another objective of the disclosure is to provide a self-propelled liquid delivery vehicle which is aesthetically appealing.

Another objective of the disclosure is to provide a self-propelled liquid delivery vehicle which is robust.

Yet another objective of the disclosure is to provide a self-propelled liquid delivery vehicle which is water resistant.

Another objective of the disclosure is to provide a self-propelled liquid delivery vehicle which is relatively inexpensive.

Yet another objective of the disclosure is to provide a self-propelled liquid delivery vehicle which is not easily susceptible to wear and tear.

Another objective of the disclosure is to provide a self-propelled liquid delivery vehicle which has a long useful life.

Yet another objective of the disclosure is to provide a self-propelled liquid delivery vehicle which is efficient to use and operate.

These and other objects, features, or advantages of the disclosure will become apparent from the specification, figures, and claims.

SUMMARY OF THE DISCLOSURE

In one or more arrangements, a self-propelled liquid delivery vehicle is presented which has a frame assembly, drive members (e.g. a pair of track assemblies), a power system, and a liquid delivery system. In one arrangement, the pair of track assemblies are configured to facilitate propulsion of the self-propelled liquid vehicle when on land. In one arrangement, the pair of track assemblies are configured to facilitate floating of the self-propelled liquid delivery vehicle when in a liquid.

In one arrangement, the drive members (e.g. a pair of track assemblies) are configured to move between an extended position and a retracted position. In one arrangement, an extension assembly is configured to move the drive members between an extended position and a retracted position. In one or more arrangements, when the drive members are in the retracted position the self-propelled liquid delivery vehicle complies with road width travel restrictions. In one or more arrangements, when the drive members are in the extended position the self-propelled liquid delivery vehicle has a wider base that provides greater stability to the self-propelled liquid delivery vehicle when in operation.

In one or more arrangements, the frame assembly includes elongated members and the track assemblies have a track frame. In one or more arrangements, when the track assemblies are moved between an extended position and a retracted position, the elongated members of the frame assembly telescope within the track frame of the track assemblies.

In one or more arrangements, the liquid delivery system of the self-propelled liquid delivery vehicle includes at least one nozzle. In one or more arrangements, the at least one nozzle is configured to facilitate agitation of a manure lagoon. In one or more arrangements, the at least one nozzle is configured to provide for propulsion and directional control when the self-propelled liquid delivery vehicle is floating in a liquid. In one or more arrangements, the liquid delivery system of the self-propelled liquid delivery vehicle includes an outflow hookup configured to connect to a hose to facilitate pumping of liquid away from the self-propelled liquid delivery vehicle.

In one or more arrangements, the liquid delivery system is configured to be controlled from a remote location by a wireless control assembly.

DETAILED DESCRIPTION OF THE DISCLOSURE

Figure 1:
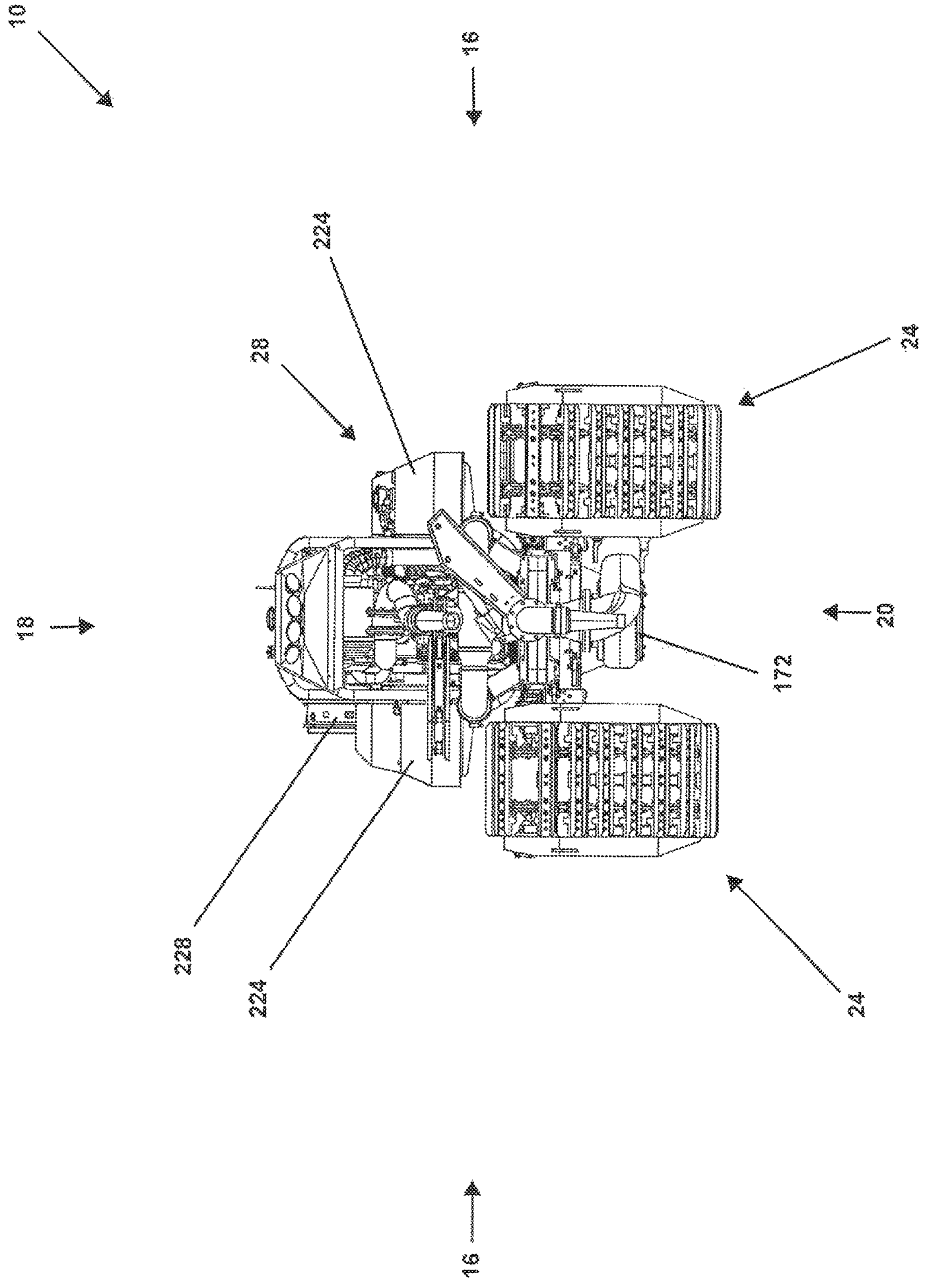
FIG. 1 is a front elevation view of a self-propelled liquid delivery vehicle; the view showing the self-propelled liquid delivery vehicle having track assemblies in a retracted position, a liquid delivery system having a first nozzle and a reservoir pump, and a power system having an engine, gas tanks, and a control panel.
Figure 2:
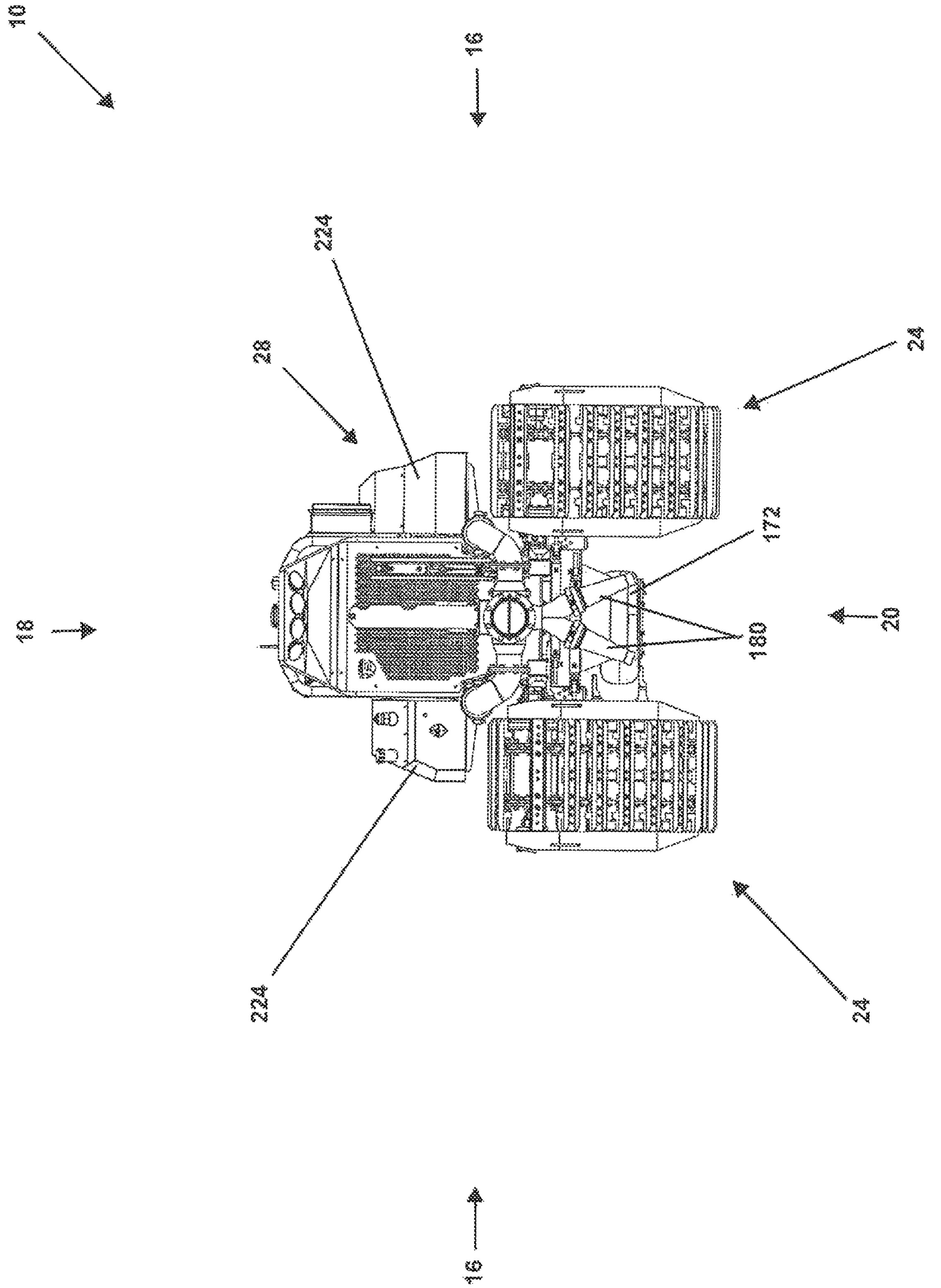
FIG. 2 is a rear elevation view of a self-propelled liquid delivery vehicle; the view showing the self-propelled liquid delivery vehicle having track assemblies in a retracted position, a liquid delivery system having a set of second nozzles and a reservoir pump, and a power system having an engine and gas tanks.
Figure 3:
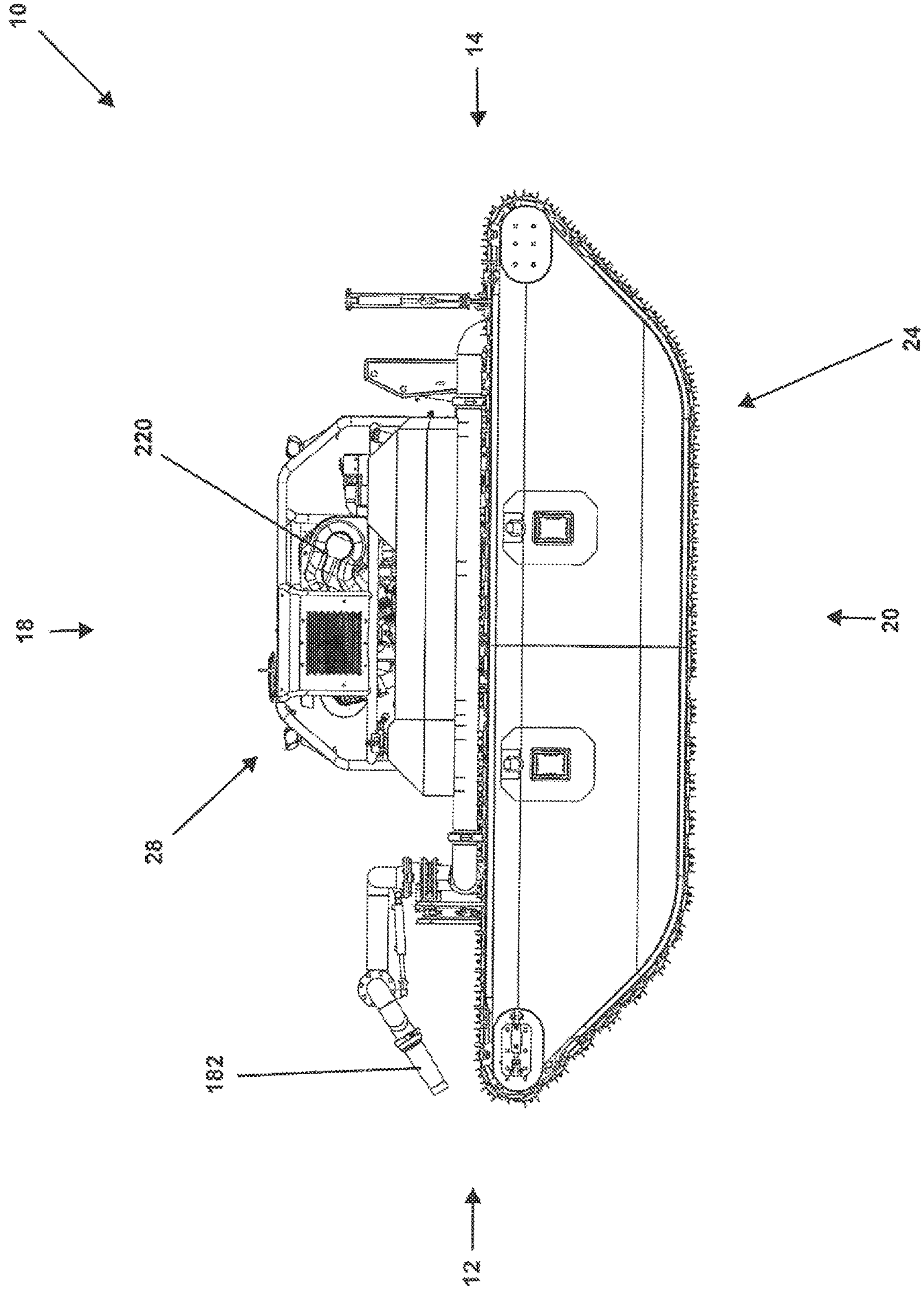
FIG. 3 is a side elevation view of a self-propelled liquid delivery vehicle; the view showing the self-propelled liquid delivery vehicle having track assemblies, a liquid delivery system having a third nozzle, and a power system having an engine.
Figure 4:
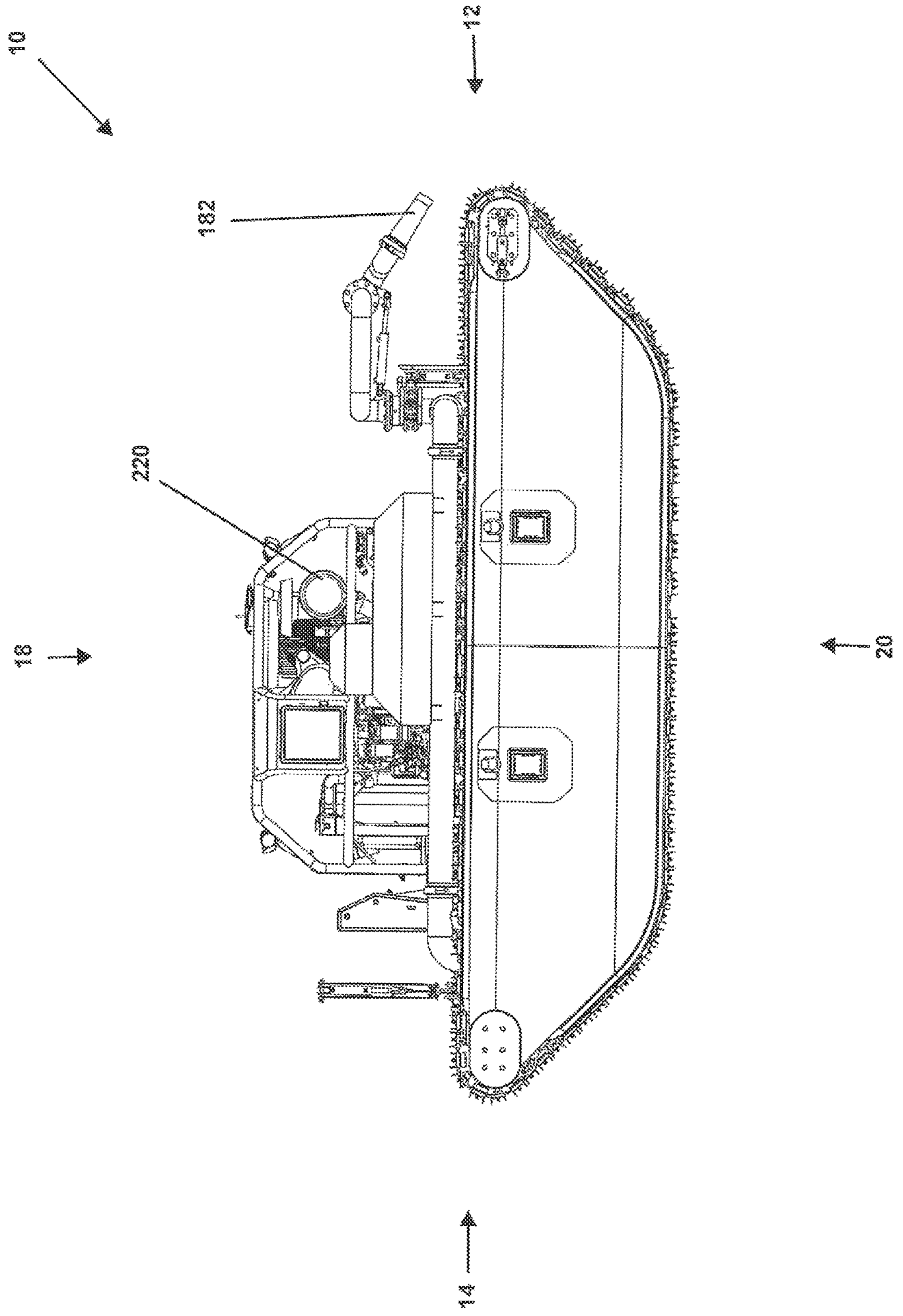
FIG. 4 is another side elevation view of a self-propelled liquid delivery vehicle; the view showing the self-propelled liquid delivery vehicle having track assemblies, a liquid delivery system having a third nozzle, and a power system having an engine.
Figure 5:
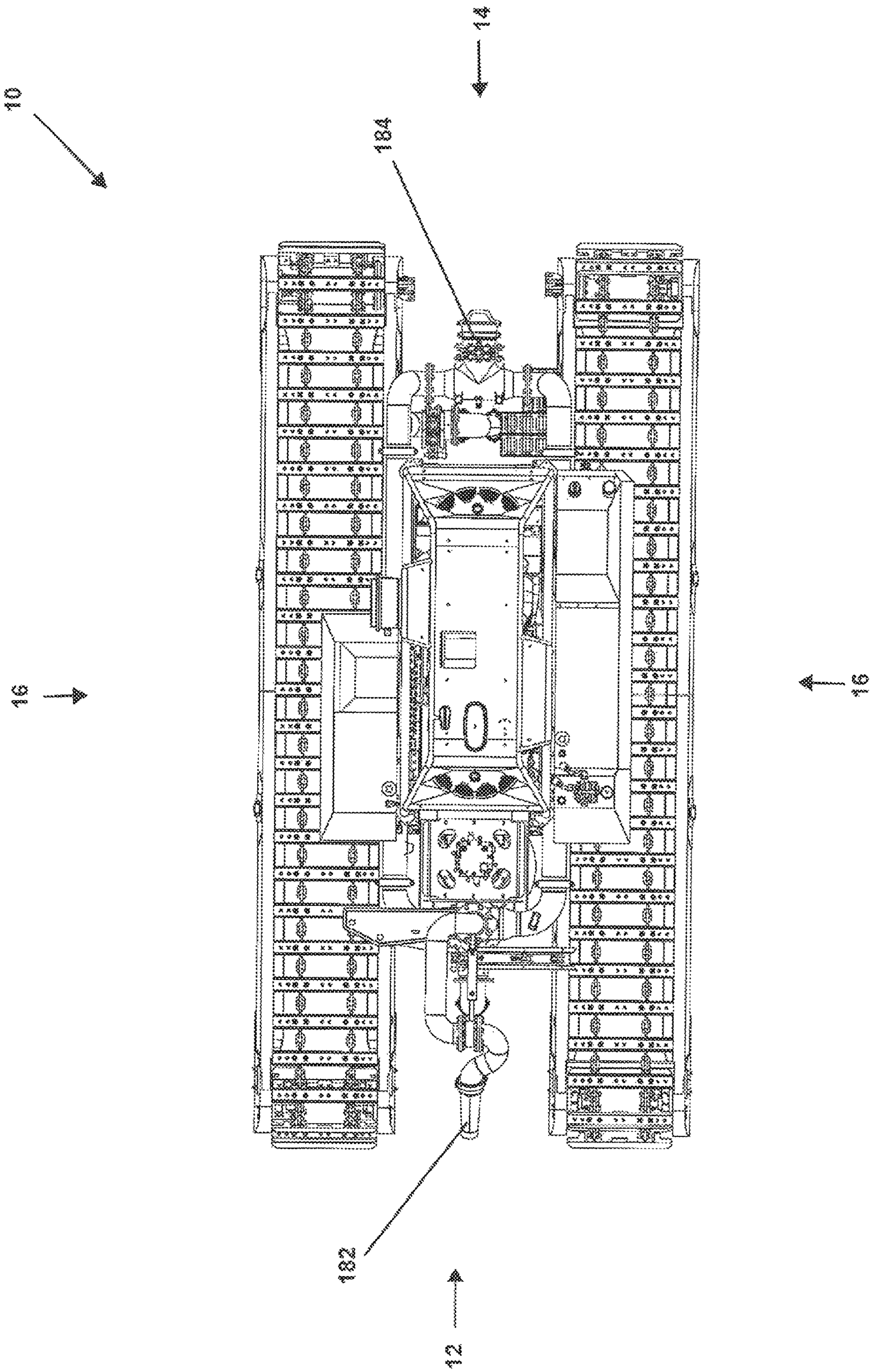
FIG. 5 is a top elevation view of a self-propelled liquid delivery vehicle; the view showing the self-propelled liquid delivery vehicle having track assemblies in a retracted position, a liquid delivery system having a third nozzle and an outflow hookup, and a power system.
Figure 6:
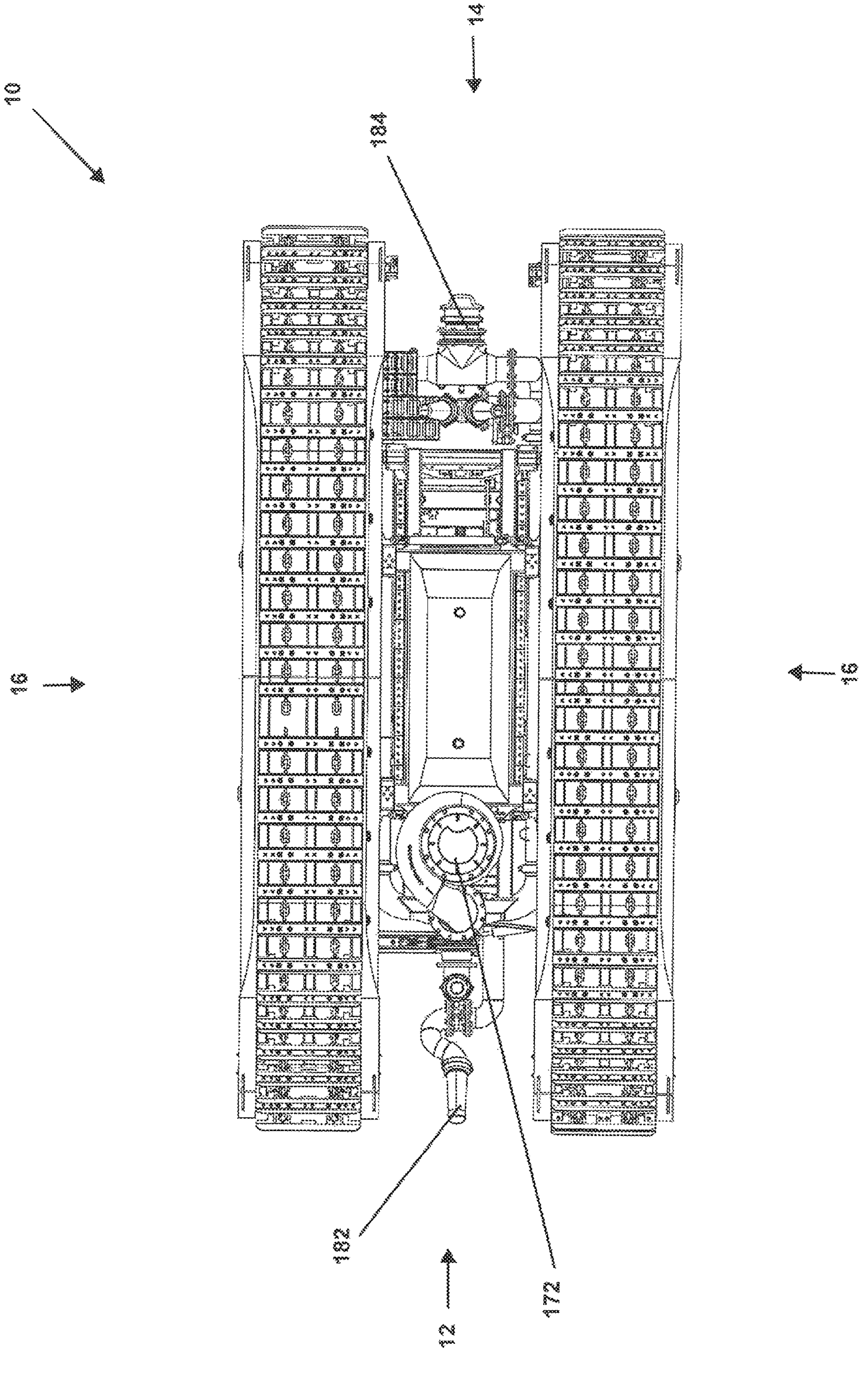
FIG. 6 is a bottom elevation view of a self-propelled liquid delivery vehicle; the view showing the self-propelled liquid delivery vehicle having track assemblies in a retracted position, a frame assembly, and a liquid delivery system having a reservoir pump, a first nozzle, a set of second nozzles, a third nozzle, and an outflow hookup.
Figure 7:
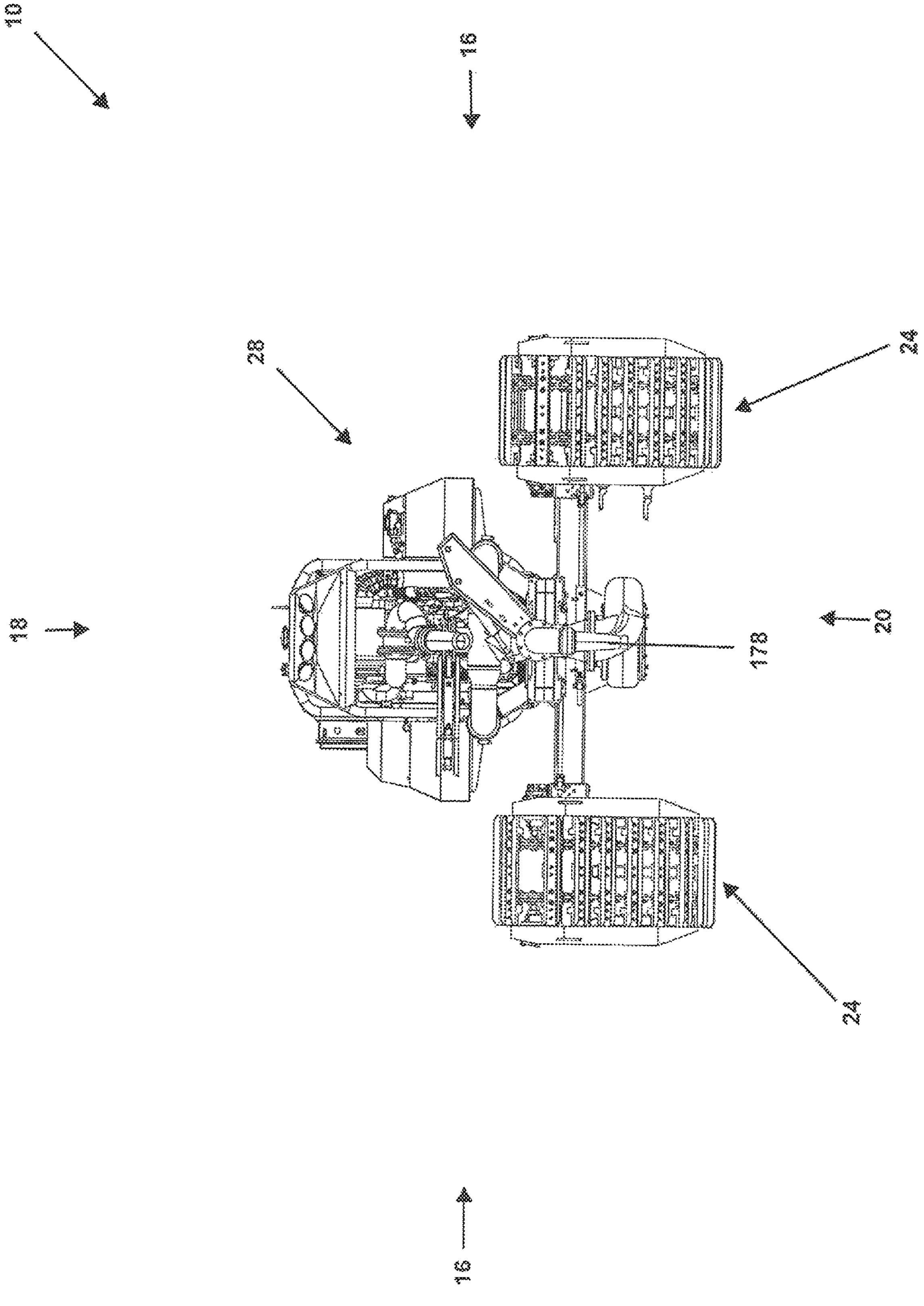
FIG. 7 is a front elevation view of a self-propelled liquid delivery vehicle; the view showing the self-propelled liquid delivery vehicle having track assemblies in an extended position, a liquid delivery system having a first nozzle and a reservoir pump, and a power system having an engine, gas tanks, and a control panel.
Figure 8:
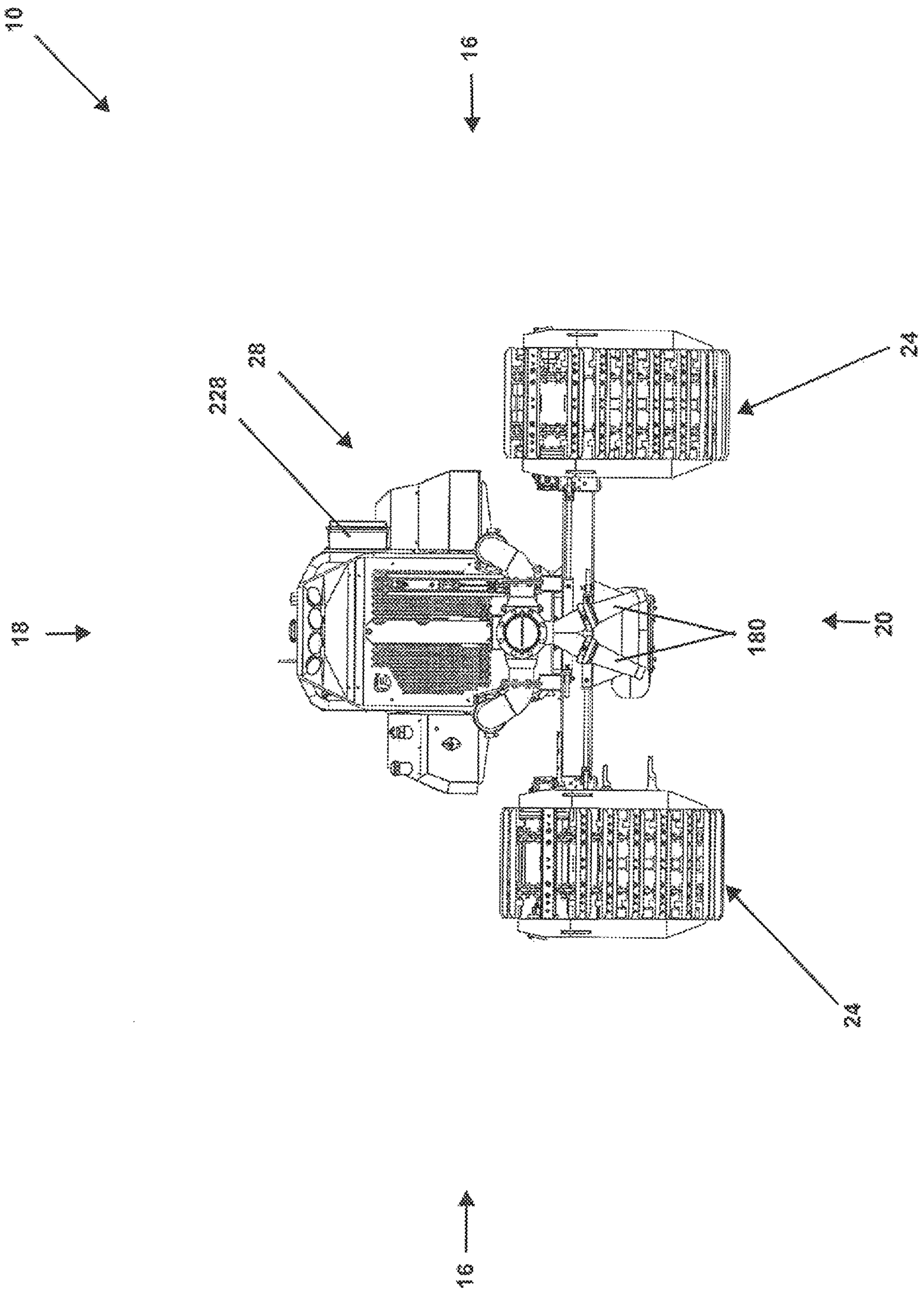
FIG. 8 is a rear elevation view of a self-propelled liquid delivery vehicle; the view showing the self-propelled liquid delivery vehicle having track assemblies in an extended position, a frame assembly, a liquid delivery system having a set of second nozzles and a reservoir pump, and a power system having an engine and gas tanks.
Figure 9:
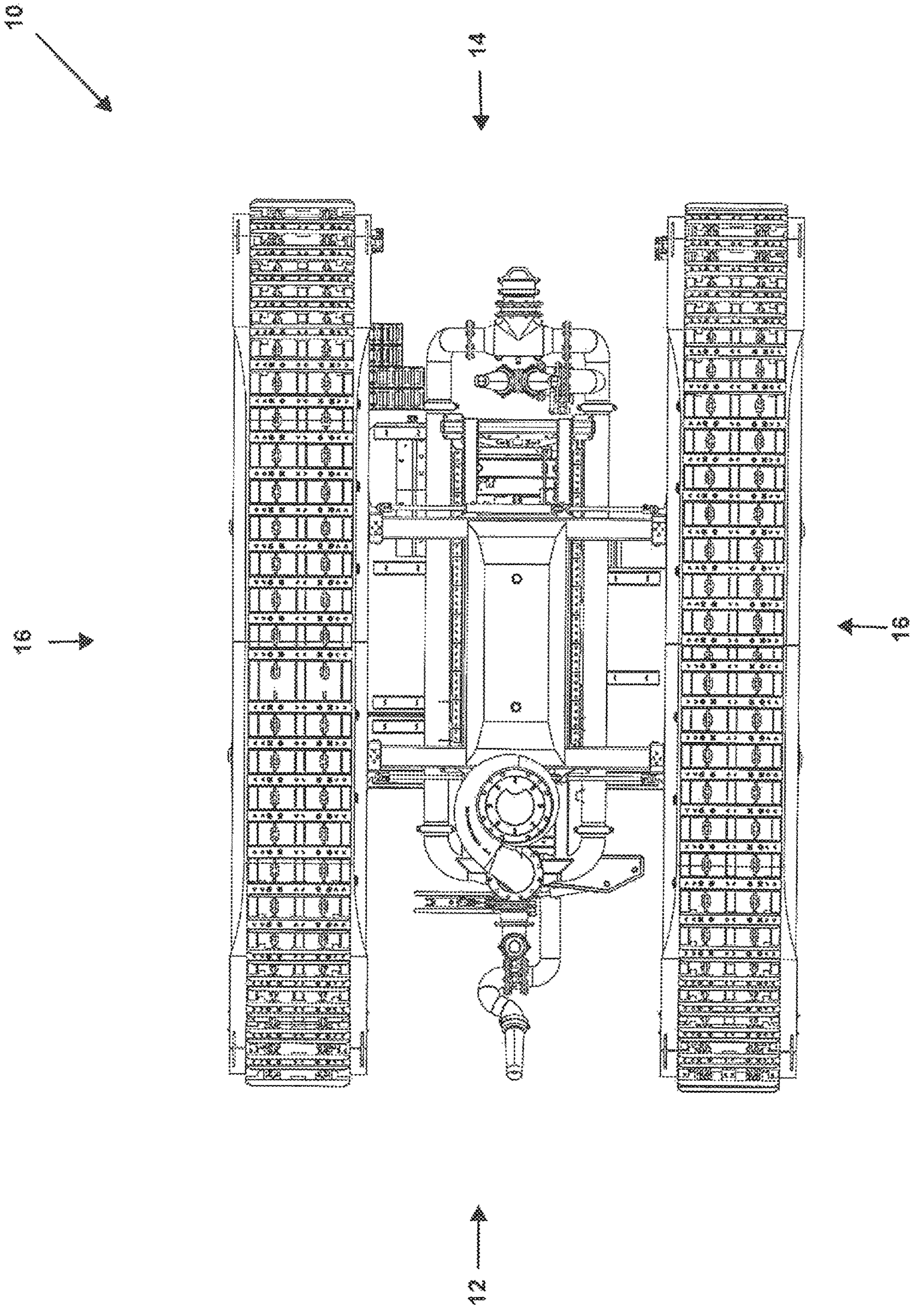
FIG. 9 is a bottom elevation view of a self-propelled liquid delivery vehicle; the view showing the self-propelled liquid delivery vehicle having track assemblies in an extended position, a frame assembly, and a liquid delivery system having a reservoir pump, a first nozzle, a set of second nozzles, a third nozzle, and an outflow hookup.
Figure 10:
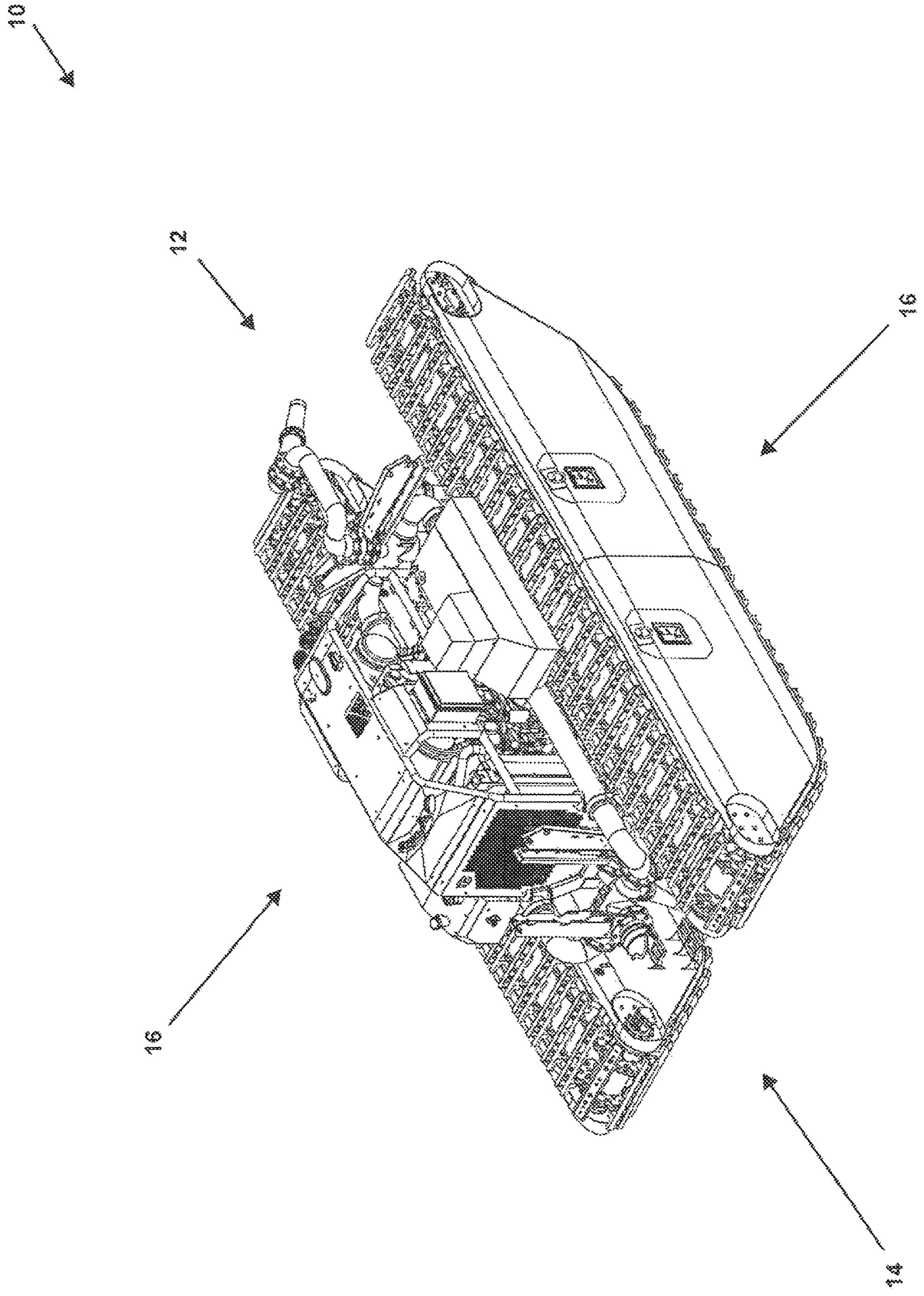
FIG. 10 is a rear perspective view of a self-propelled liquid delivery vehicle; the view showing the self-propelled liquid delivery vehicle having track assemblies in a retracted position, a liquid delivery system having an outflow hookup and a third nozzle, and a power system having an engine, gas tanks, and a control panel.
Figure 11:
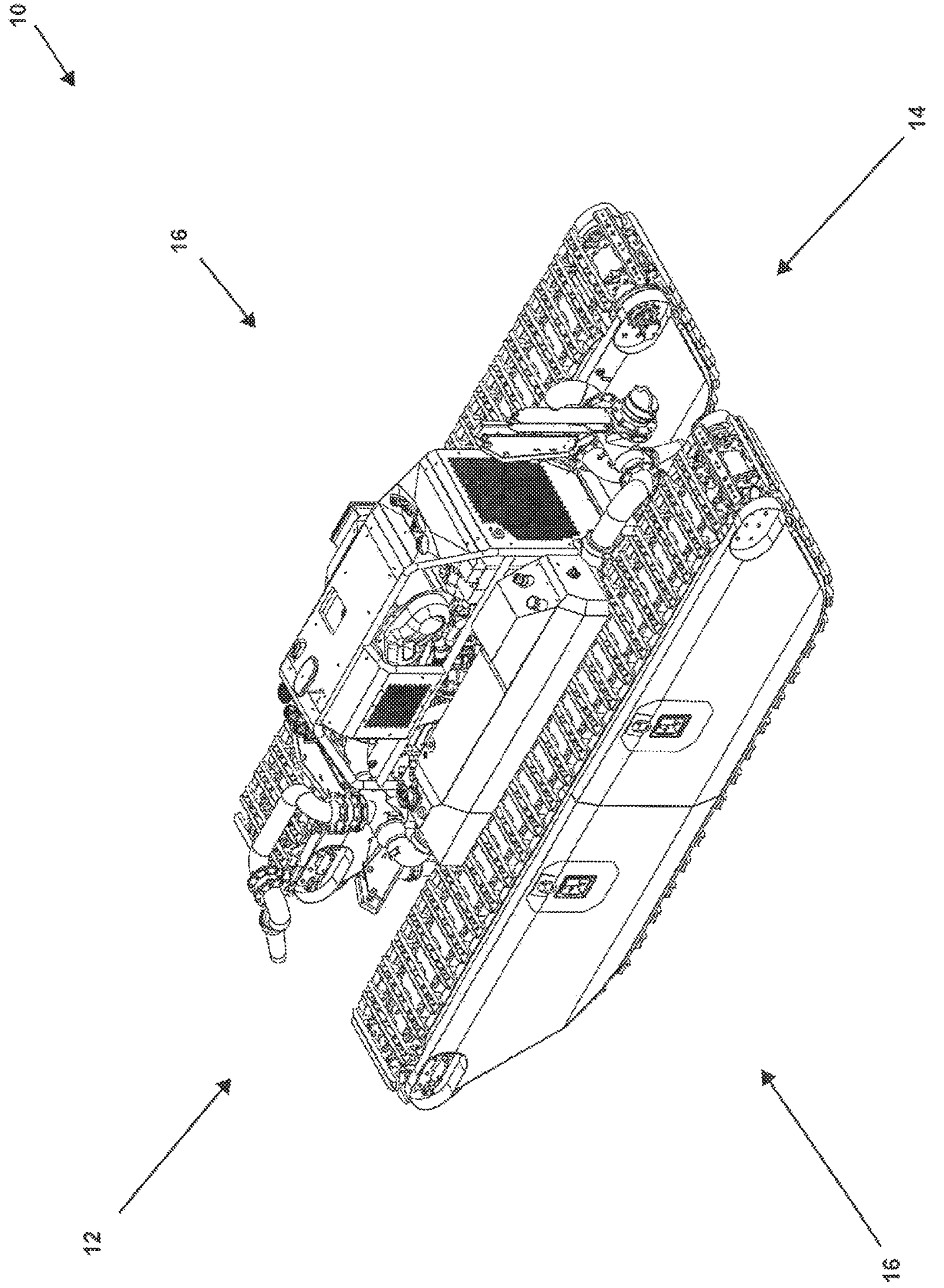
FIG. 11 is another rear perspective view of a self-propelled liquid delivery vehicle; the view showing the self-propelled liquid delivery vehicle having track assemblies in a retracted position, a liquid delivery system having an outflow hookup and a third nozzle, and a power system having an engine and gas tanks.
Figure 12:
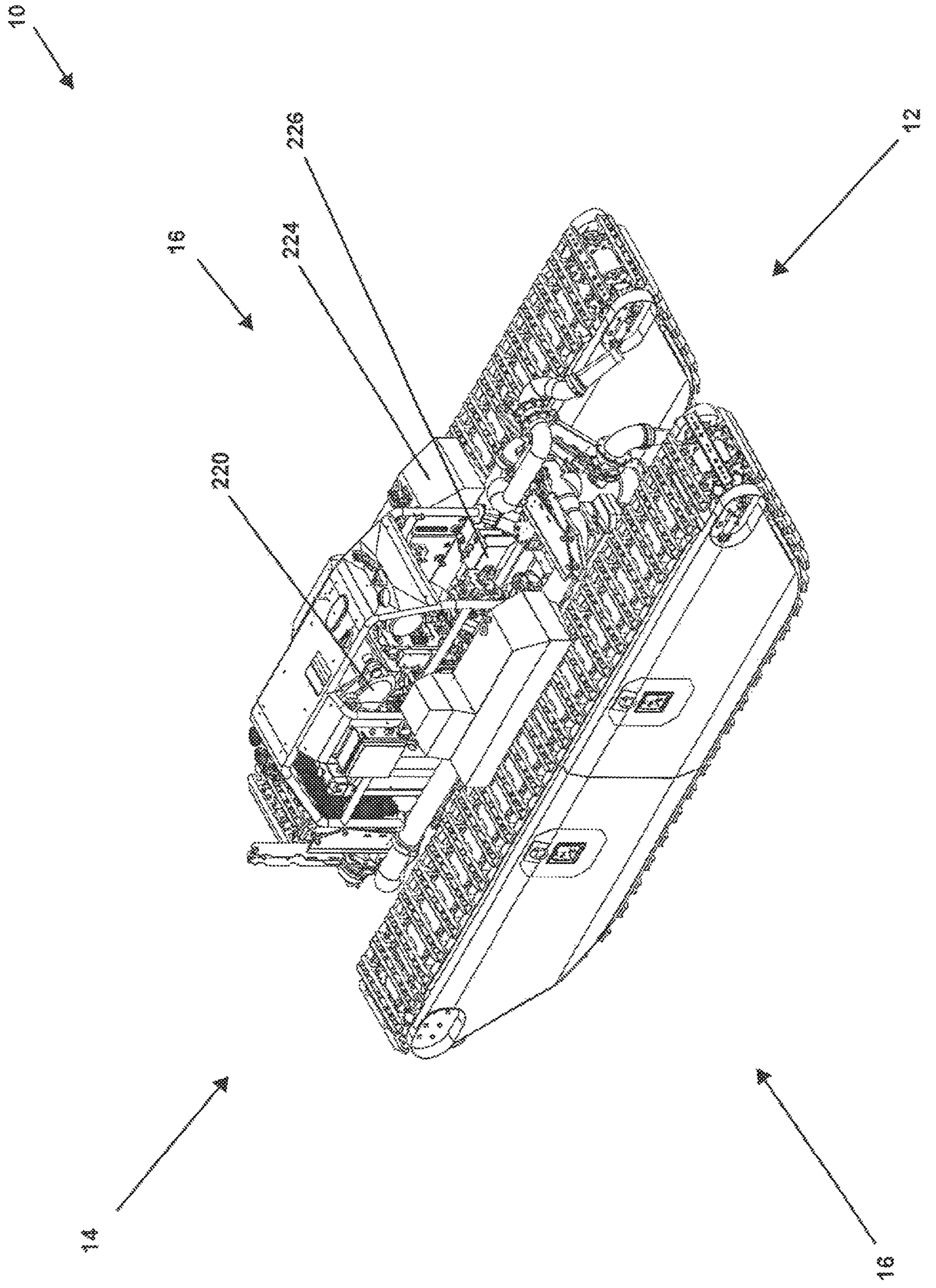
FIG. 12 is a front perspective view of a self-propelled liquid delivery vehicle; the view showing the self-propelled liquid delivery vehicle having track assemblies in a retracted position, a liquid delivery system having a first nozzle and a third nozzle, and a power system having an engine, gas tanks, a header tank, and a control panel.
Figure 13:
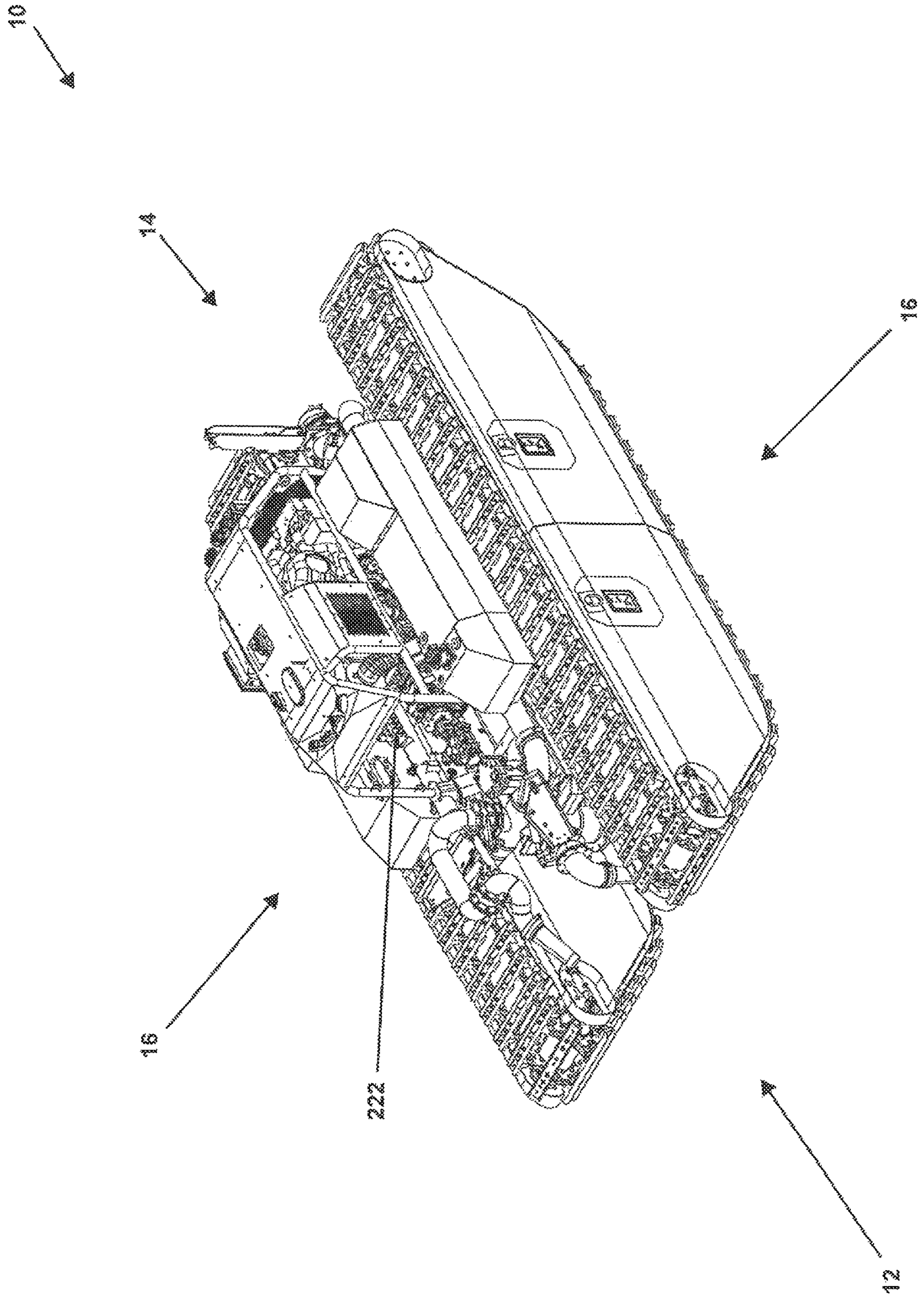
FIG. 13 is another front perspective view of a self-propelled liquid delivery vehicle; the view showing the self-propelled liquid delivery vehicle having track assemblies in a retracted position, a liquid delivery system having a first nozzle and a third nozzle, and a power system having an engine, gas tanks, and a pump drive.
Figure 14:
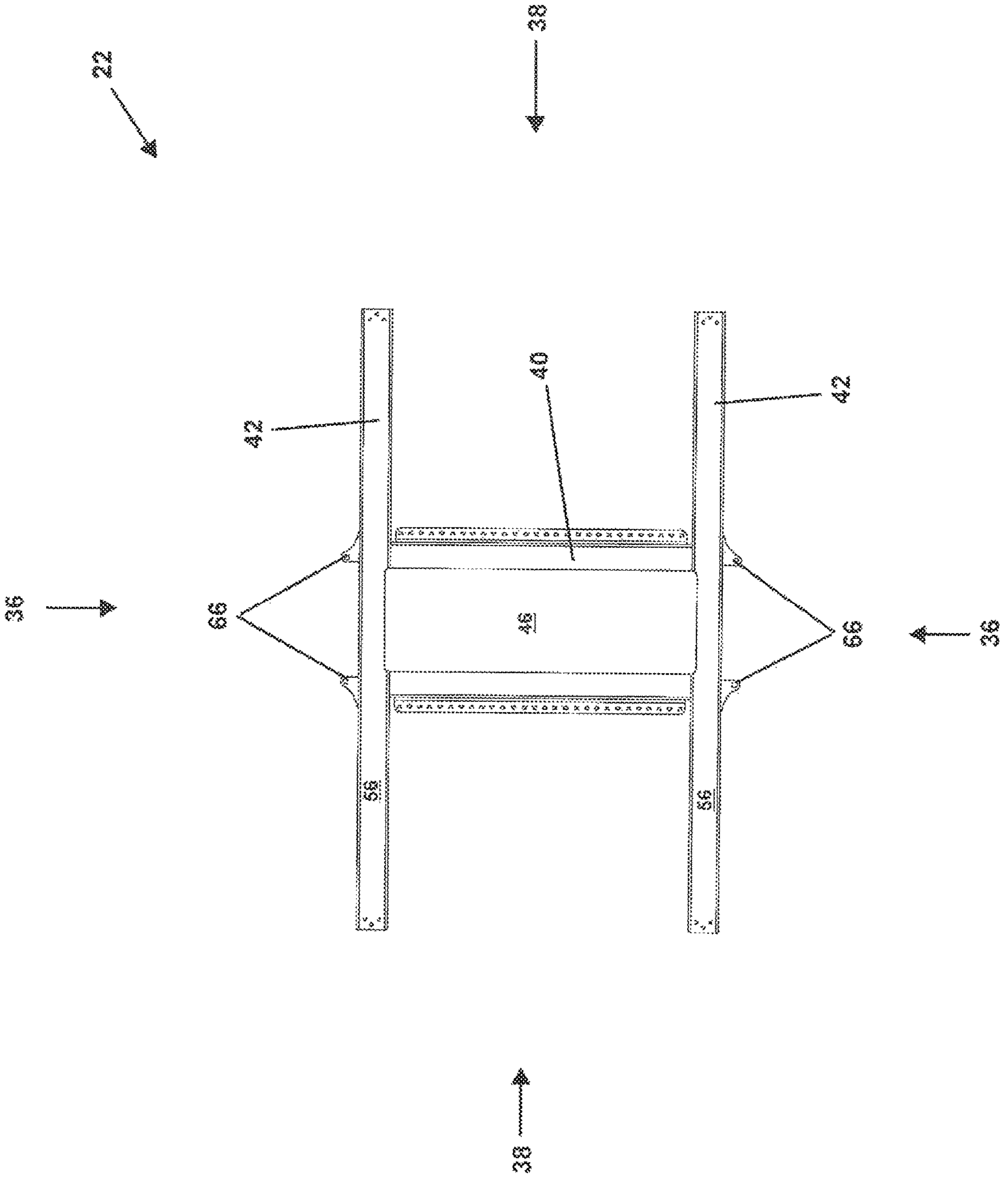
FIG. 14 is a top elevation view of the frame assembly of a self-propelled liquid delivery vehicle; the view showing the frame assembly having a support member and elongated members with attachment members.
Figure 15:
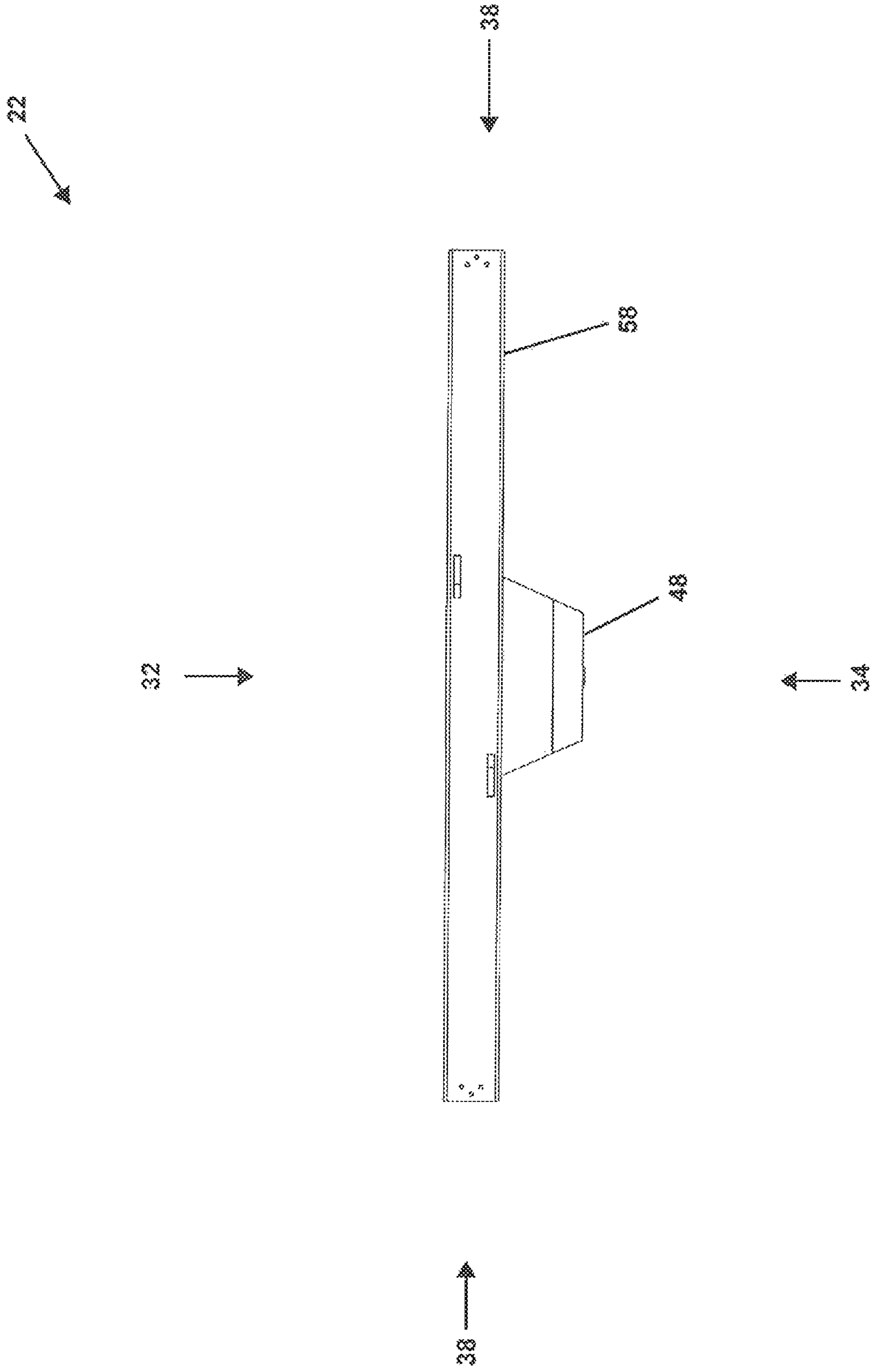
FIG. 15 is a front elevation view of the frame assembly of a self-propelled liquid delivery vehicle; the view showing the frame assembly having a support member and elongated members with attachment members.
Figure 16:
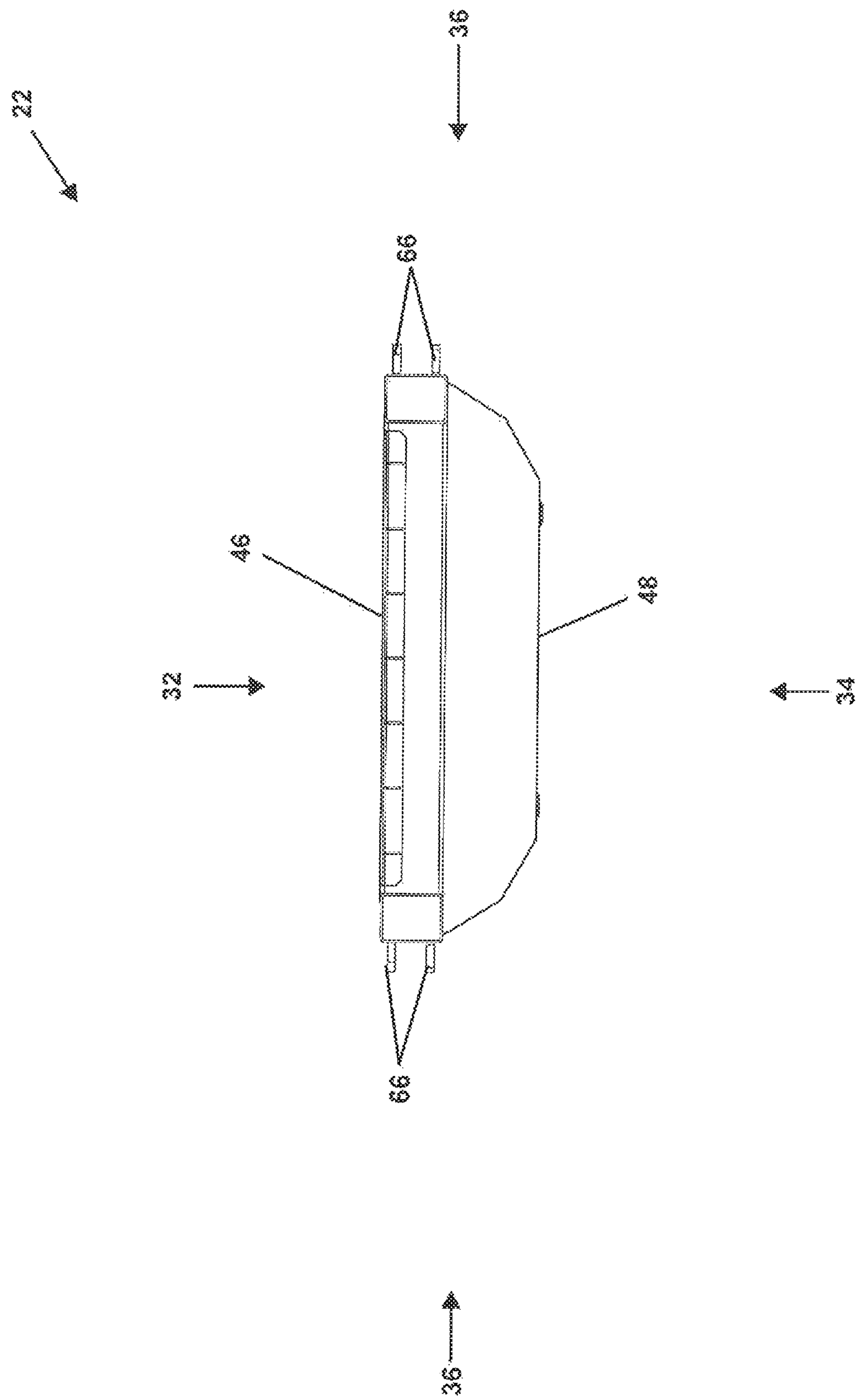
FIG. 16 is a side elevation view of the frame assembly of a self-propelled liquid delivery vehicle; the view showing the frame assembly having a support member and elongated members with attachment members.
Figure 17:
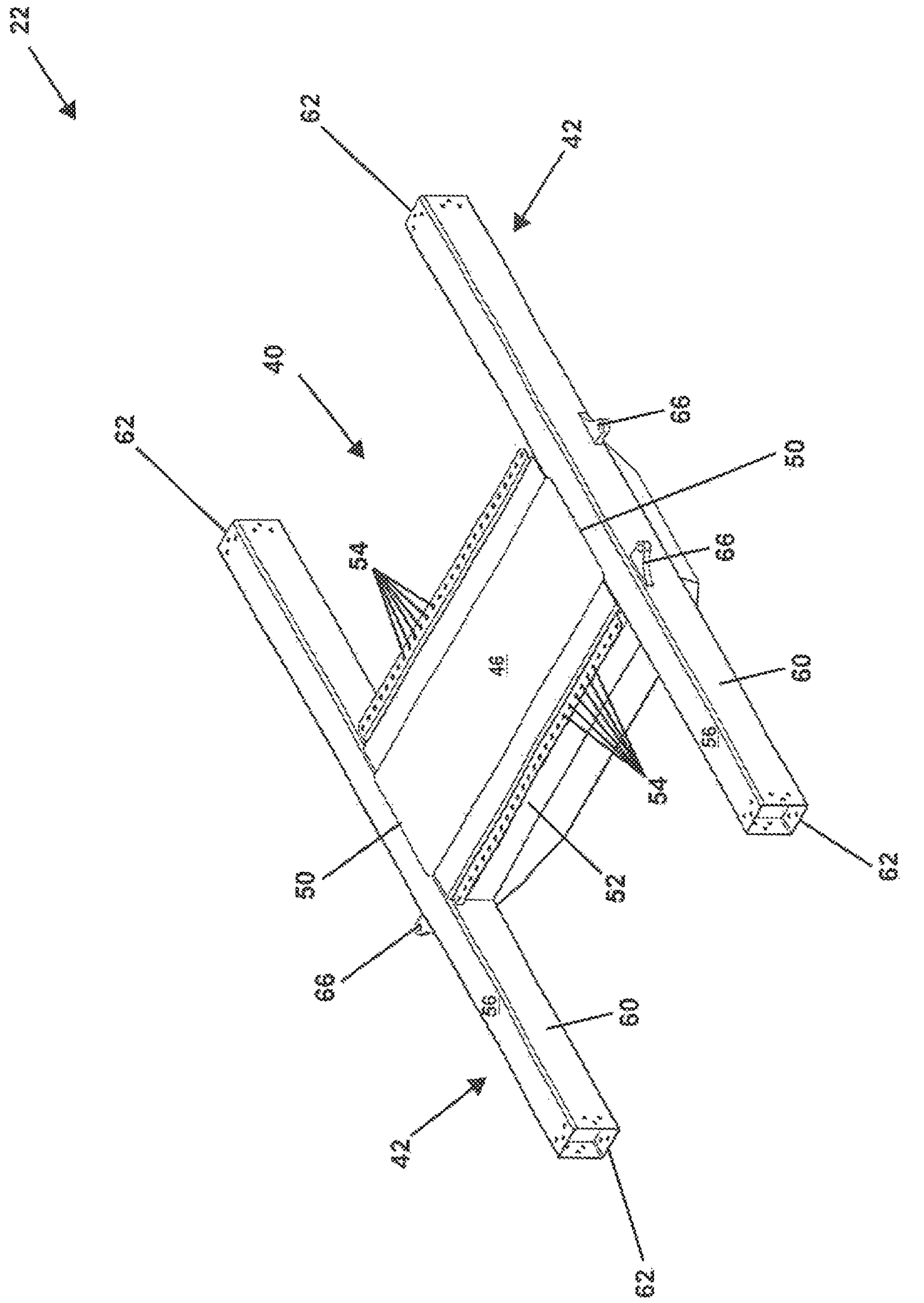
FIG. 17 is a perspective view of the frame assembly of a self-propelled liquid delivery vehicle; the view showing the frame assembly having a support member and elongated members with attachment members.
Figure 18C:
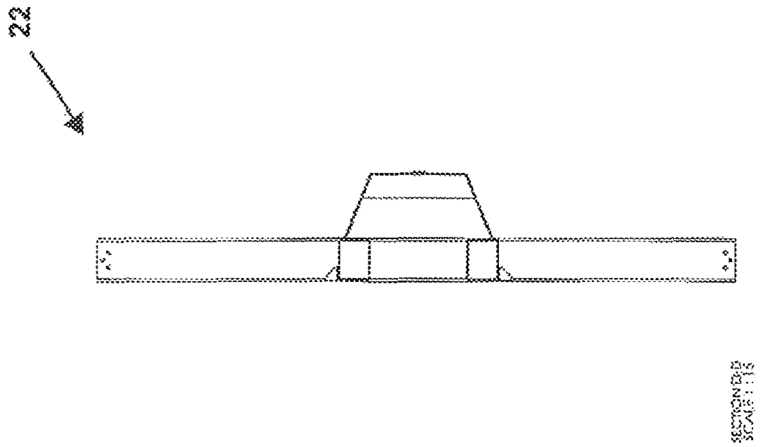
FIG. 18C is a section view of the frame assembly shown in FIG. 18A; the section view showing a front elevation of a cut-away portion of the frame assembly.
Figure 18A:
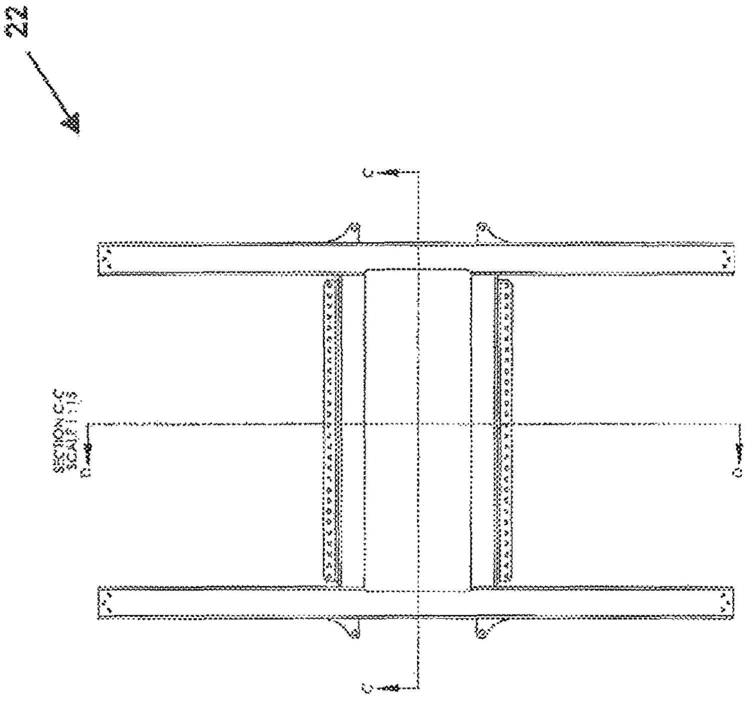
FIG. 18A is another top elevation view of the frame assembly of a self-propelled liquid delivery vehicle; the view showing the frame assembly having a support member and elongated members with attachment members.
Figure 18B:
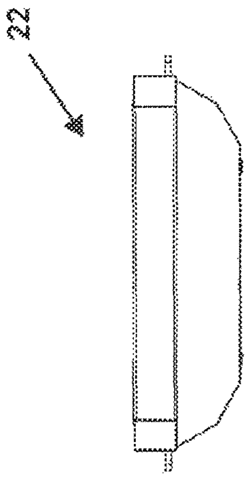
FIG. 18B is a section view of the frame assembly shown in FIG. 18A; the section view showing a side elevation of a cut-away portion of the frame assembly.
Figure 19:
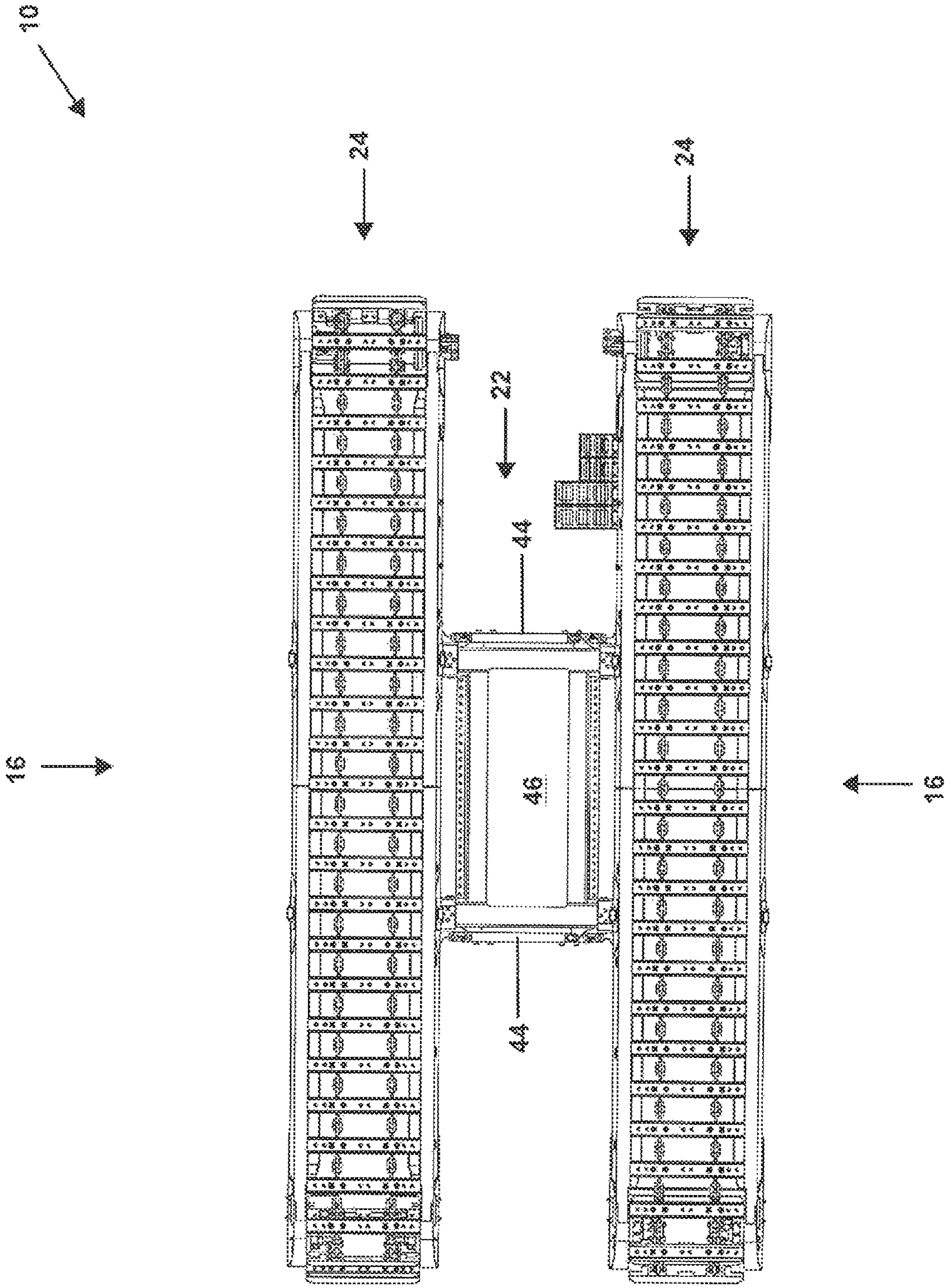
FIG. 19 is a bottom elevation view of the frame assembly and track assemblies of a self-propelled liquid delivery vehicle; the view showing the frame assembly having a support member, elongated members, and extension assemblies; the view showing the track assemblies in a retracted position; the view also showing the elongated members of the frame assembly positioned within the chambers of the track assemblies and the extension assemblies of the frame assembly in a retracted position and connected to the track assemblies.
Figure 20A:
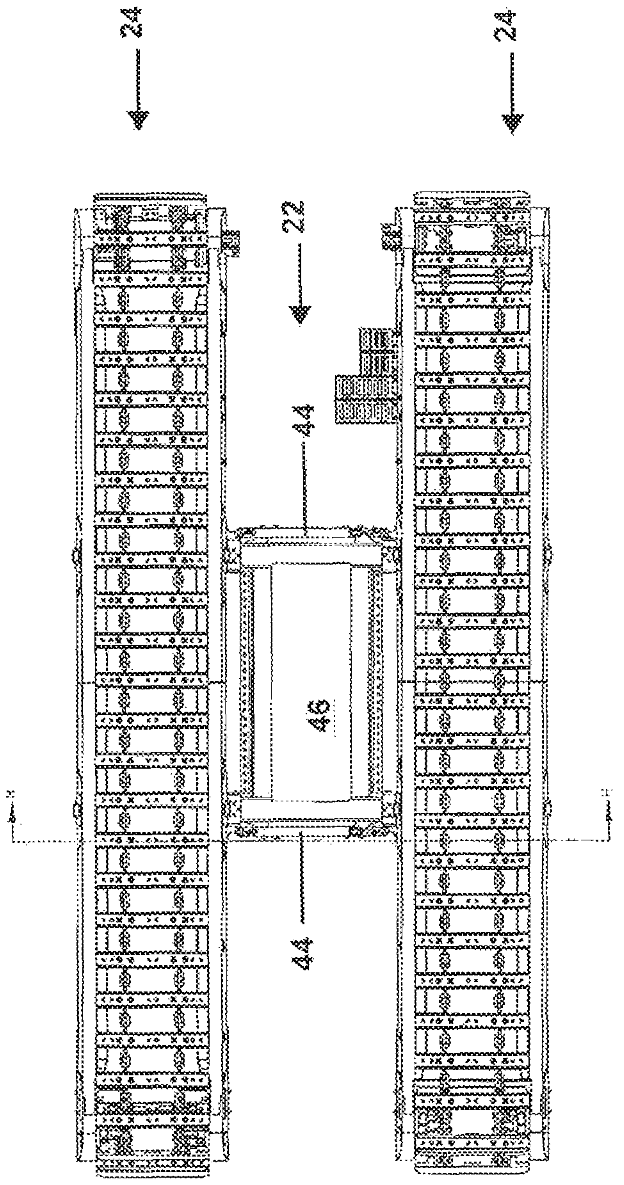
FIG. 20A is another bottom elevation view of the frame assembly and track assemblies of a self-propelled liquid delivery vehicle; the view showing the frame assembly having a support member, elongated members, and extension assemblies; the view showing the track assemblies in a retracted position; the view also showing the elongated members of the frame assembly positioned within the chambers of the track assemblies and the extension assemblies of the frame assembly in a retracted position and connected to the track assemblies.
Figure 20B:
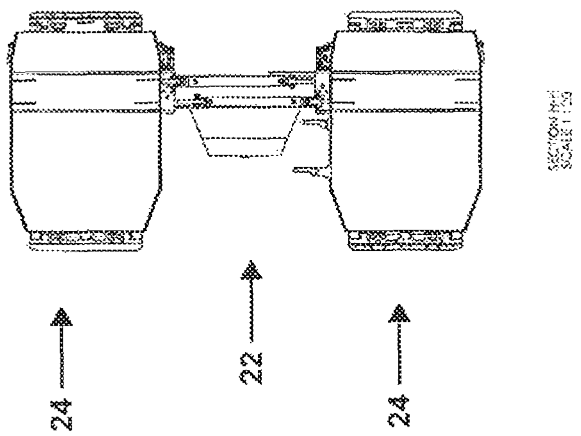
FIG. 20B is a section view of the frame assembly and track assemblies shown in FIG. 20A; the section view showing a front elevation view a cut-away portion of the frame assembly and track assemblies.
Figure 21:
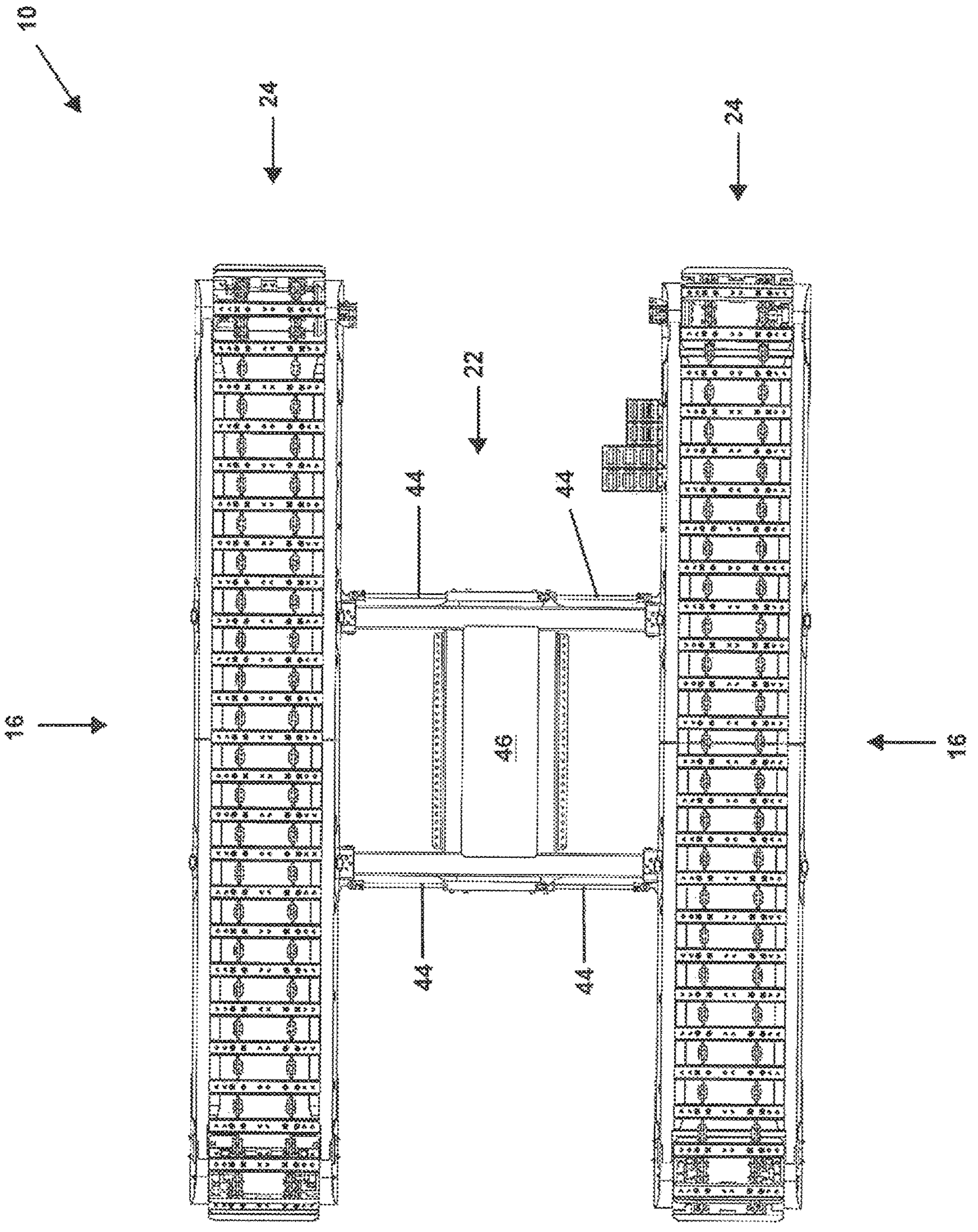
FIG. 21 is a bottom elevation view of the frame assembly and track assemblies of a self-propelled liquid delivery vehicle; the view showing the frame assembly having a support member, elongated members, and extension assemblies; the view showing the track assemblies in an extended position; the view also showing the elongated members of the frame assembly positioned within the chambers of the track assemblies and the extension assemblies of the frame assembly in an extended position and connected to the track assemblies.
Figure 22:
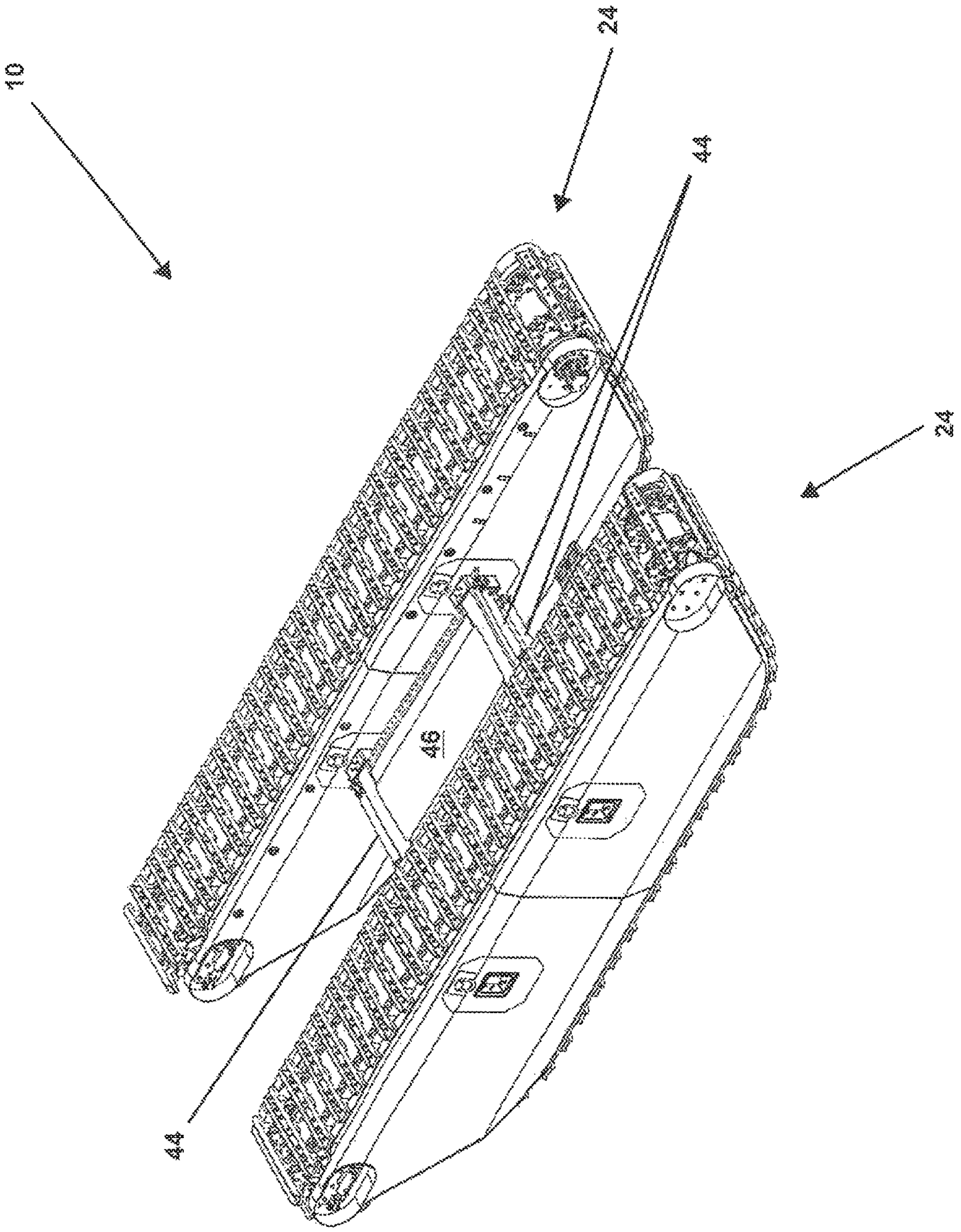
FIG. 22 is a perspective view of the frame assembly and track assemblies of a self-propelled liquid delivery vehicle; the view showing track frame having a support member, elongated members, and extension assemblies; the view showing the track assemblies in a retracted position; the view also showing the elongated members of the frame assembly positioned within the chambers of the track assemblies and the extension assemblies of the frame assembly in a retracted position and connected to the track assemblies.
Figure 23:
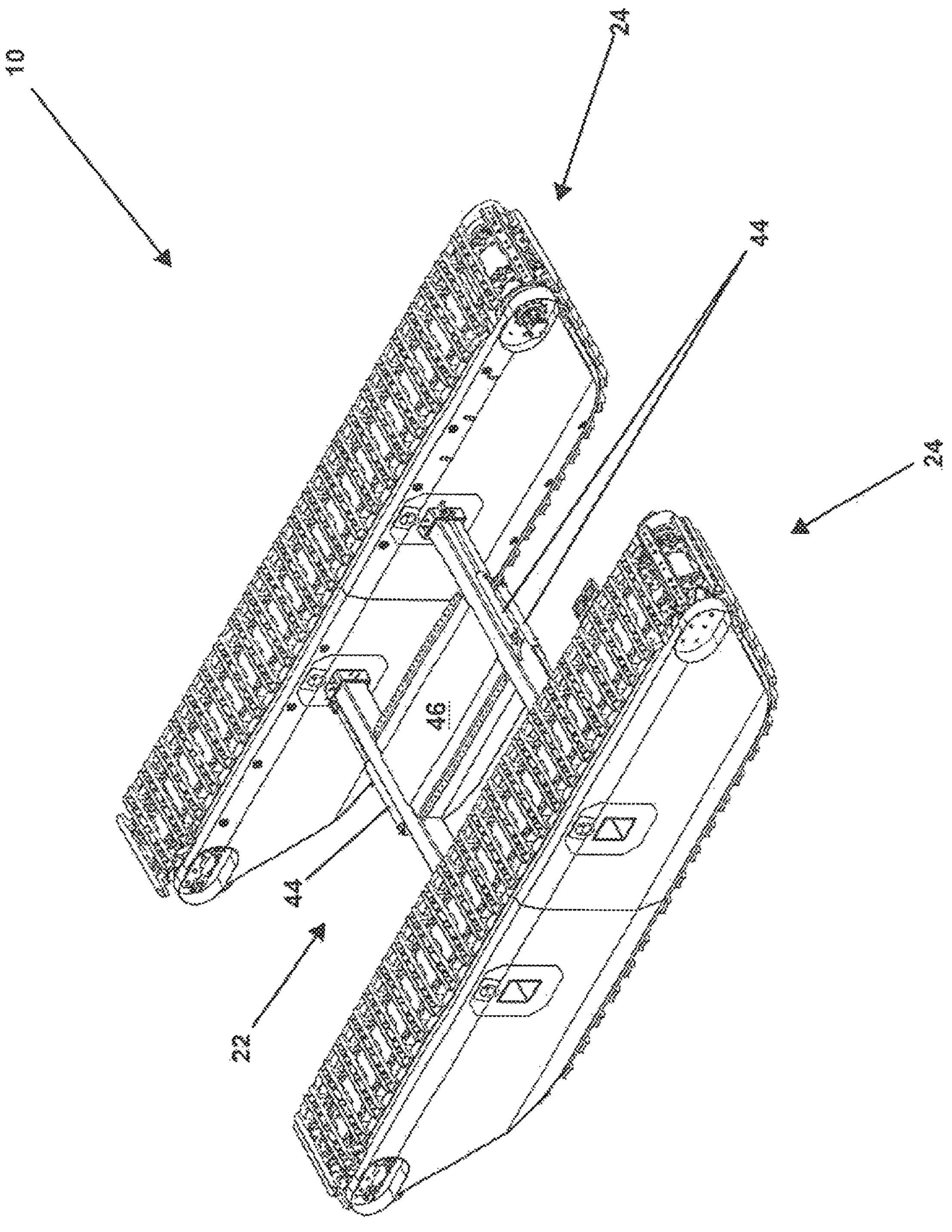
FIG. 23 is a perspective view of the frame assembly and track assemblies of a self-propelled liquid delivery vehicle; the view showing track frame having a support member, elongated members, and extension assemblies; the view showing the track assemblies in an extended position; the view also showing the elongated members of the frame assembly positioned within the chambers of the track assemblies and the extension assemblies of the frame assembly in an extended position and connected to the track assemblies.
Figure 24B:
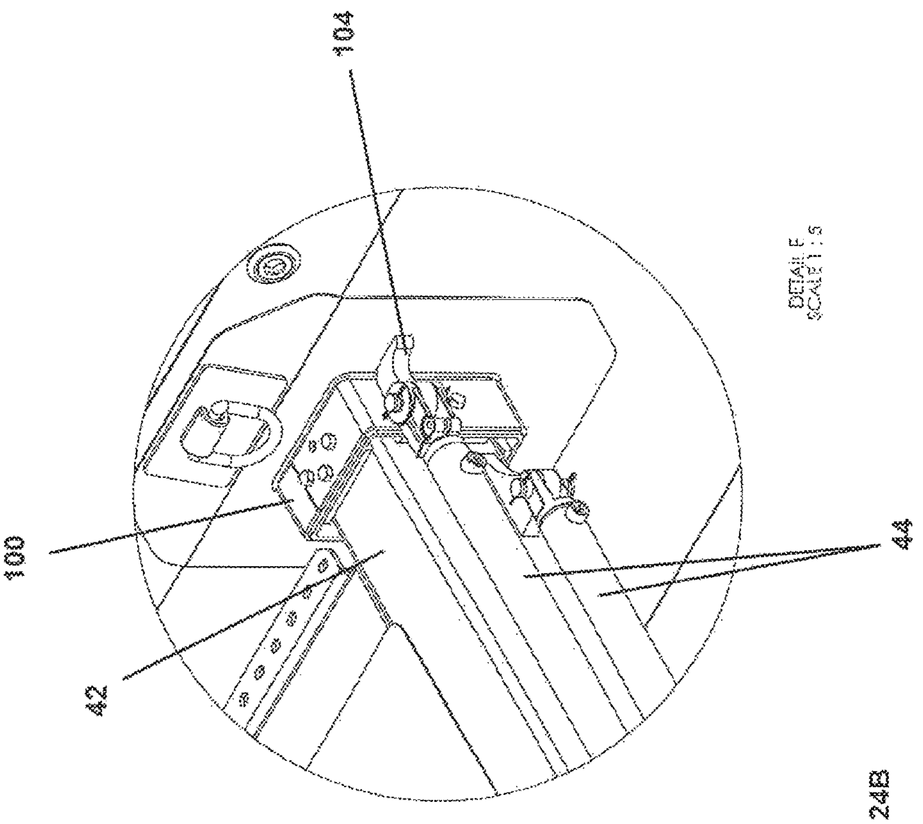
FIG. 24B is a detailed view of the frame assembly and track assemblies shown in FIG. 24A; the view showing a close-up view of an extension assembly of the frame assembly entering a chamber of the track assembly; the view also showing the connection between an extension assembly of the frame assembly to an attachment member of the chamber of the track assembly.
Figure 24A:
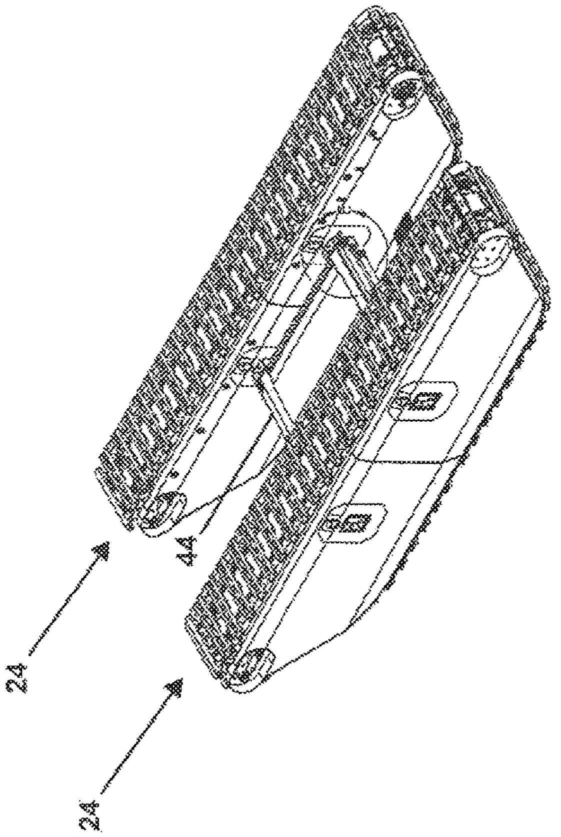
FIG. 24A is perspective view of the frame assembly and track assemblies of a self-propelled liquid delivery vehicle; the view showing track frame having a support member, elongated members, and extension assemblies; the view showing the track assemblies in a retracted position; the view also showing the elongated members of the frame assembly positioned within the chambers of the track assemblies and the extension assemblies of the frame assembly in a retracted position and connected to the track assemblies.
Figure 25C:
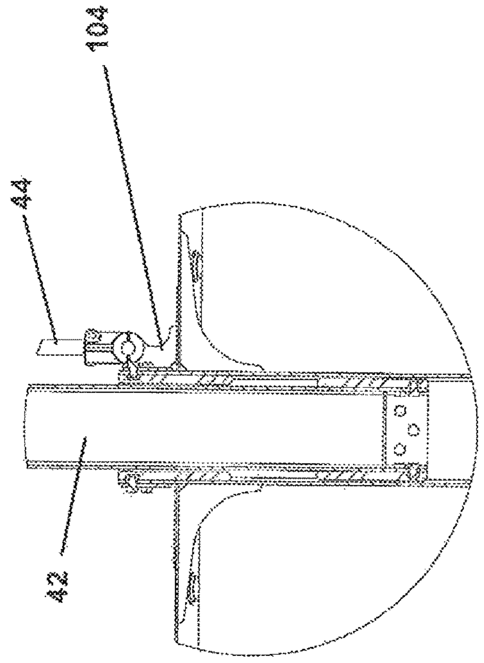
FIG. 25C is a detail view of the section view of the frame assembly and track assemblies shown in FIG. 25B; the view showing a close-up view of the elongated member of the frame assembly positioned within the chamber of track assembly; the view also showing the extension assembly of the frame assembly connected to the chamber of the track assembly.
Figure 25A:
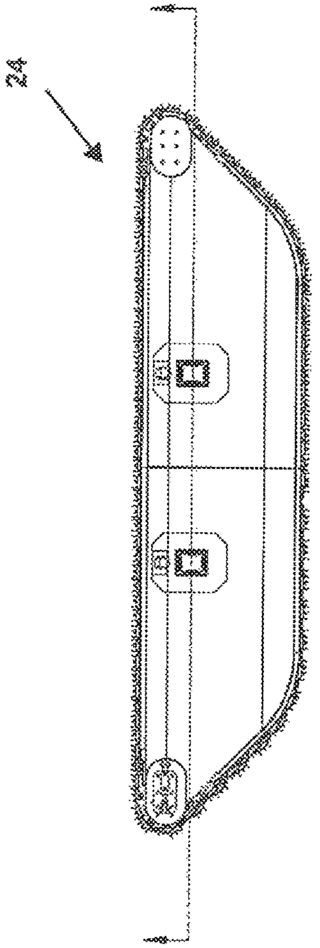
FIG. 25A is a side elevation view of the frame assembly and track assemblies of a self-propelled liquid delivery vehicle; the view showing the track assembly having chambers extending through the track frame.
Figure 25B:
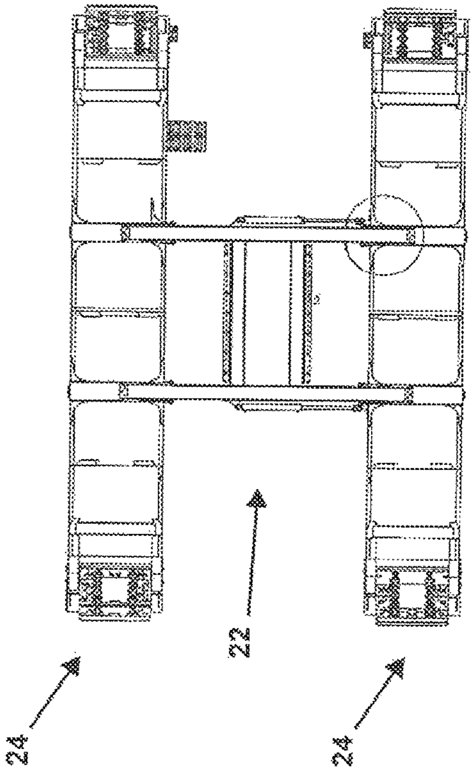
FIG. 25B is a section view of frame assembly and track assemblies shown in FIG. 25A; the section viewing showing a top elevation view of the elongated members of the frame assembly positioned within the chambers of the track assemblies; the view showing the extension assemblies of the frame assemblies to the chambers of the track assemblies; the view also showing the interior cavity of the track frame of the track assemblies and partitions positioned therein.
Figure 26:
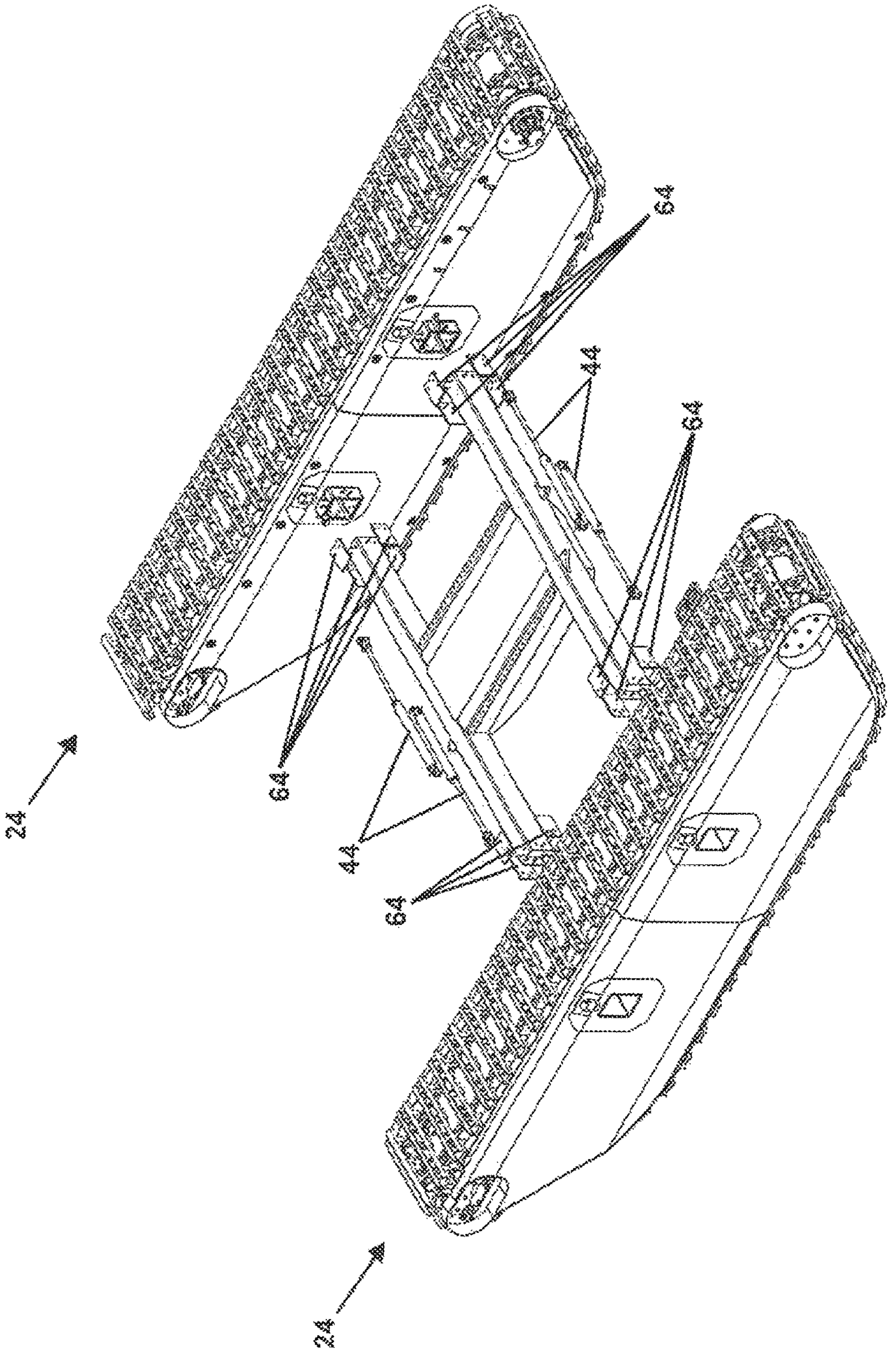
FIG. 26 is an exploded view of the frame assembly and track assemblies of a self-propelled liquid delivery vehicle; the view showing the frame assembly having elongated members and a support member; the view showing the extension assemblies of the frame assembly exploded from the elongated members and skid pads exploded from the elongated members; the view also showing the track assemblies exploded from the frame assembly.
Figure 27:
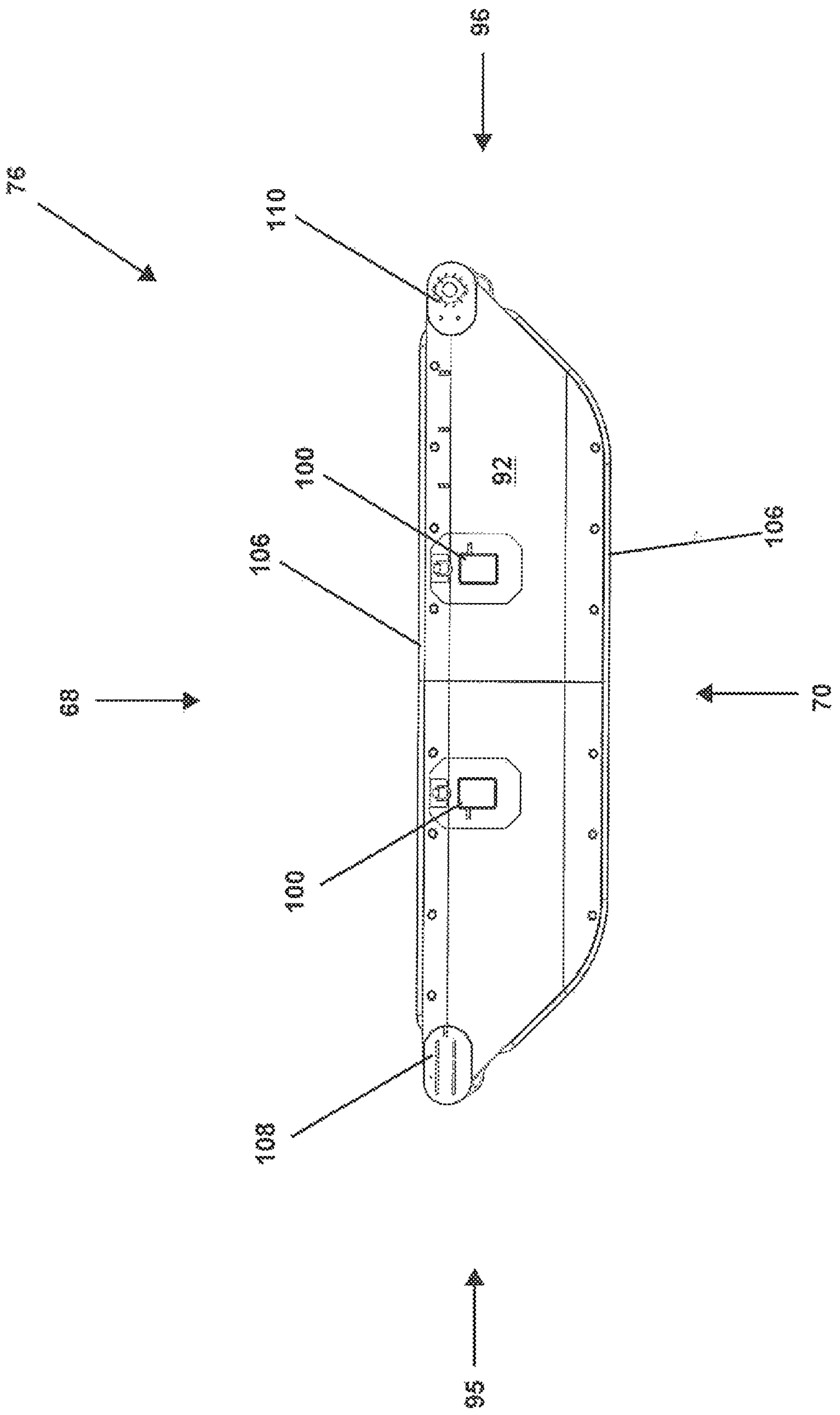
FIG. 27 is a side view of the track frame of a track assembly of a self-propelled liquid delivery vehicle; the view showing the track frame having chambers extending through the track frame, guides extending around the track frame, a forward sprocket engagement member, and a rearward sprocket engagement member.
Figure 28:
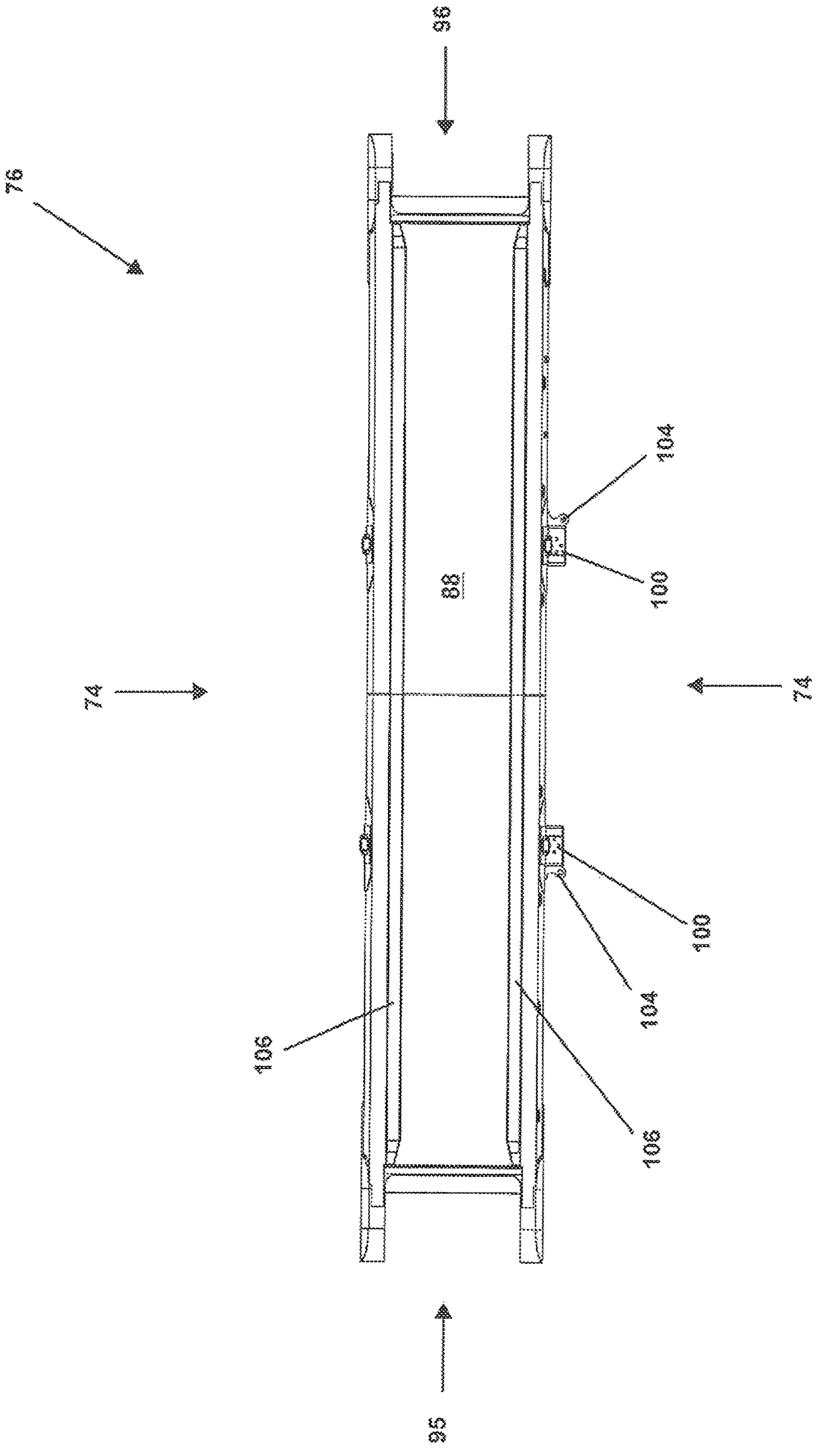
FIG. 28 is a top view of the track frame of a track assembly of a self-propelled liquid delivery vehicle; the view showing the track frame having guides on each side of the top wall of the track frame; the view also showing chambers extending through the track frame.
Figure 29:
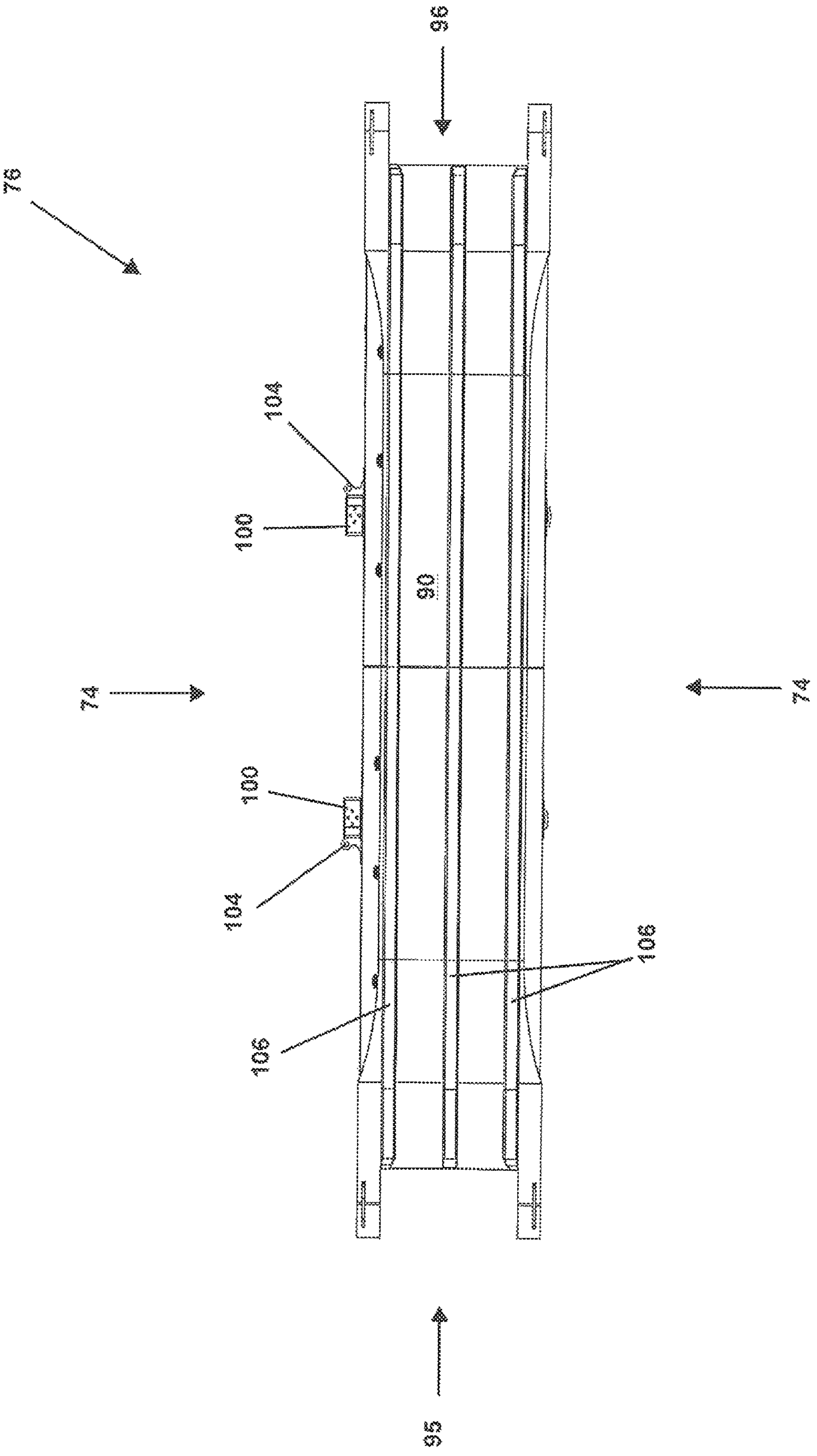
FIG. 29 is a bottom view of the track frame of a track assembly of a self-propelled liquid delivery vehicle; the view showing the track frame having guides on each side of the bottom wall of the track frame, as well as a third guide located near the center of the bottom wall of the track frame; the view also showing chambers extending through the track frame.
Figure 30B:
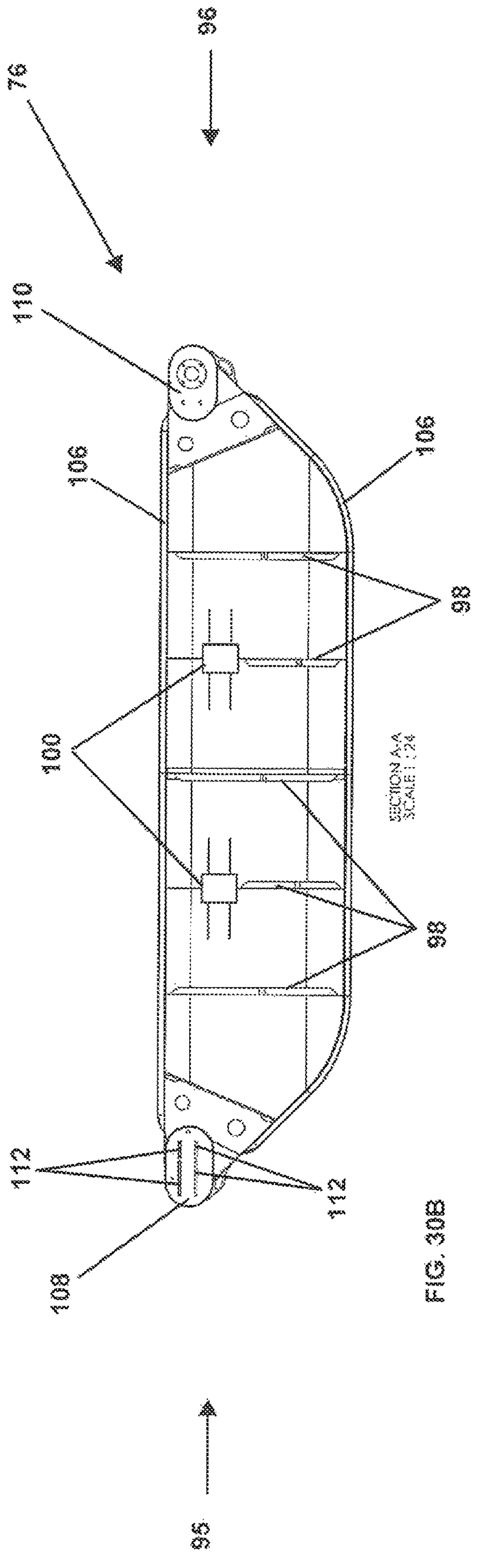
FIG. 30B is a section view of the track frame shown in FIG. 30A; the section view showing a side elevation view of the track frame; the view showing the track frame having chambers, a forward sprocket engagement member, a rearward sprocket engagement member, guides, and an interior cavity with partitions positioned in the interior cavity of the track frame.
Figure 30A:
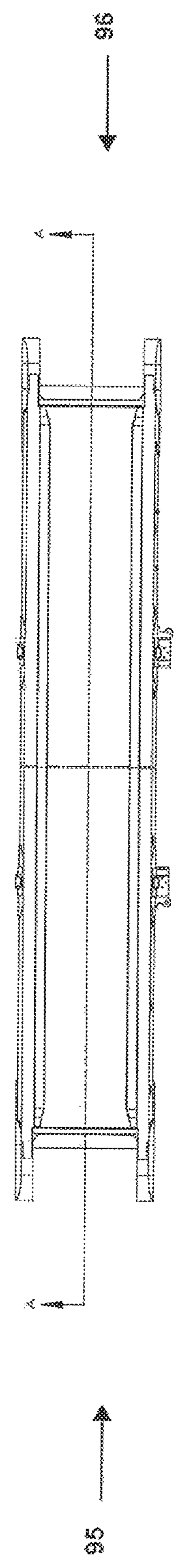
FIG. 30A is another top view of the track frame of a track assembly of a self-propelled liquid delivery vehicle; the view showing the track frame having guides on each side of the top wall of the track frame; the view also showing chambers extending through the track frame.
Figure 31:
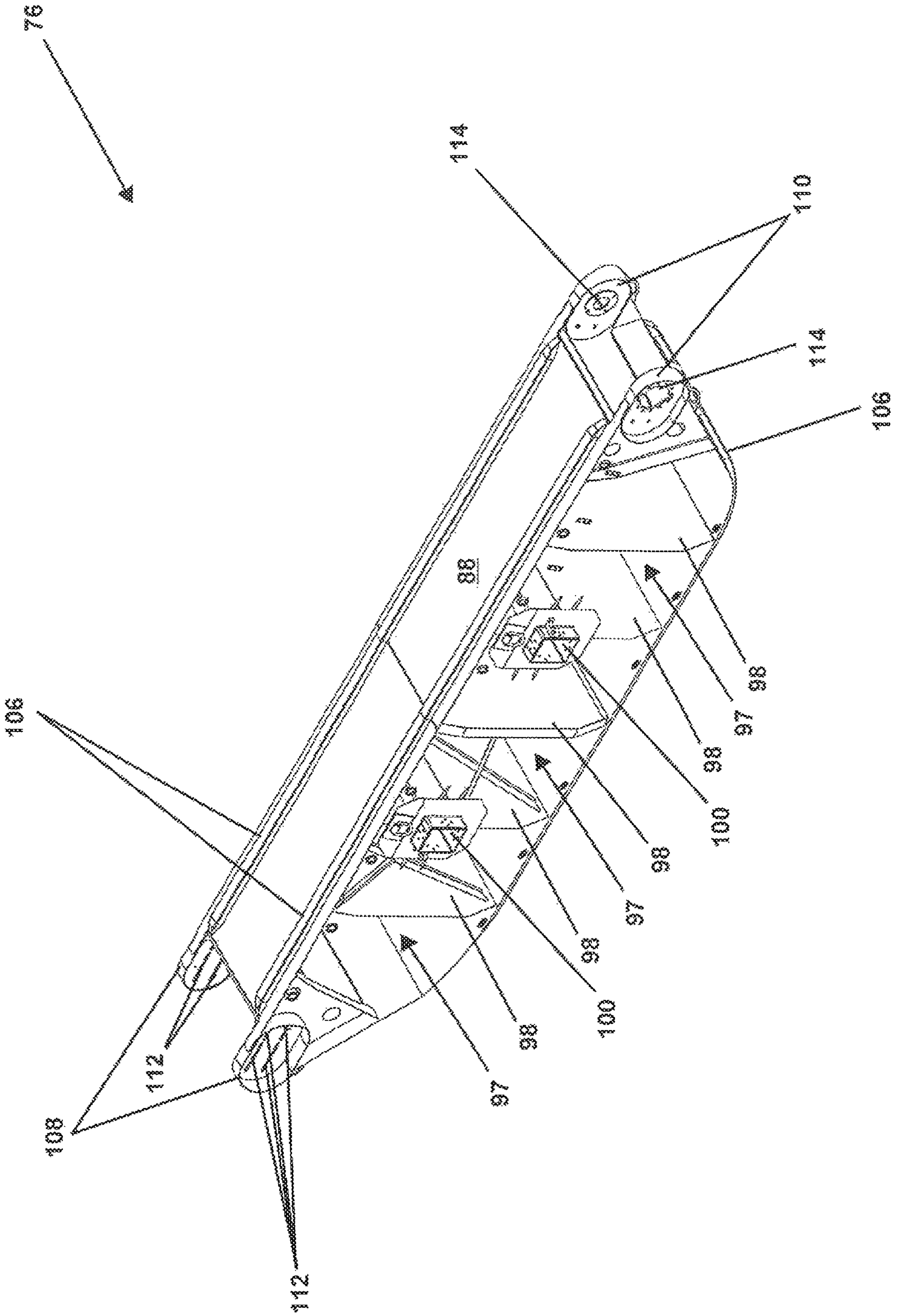
FIG. 31 is section view of a track frame of a track assembly of a self-propelled liquid delivery vehicle; the section view showing a perspective of the track frame; the view showing the track frame having chambers, forward sprocket engagement members, rearward sprocket engagement members, guides, and an interior cavity with partitions positioned in the interior cavity of the track frame.
Figure 32:
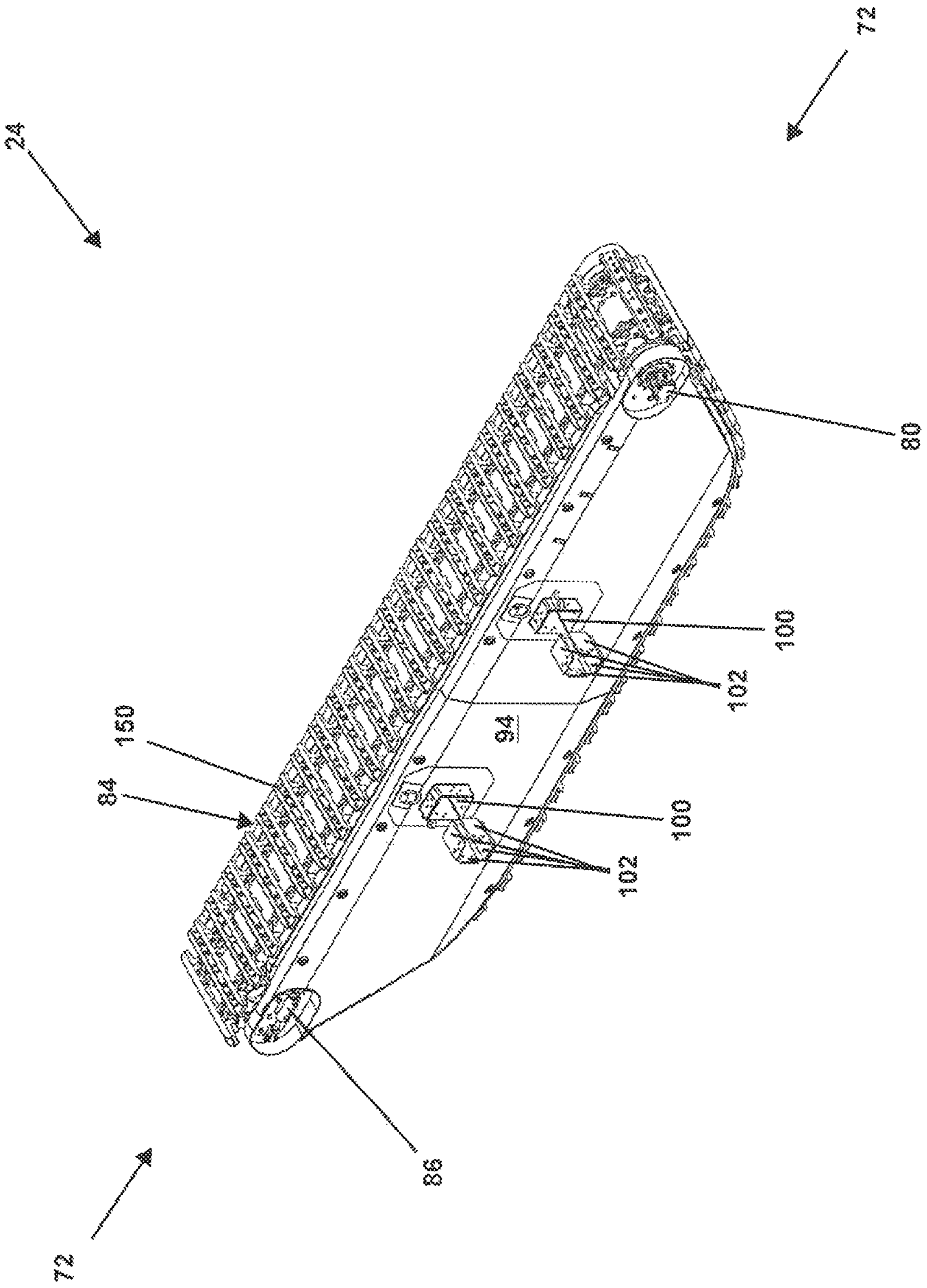
FIG. 32 is a perspective view of a track assembly of a self-propelled liquid delivery vehicle; the view showing the track assembly having a track frame with tracks extending around the track frame; the view showing the track frame having chambers with skid pads exploded from the chambers; the view also showing a tensioning mechanism attached to a forward sprocket engagement member and a sprocket motor attached to a rearward sprocket engagement member.
Figure 33B:
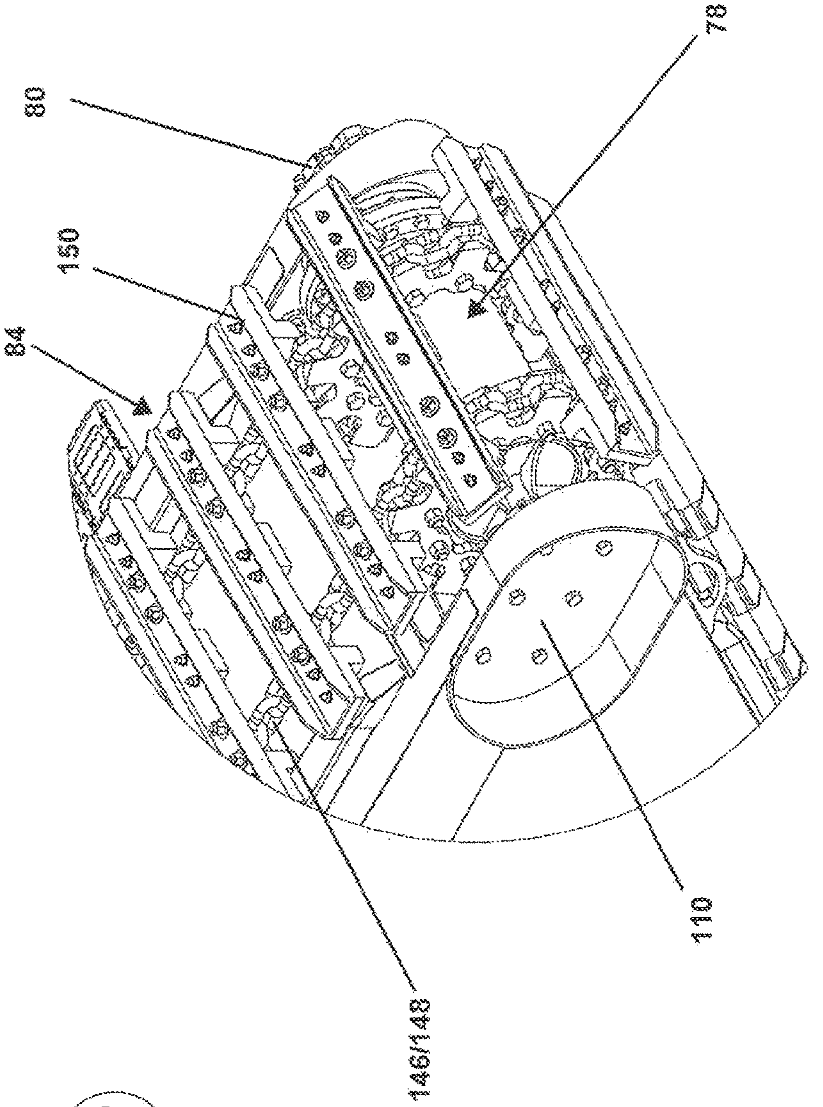
FIG. 33B is a detail view of the track assembly shown in FIG. 33A; the view showing a close-up view of the first sprocket assembly connected to the sprocket motor; the view showing the first sprocket assembly engaging the chain of the tracks; the view also showing the tracks having cleats connected to the chain.
Figure 33A:
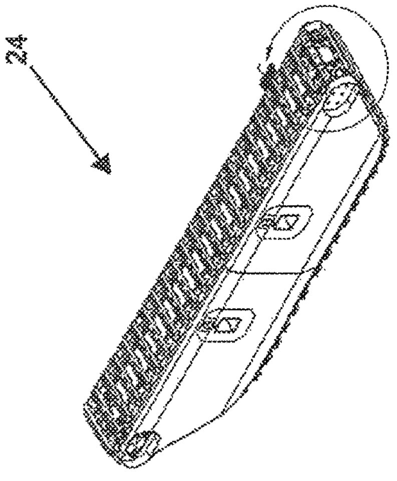
FIG. 33A is a perspective view of a track assembly of a self-propelled liquid delivery vehicle; the view showing the track assemblies having a track frame, tracks, and a first sprocket assembly connected to a sprocket motor.
Figure 34B:
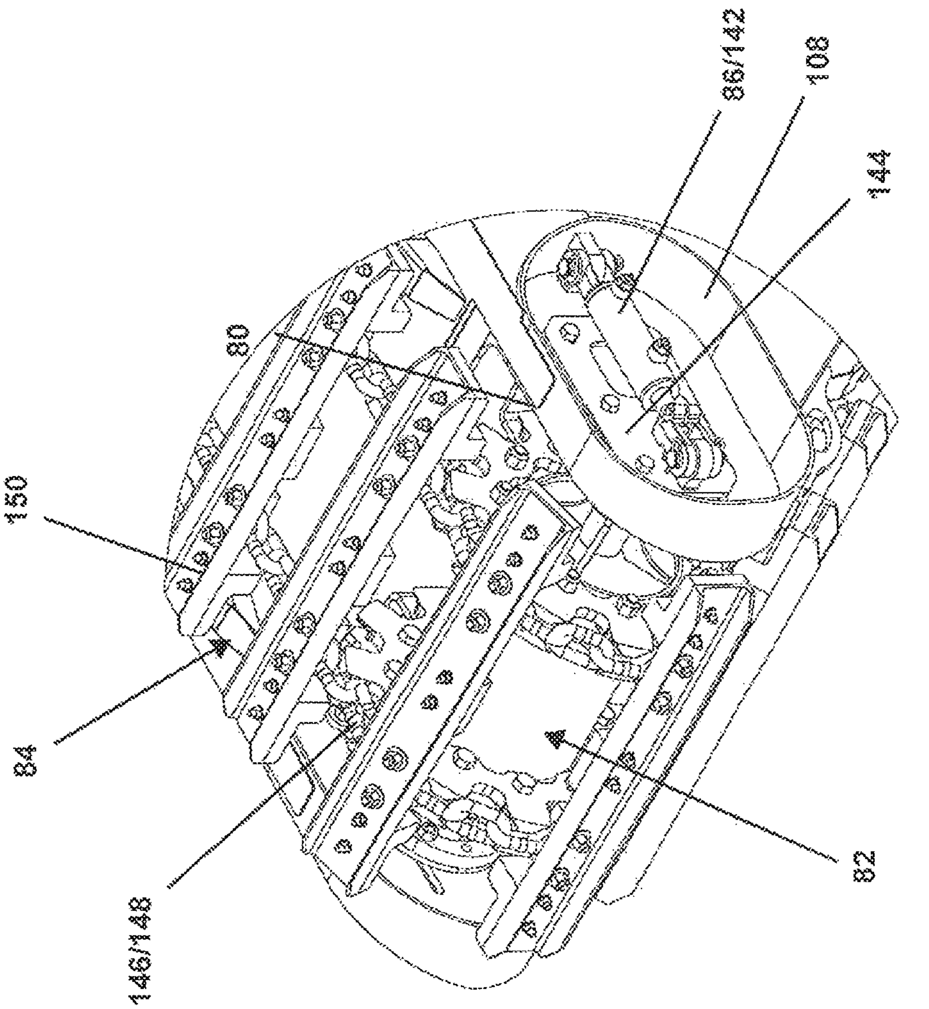
FIG. 34B is a detail view of the track assembly shown in FIG. 34A; the view showing a close-up view of the second sprocket assembly connected to the tensioning member; the view showing the second sprocket assembly engaging the chain of the tracks; the view also showing the tracks having cleats connected to the chain.
Figure 34A:
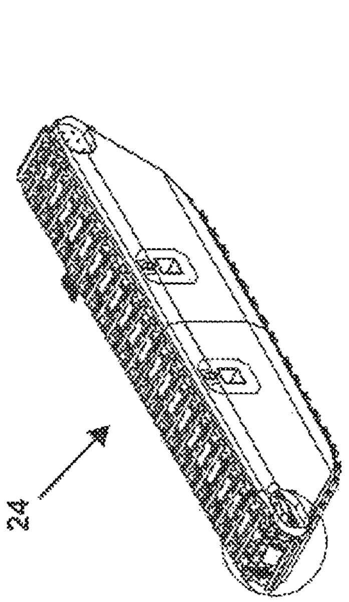
FIG. 34A is a perspective view of a track assembly of a self-propelled liquid delivery vehicle; the view showing the track assemblies having a track frame, tracks, and a second sprocket assembly connected to a tensioning mechanism.
Figure 35A:
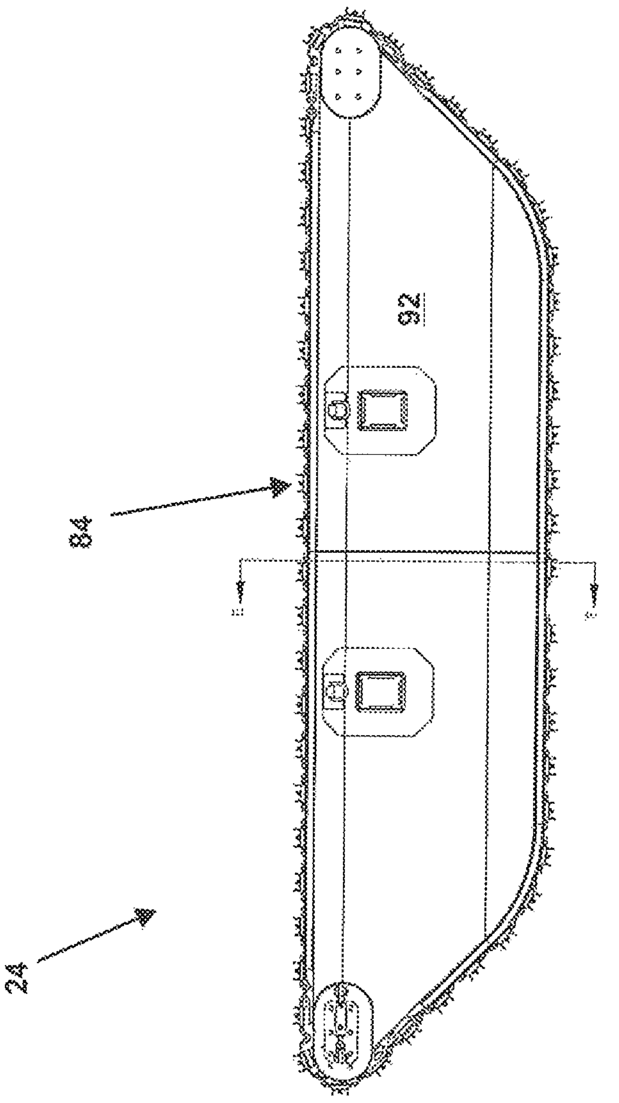
FIG. 35A is a side elevation view of a track assembly of a self-propelled liquid delivery vehicle; the view showing the track assembly having a track frame with chambers, tracks, a forward sprocket engagement member with a tensioning mechanism connected thereto, and a rearward sprocket engagement member.
Figure 35B:
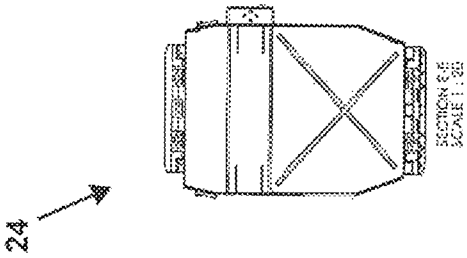
FIG. 35B is a section view of the track assembly shown in FIG. 35A; the section view showing a front elevation view of the track assembly having a track frame with an interior cavity and partitions therein; the section view also showing tracks extending around the track frame.
Figure 36:
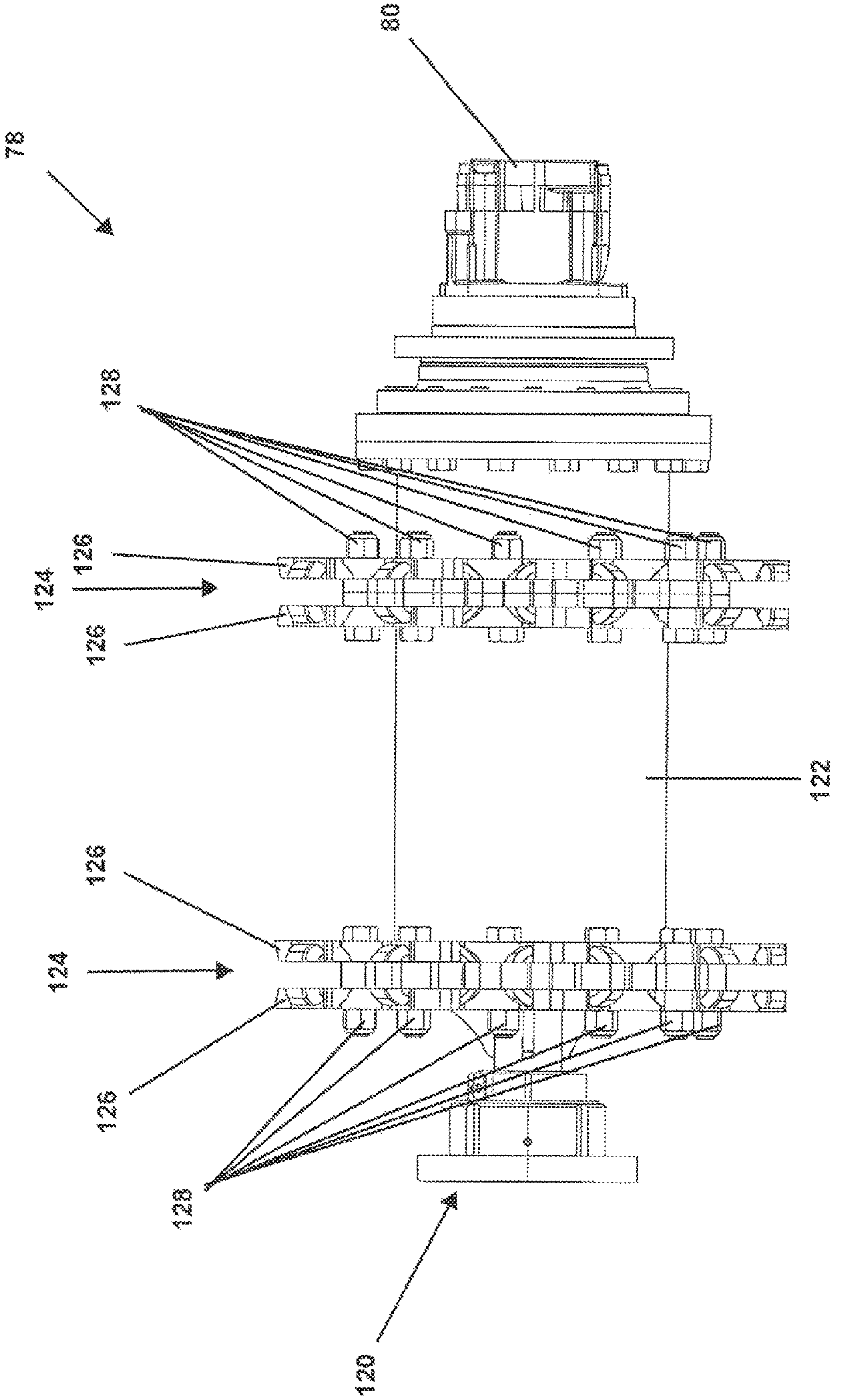
FIG. 36 is an elevation view of a sprocket assembly of a track assembly of a self-propelled liquid delivery vehicle; the view showing the sprocket assembly having a pair of sprockets formed of a pair of plates connected by fasteners; the view showing the sprocket assembly having a roller and a bearing; the view also showing the sprocket assembly connected to a sprocket motor.
Figure 37:
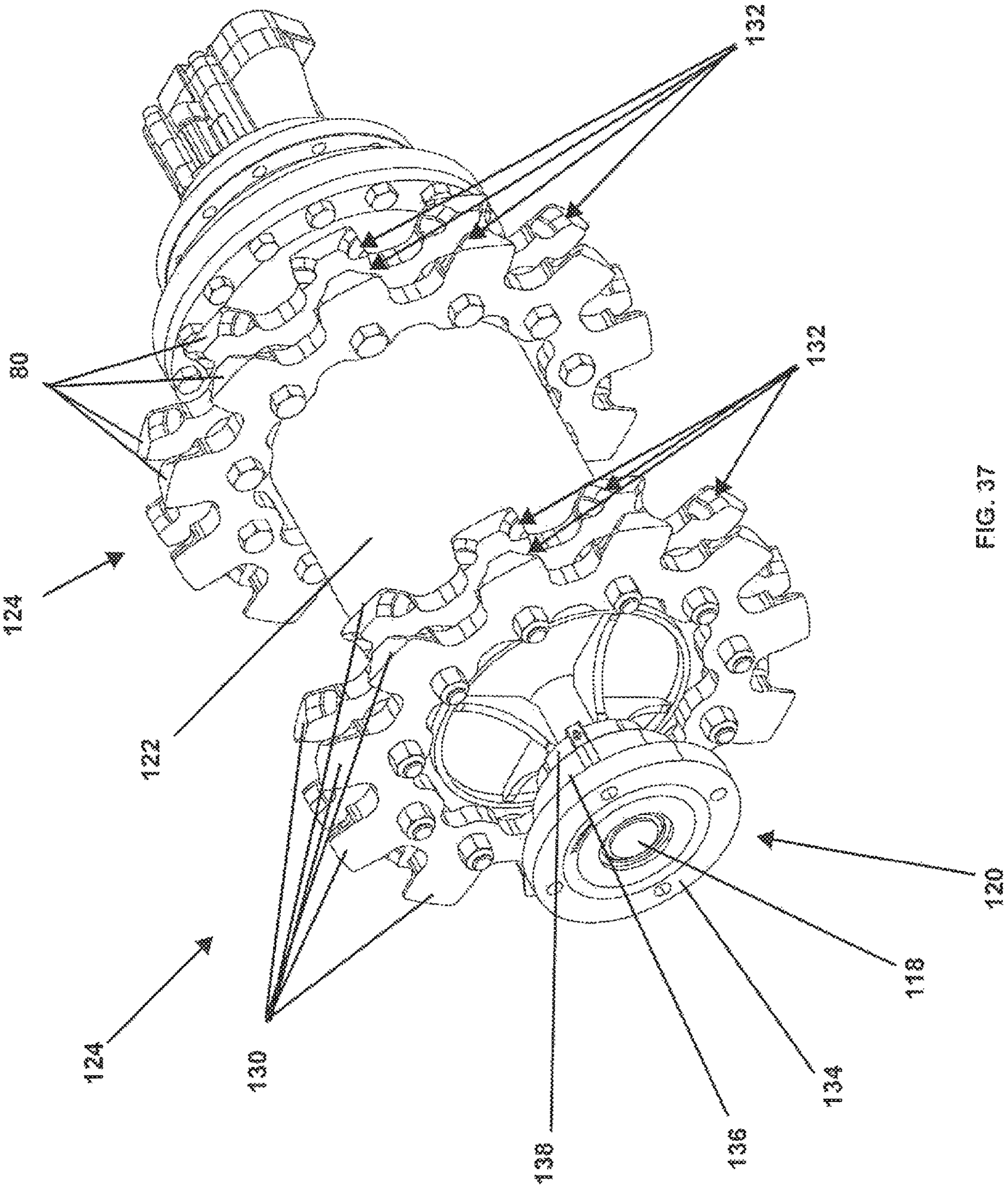
FIG. 37 is a perspective view of a sprocket assembly of a track assembly of a self-propelled liquid delivery vehicle; the view showing the sprocket assembly having a pair of sprockets formed of a pair of plates, with each plate having protrusions and the protrusions having contours; the view showing the sprocket assembly having a roller; the view showing the sprocket assembly having a bearing; the view also showing an axle extending through the bearing, pair of sprockets, and the roller of the sprocket assembly.
Figures 38A, 38B:
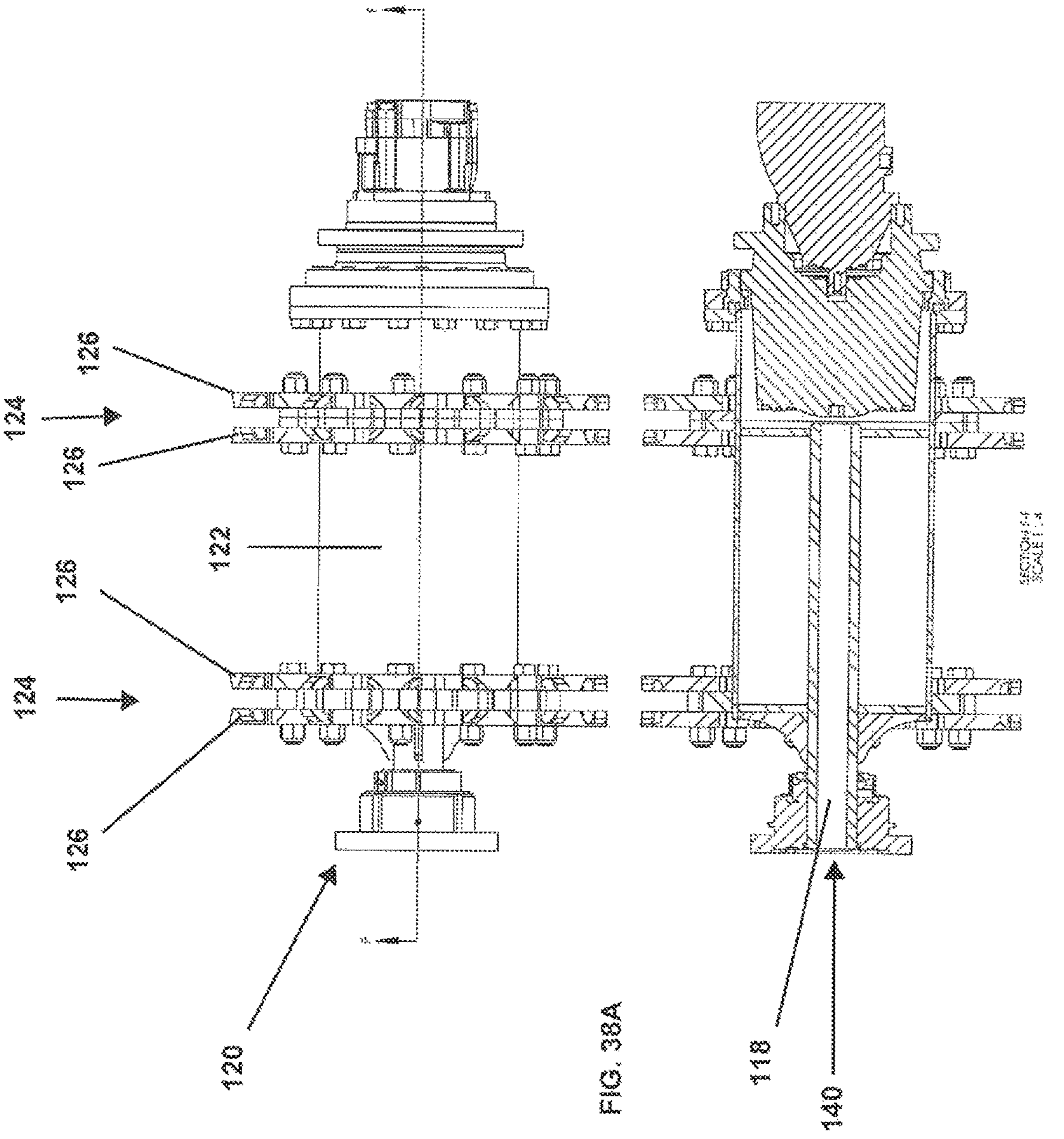
FIG. 38A is another elevation view of a sprocket assembly of a track assembly of a self-propelled liquid delivery vehicle; the view showing the sprocket assembly having a pair of sprockets formed of a pair of plates connected by fasteners; the view showing the sprocket assembly having a roller and a bearing; the view also showing the sprocket assembly connected to a sprocket motor.
FIG. 38B is a section view of the sprocket assembly shown in FIG. 38A; the section view shown an axle extending through the interior of the bearing, pair of sprockets, and the roller of the sprocket assembly; the view also showing the connection between the sprocket assembly and a sprocket motor.
Figures 39A, 39B:
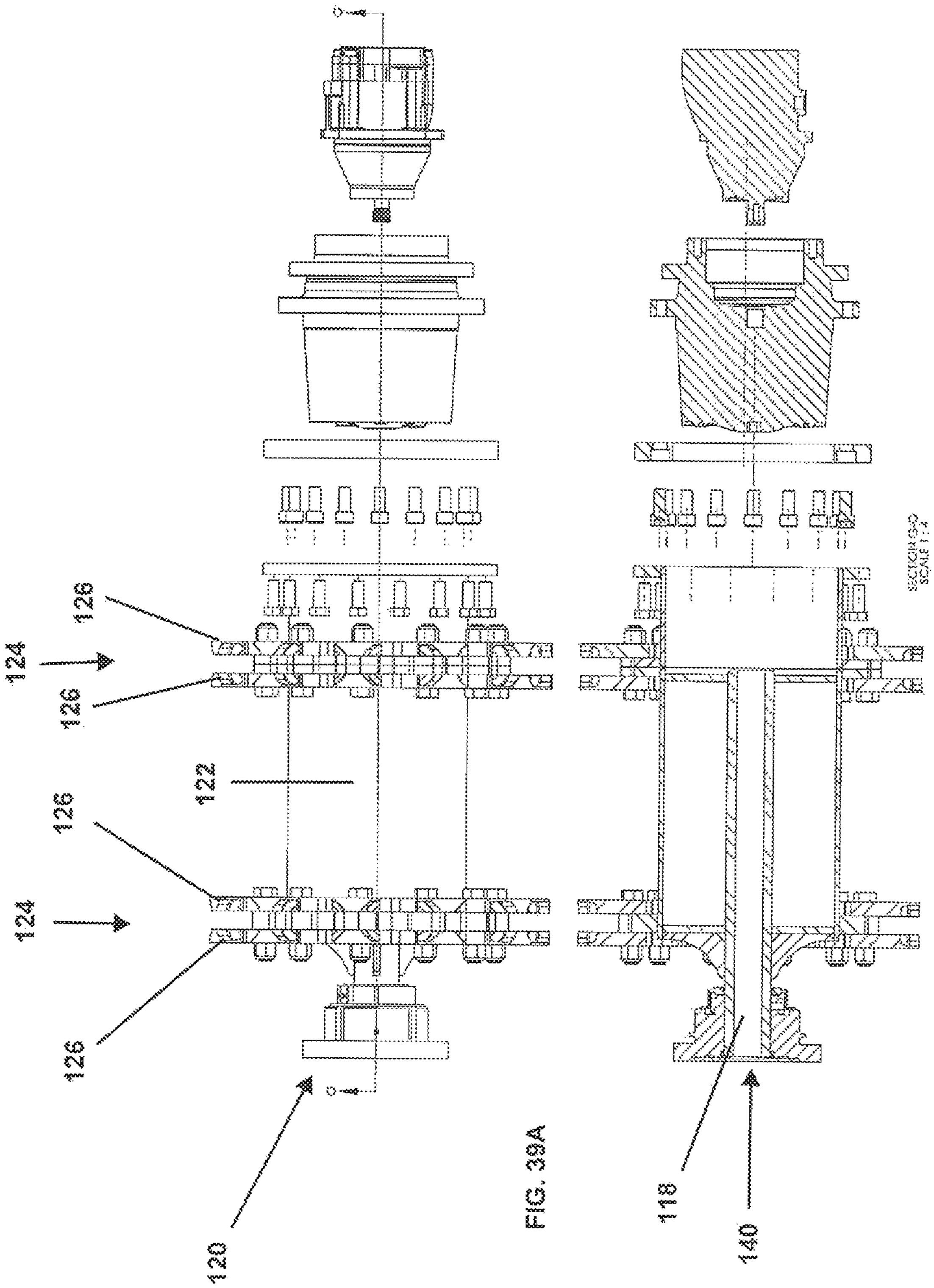
FIG. 39A is an exploded view of a first sprocket assembly of a track assembly of a self-propelled liquid delivery vehicle; the view showing the sprocket assembly having a pair of sprockets formed of a pair of plates connected by fasteners; the view showing the sprocket assembly having a roller and a bearing; the view also showing a sprocket motor exploded from the first sprocket assembly.
FIG. 39B is a section view of the first sprocket assembly shown in FIG. 39A; the view showing an axle extending through the interior of the bearing, pair of sprockets, and the roller of the sprocket assembly; the view also showing a sprocket motor exploded from the first sprocket assembly.
Figure 40A:
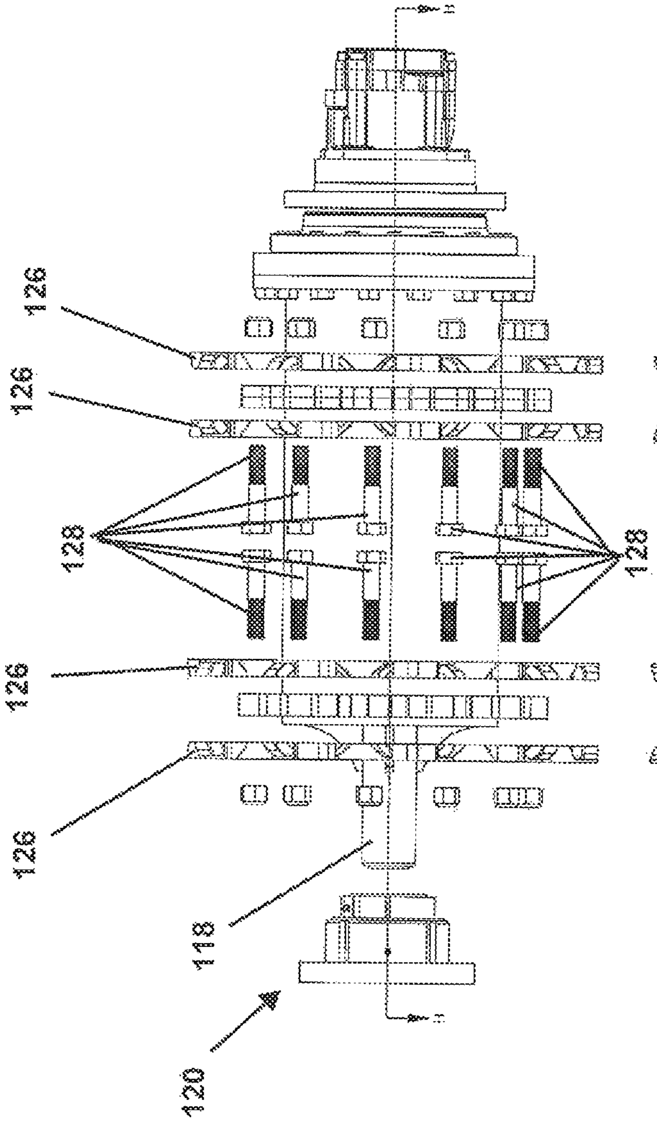
FIG. 40A is another exploded view of a first sprocket assembly; the view showing the first sprocket assembly having a bearing exploded the roller and sprockets of the first sprocket assembly; the view showing a pair of sprocket assemblies, the sprocket assemblies formed of a pair of plates exploded from each other which are connected by fasteners shown exploded from the pair of plates; the view also showing an axle extending through a portion of the first sprocket assembly.
Figure 40B:
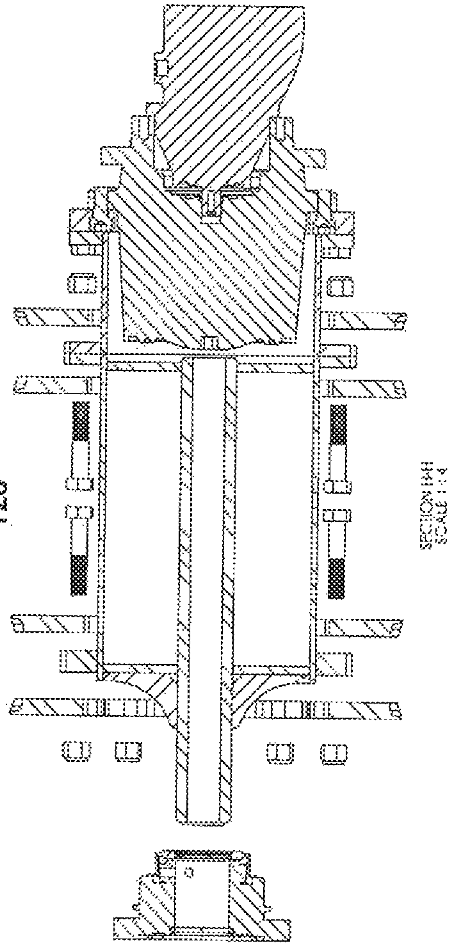
FIG. 40B is a section view of the first sprocket assembly shown in FIG. 40A; the view showing the axle extending through the roller of the first sprocket assembly and the bearing exploded from the axle and the roller; the view also showing the pair of sprockets exploded to show the pair of plates and fasteners that make up each sprocket.
Figure 41:
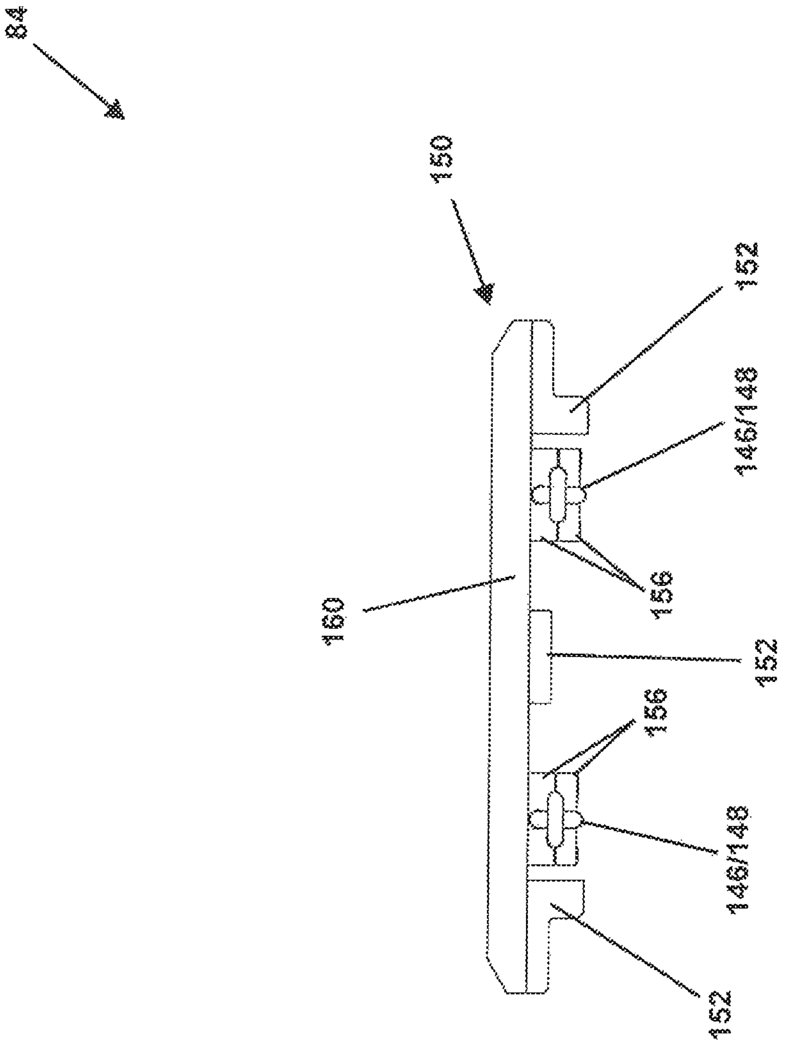
FIG. 41 is a front elevation view of a portion of the tracks of a track assembly of a self-propelled liquid delivery vehicle; the view showing the tracks having a cleat connected to a chain formed of links; the view showing the cleat connected to the chain via saddle washers; the view also showing wear blocks connected to the cleat.
Figure 42:
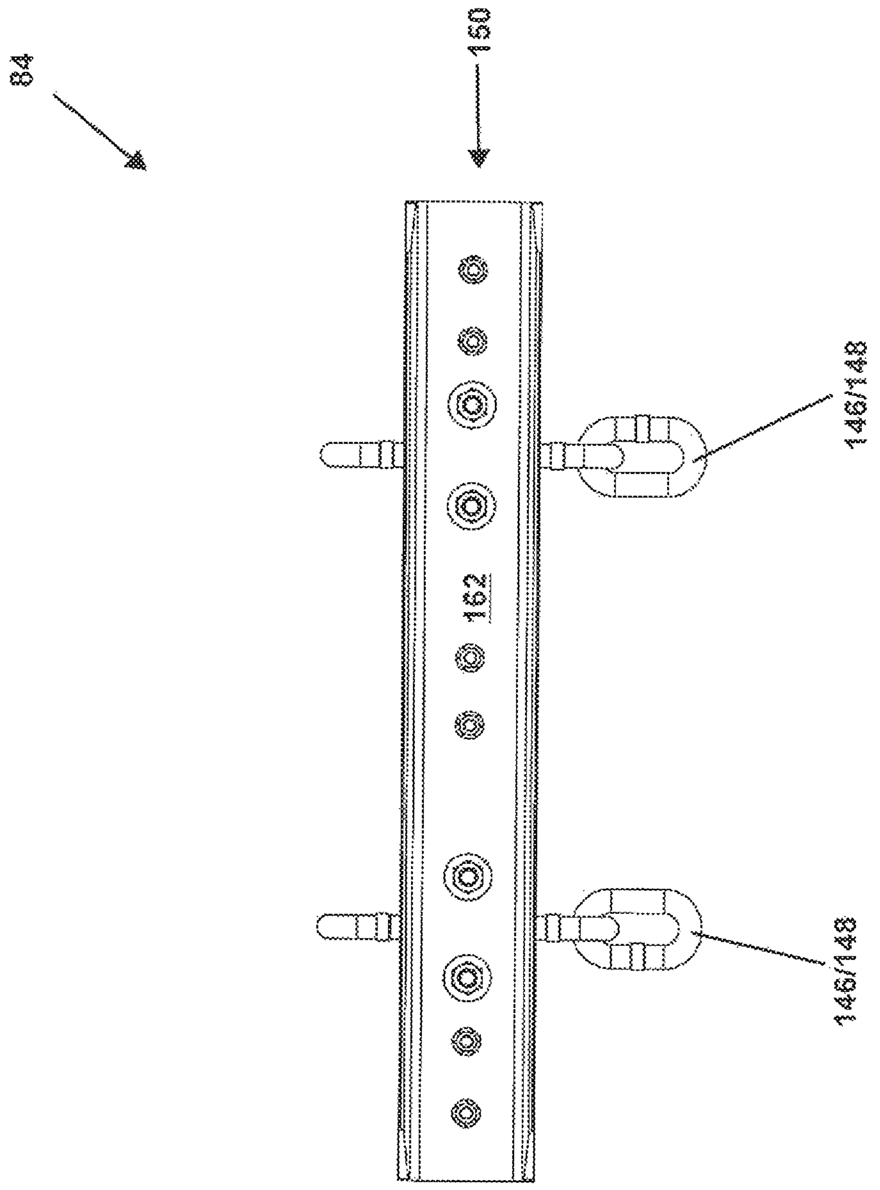
FIG. 42 is a top elevation view of a portion of the tracks of a track assembly of a self-propelled liquid delivery vehicle; the view showing the tracks having a cleat connected to a chain formed of links.
Figure 43:
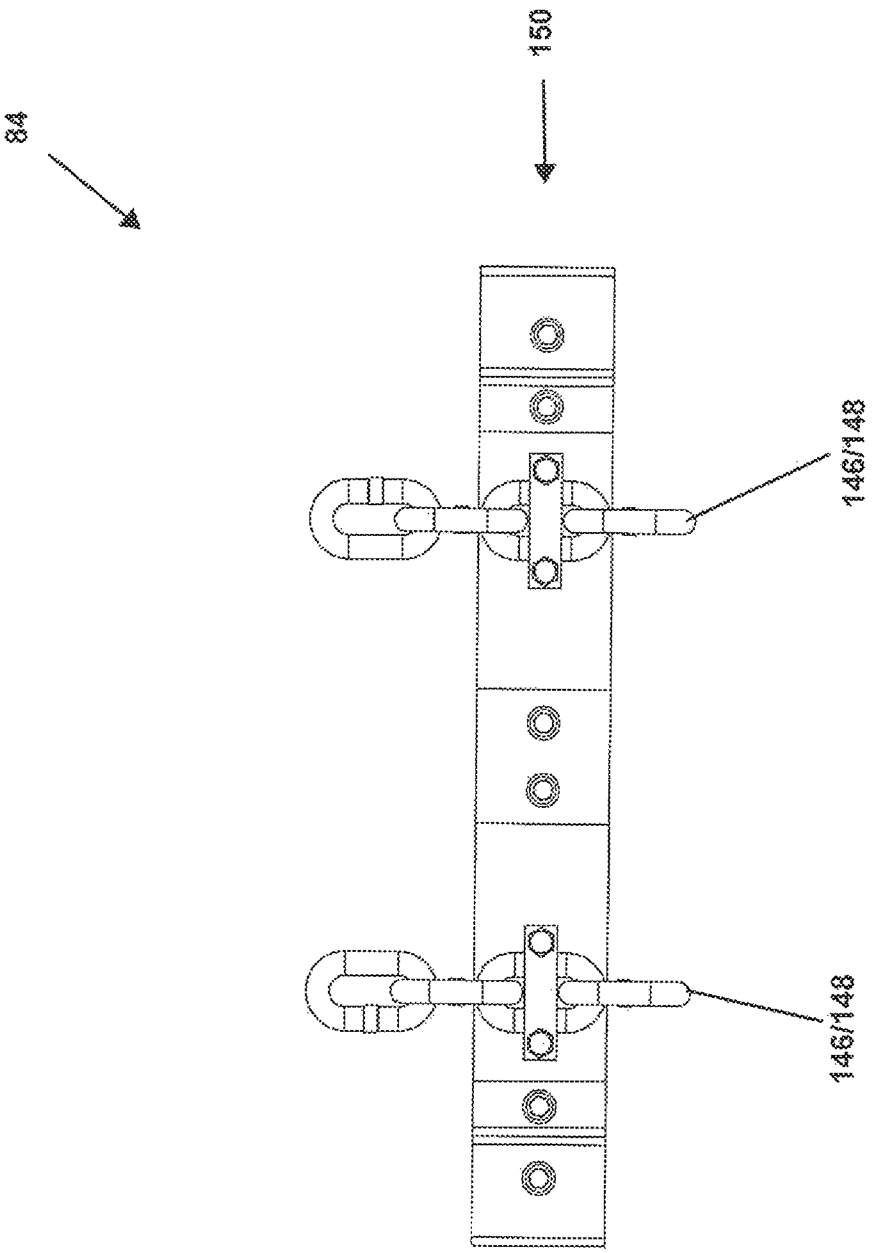
FIG. 43 is a bottom elevation view of a portion of the tracks of a track assembly of a self-propelled liquid delivery vehicle; the view showing the tracks having a cleat connected to a chain formed of links; the view showing the cleat connected to the chain via saddle washers.
Figure 44:
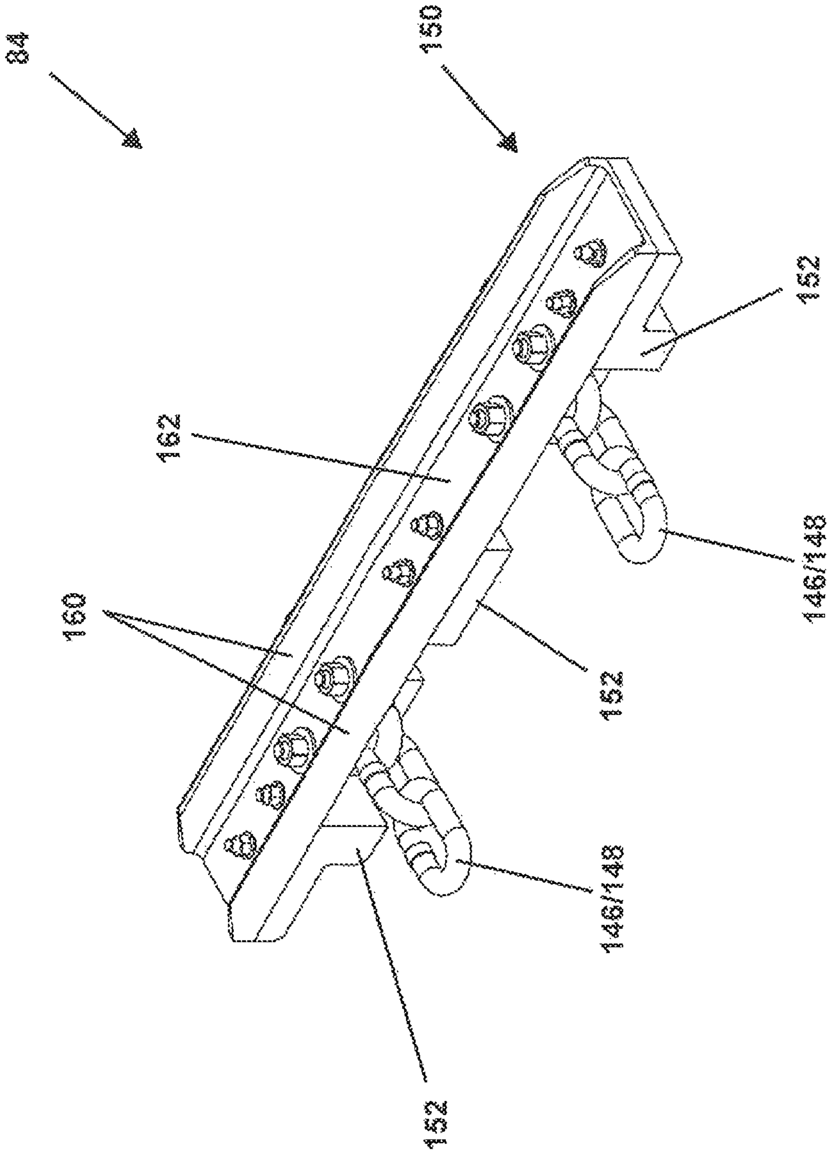
FIG. 44 is a perspective view of a portion of the tracks of a track assembly of a self-propelled liquid delivery vehicle; the view showing the tracks having a cleat connected to a chain formed of links; the view showing the cleat having outer walls and a bottom wall; the view showing the cleat connected to the chain via saddle washers; the view also showing wear blocks connected to the cleat.
Figure 45:
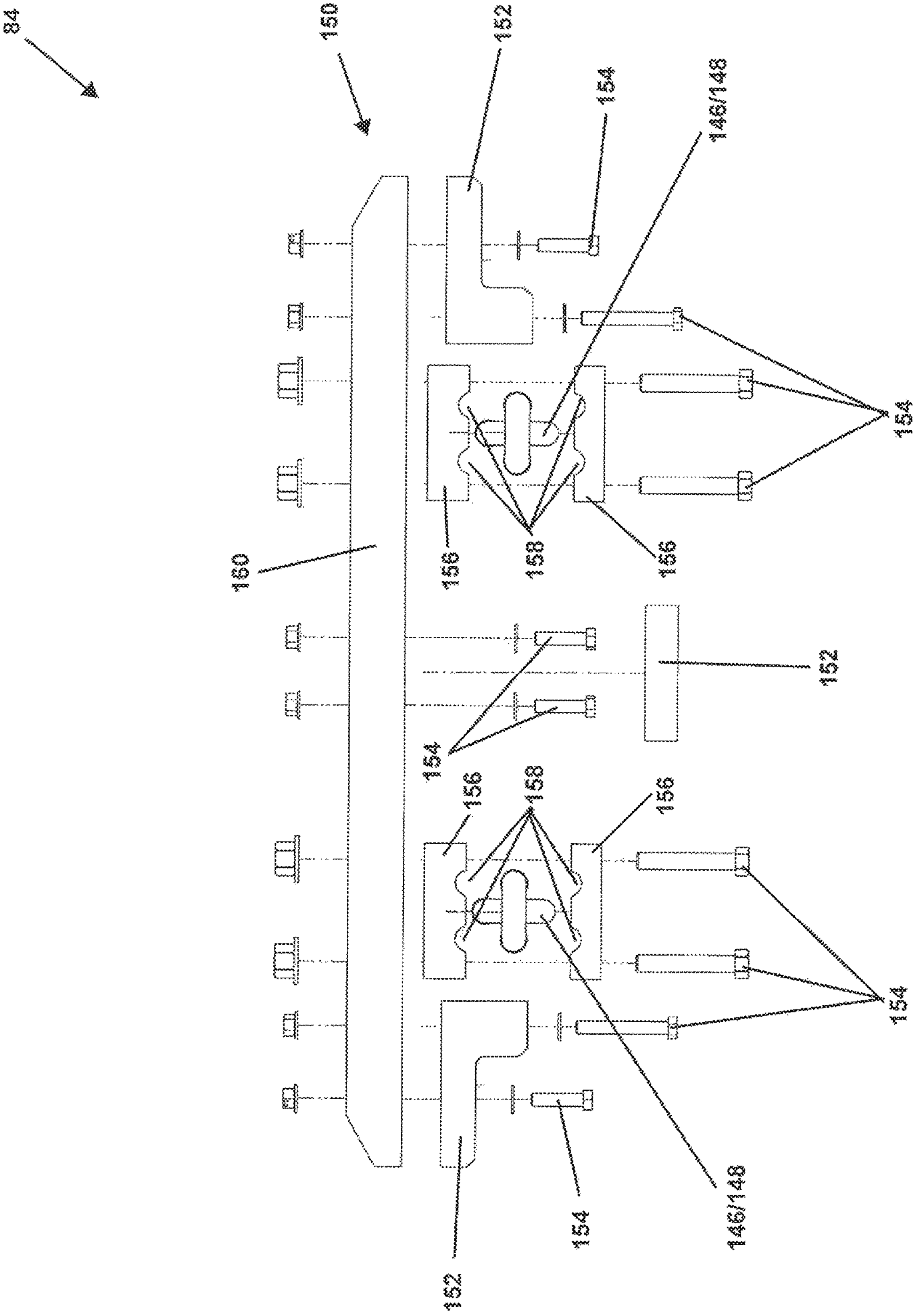
FIG. 45 is an exploded view of a portion of the tracks of a track assembly of a self-propelled liquid delivery vehicle; the view showing the tracks having a cleat which is shown exploded from the chain and wear blocks of the tracks; the view also showing saddle washers exploded from the cleat and the chain; the view also showing fasteners exploded from the clean, saddle washers, and wear blocks.
Figure 46A:
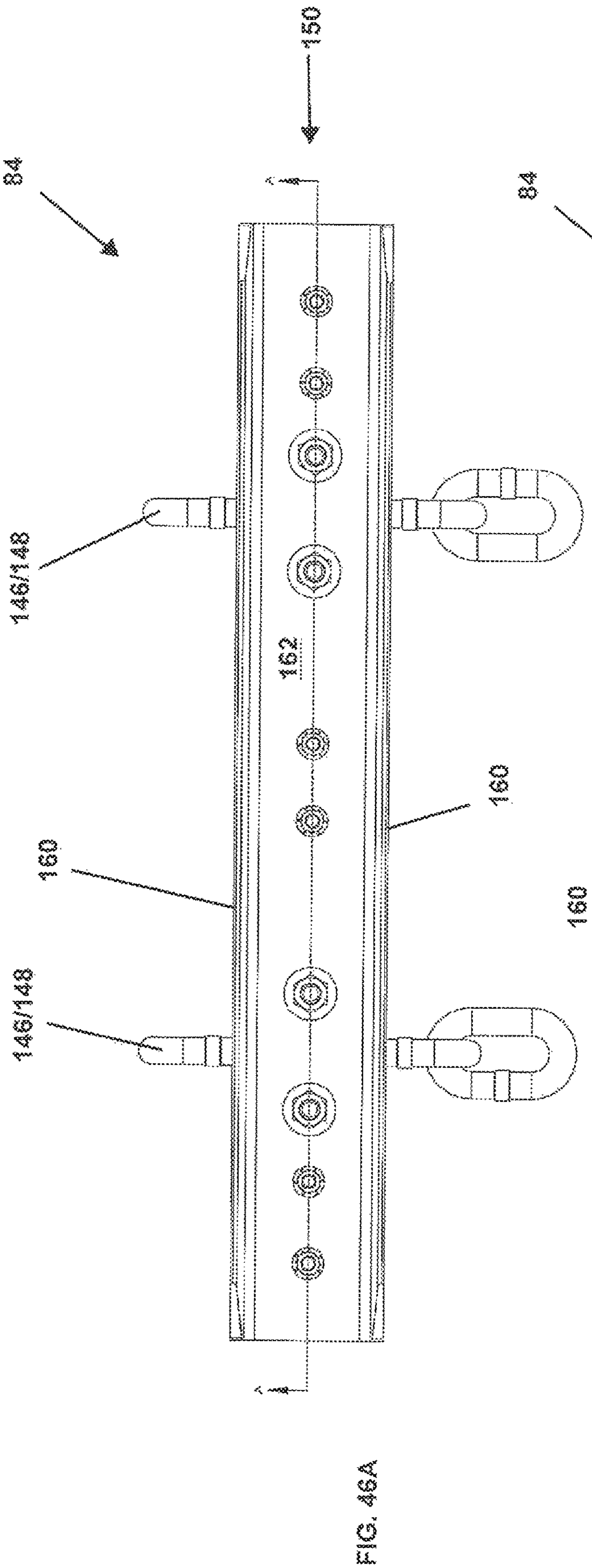
FIG. 46A is a top elevation view of a portion of the tracks of a track assembly of a self-propelled liquid delivery vehicle; the view showing the tracks having a cleat connected to a chain formed of links.
Figure 46B:
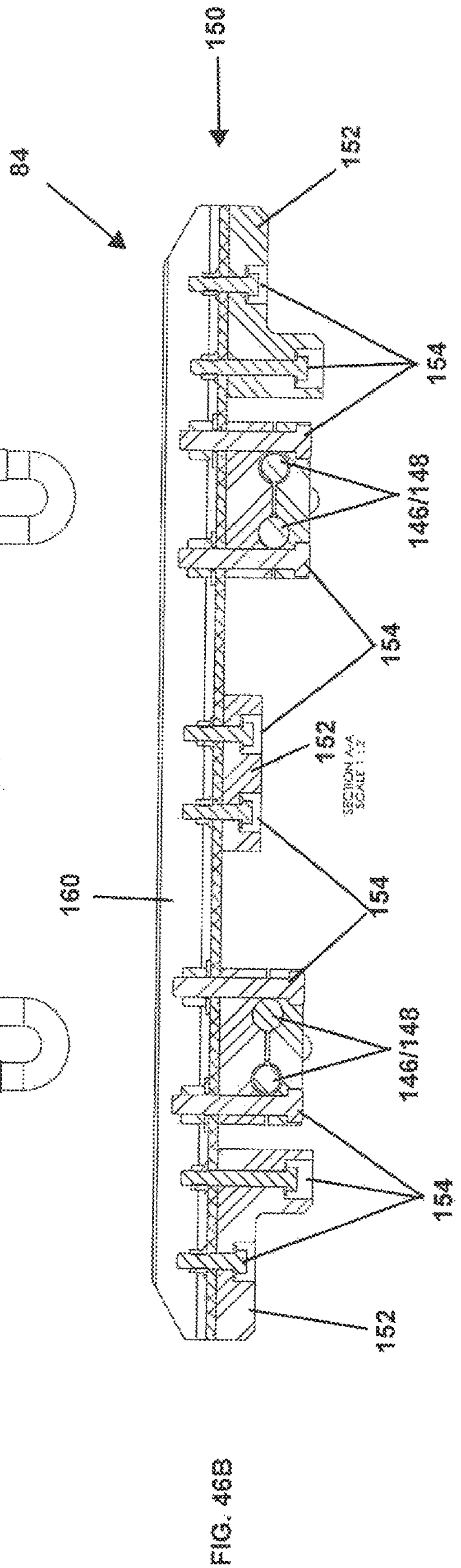
FIG. 46B is a section view of the portion of the tracks shown in FIG. 46B; the section view showing fasteners extending through wear blocks and into the cleat in order to connect the wear blocks to the cleat; the view also showing chains formed of links positioned in between saddle washers and fasteners extending through the saddle washers and into the cleat in order to connect the chain to the cleat.
Figure 47:
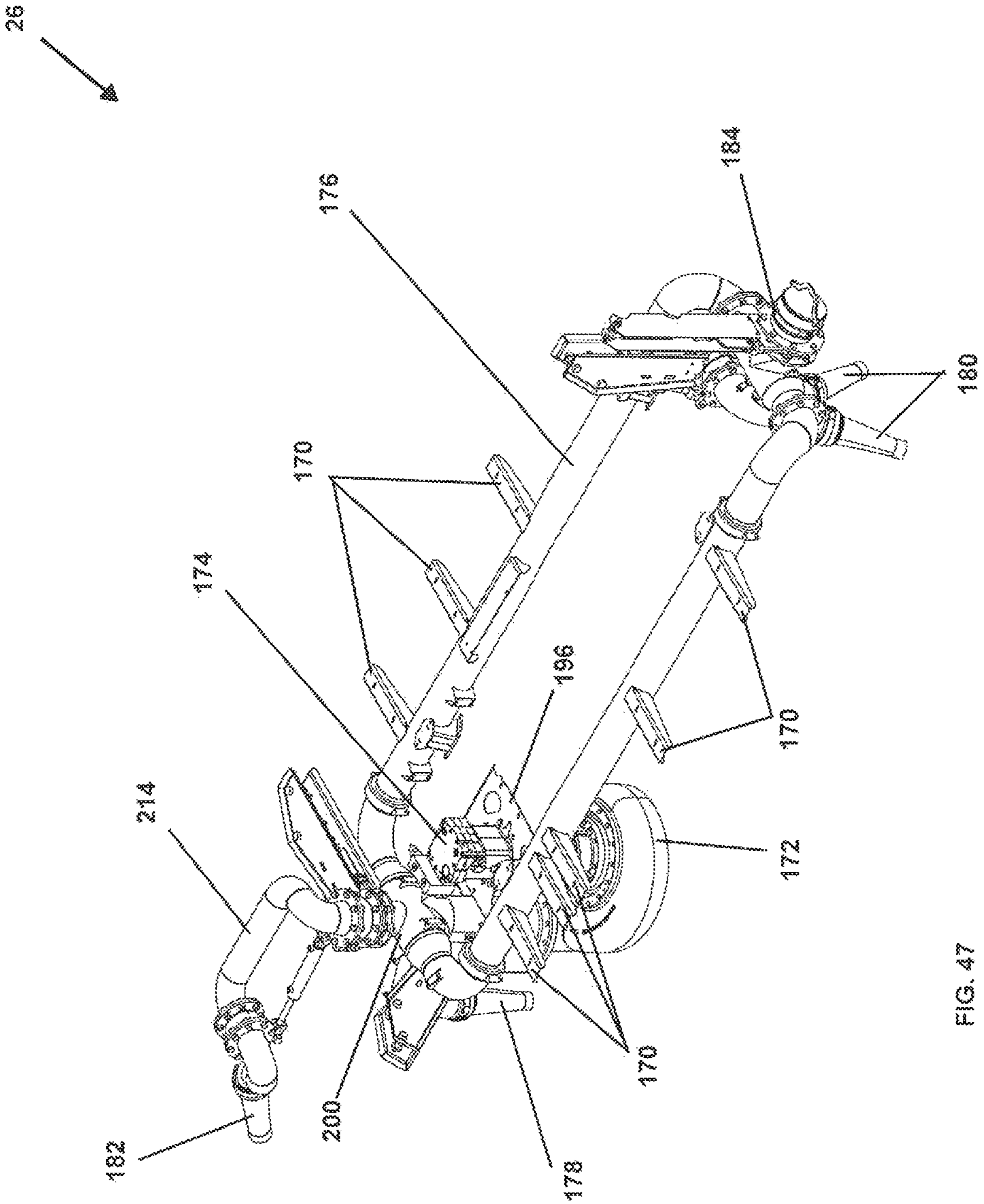
FIG. 47 is a rear perspective view of a liquid delivery system of a self-propelled liquid delivery vehicle; the view showing the liquid delivery system having a conduit forming a continuous loop; the view also showing a reservoir pump with a reservoir pump motor, a first nozzle, a second set of nozzles, a third nozzle, and an outflow hookup all connected to the conduit of the liquid delivery system.
Figure 48:
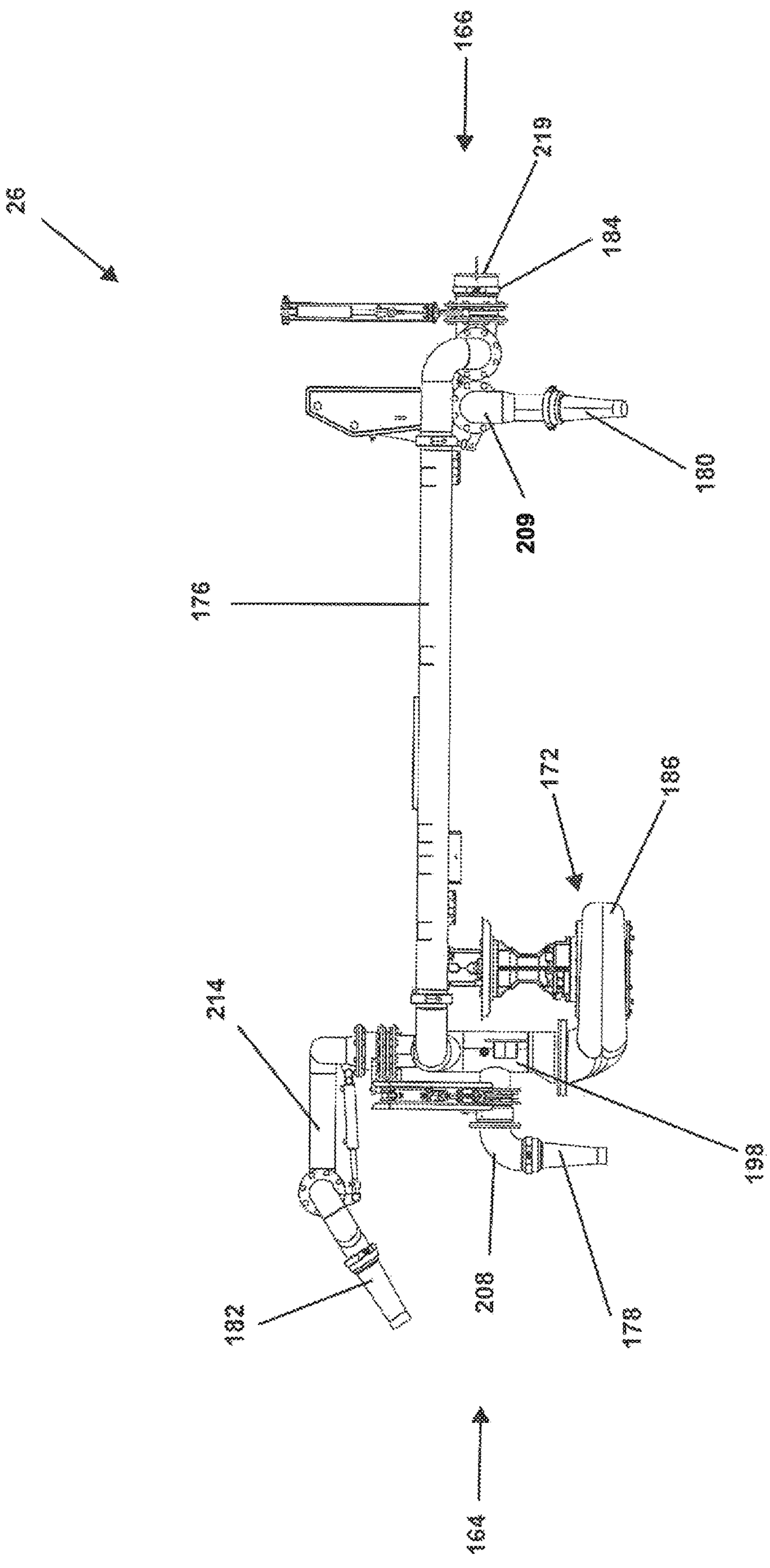
FIG. 48 is a side elevation view of a liquid delivery system of a self-propelled liquid delivery vehicle; the view showing the liquid delivery system having a conduit; the view also showing the liquid delivery system having a reservoir pump with a reservoir pump motor, a first nozzle, a second set of nozzles, a third nozzle, and an outflow hookup all connected to the conduit.
Figure 49:
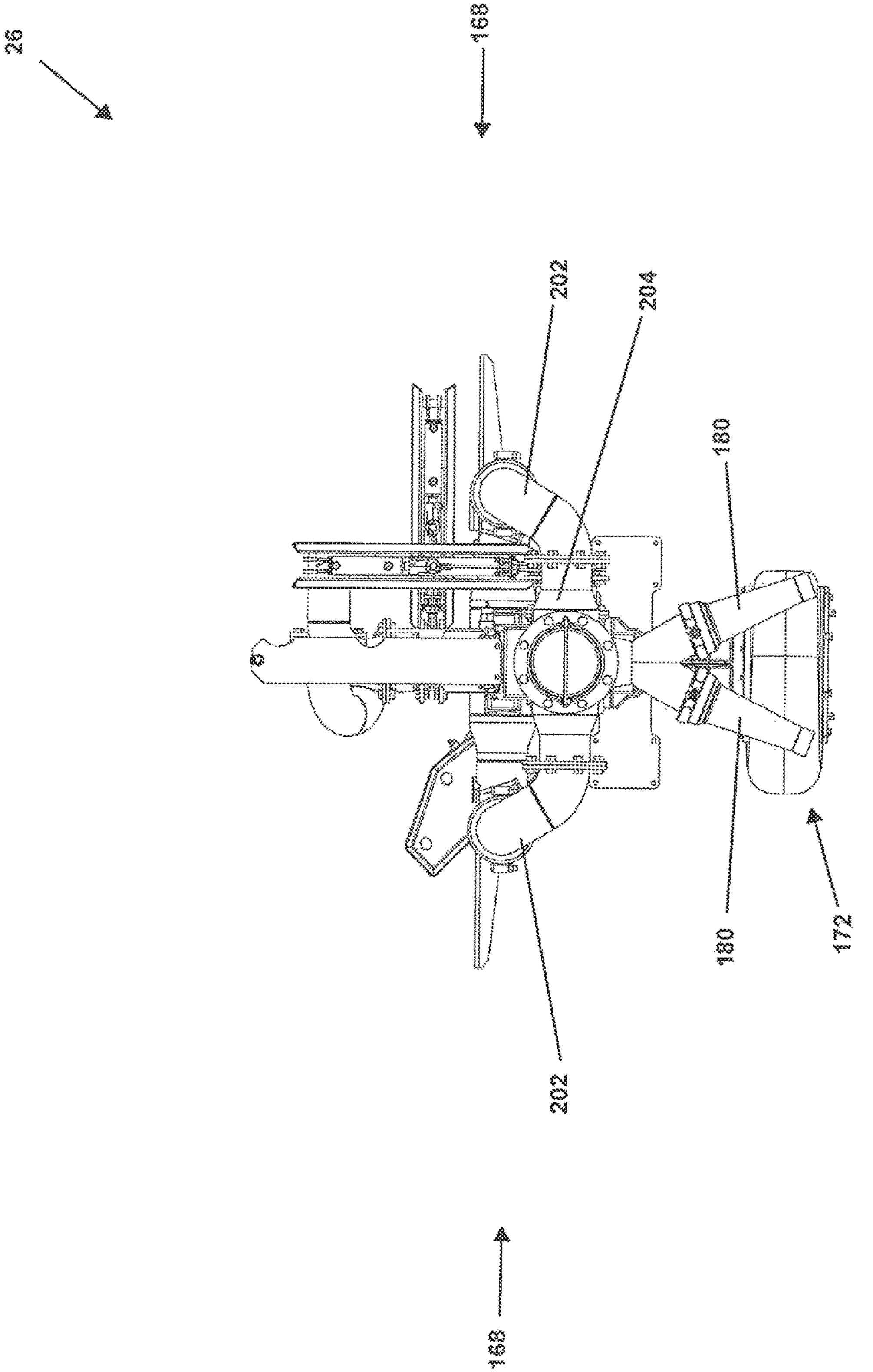
FIG. 49 is a rear elevation view of a liquid delivery system of a self-propelled liquid delivery vehicle; the view showing the liquid delivery system having a conduit; the view also showing the liquid delivery system having a reservoir pump, a second set of nozzles, and an outflow hookup.
Figure 50:
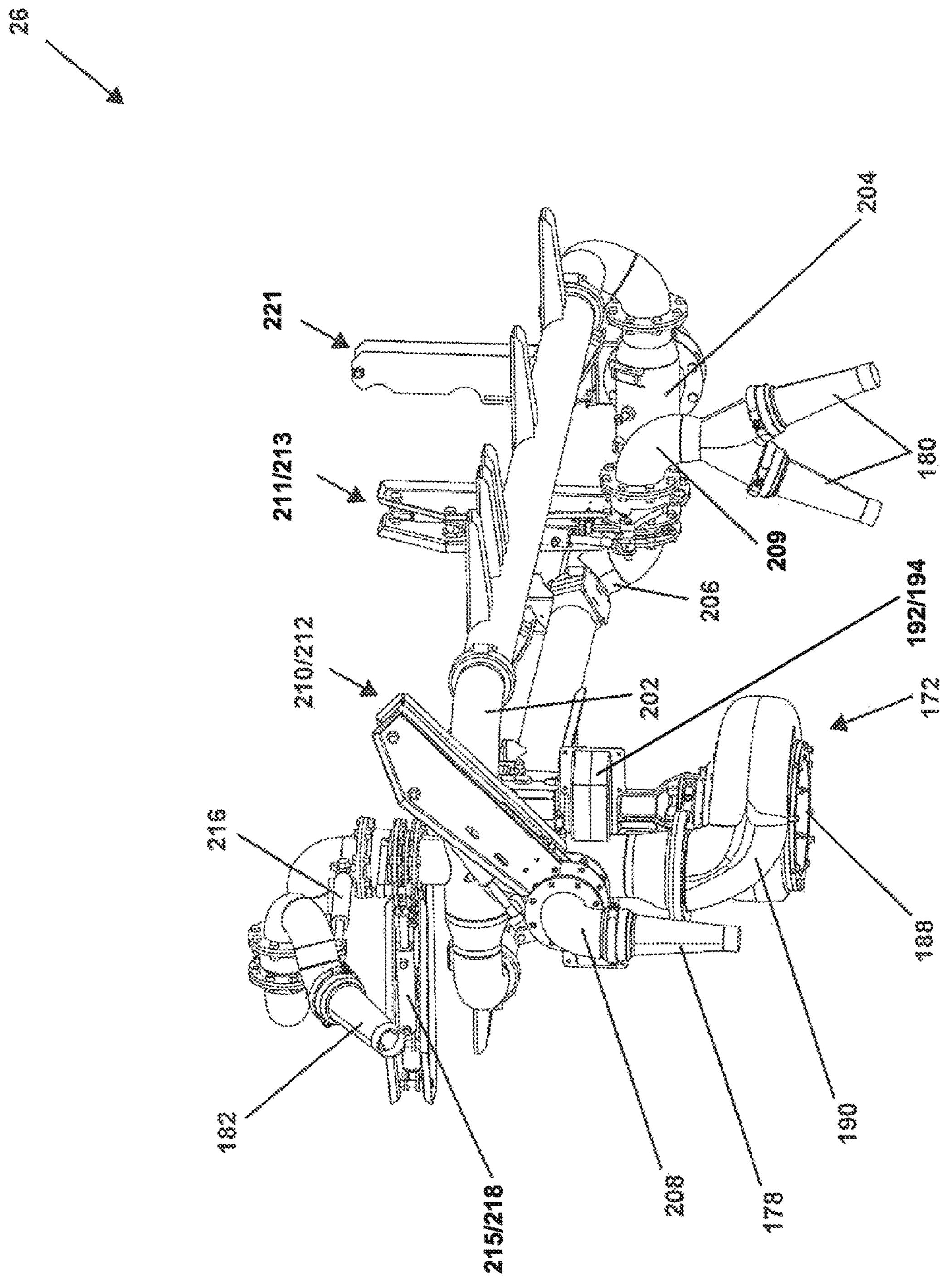
FIG. 50 is a front perspective view of a liquid delivery system of a self-propelled liquid delivery vehicle; the view showing the liquid delivery system having a conduit forming a continuous loop; the view also showing a reservoir pump with a reservoir pump motor, a first nozzle, a second set of nozzles, a third nozzle, and an outflow hookup all connected to the conduit of the liquid delivery system.
Figure 51:
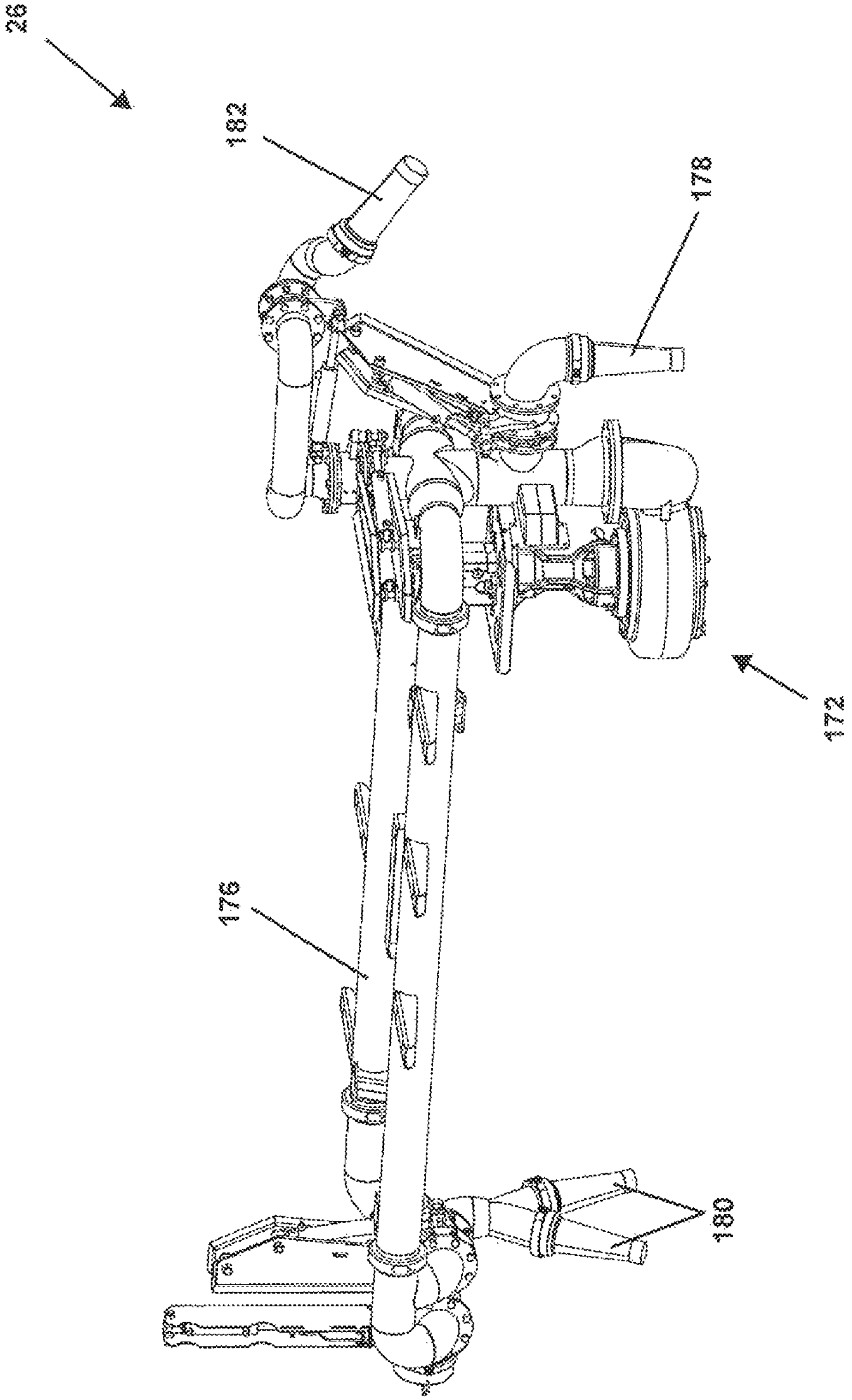
FIG. 51 is a side perspective view of a liquid delivery system of a self-propelled liquid delivery vehicle; the view showing the liquid delivery system having a conduit forming a continuous loop; the view also showing a reservoir pump with a reservoir pump motor, a first nozzle, a second set of nozzles, a third nozzle, and an outflow hookup all connected to the conduit of the liquid delivery system.
Figure 52:
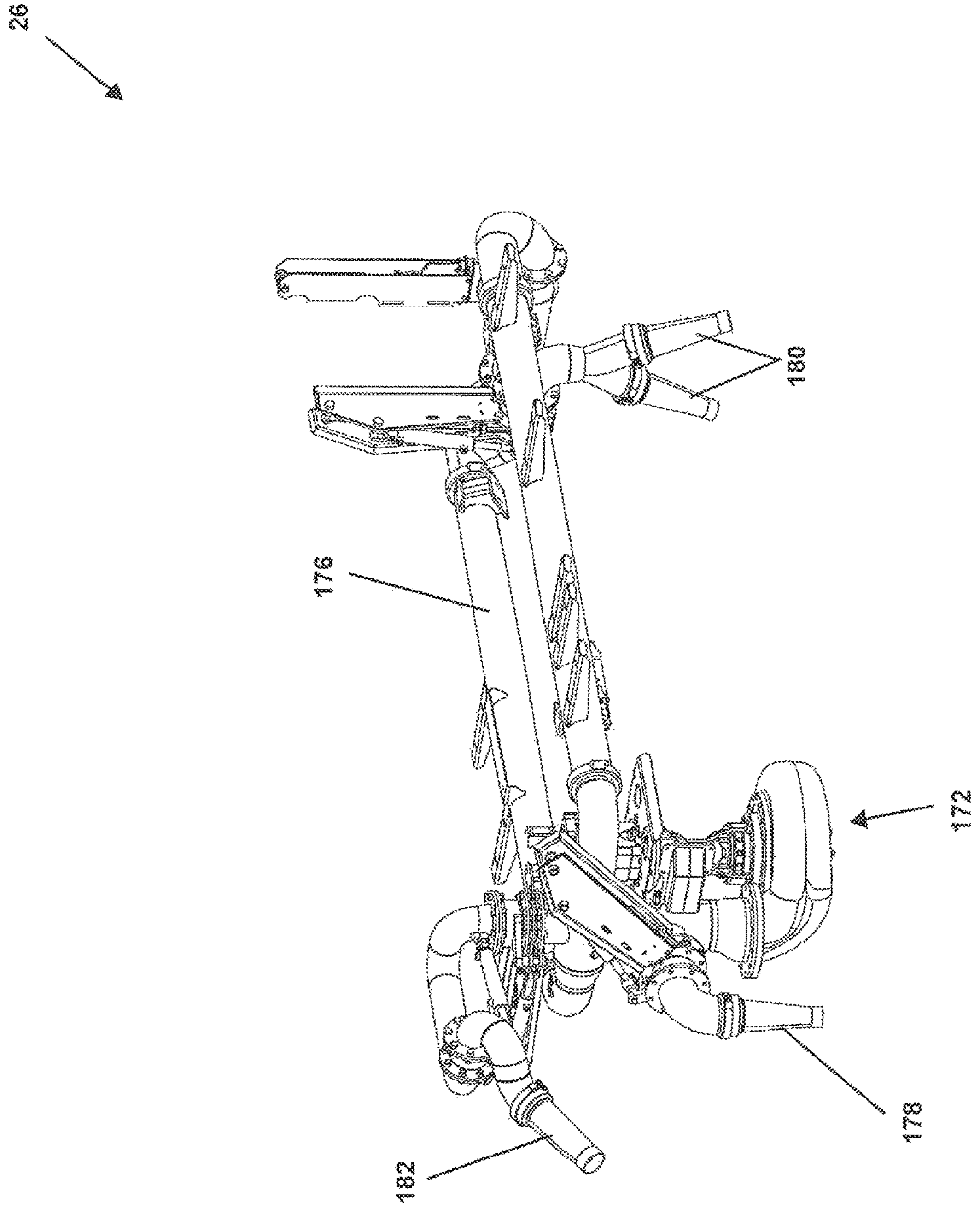
FIG. 52 is another front perspective view of a liquid delivery system of a self-propelled liquid delivery vehicle; the view showing the liquid delivery system having a conduit forming a continuous loop; the view also showing a reservoir pump with a reservoir pump motor, a first nozzle, a second set of nozzles, a third nozzle, and an outflow hookup all connected to the conduit of the liquid delivery system.
Figure 53:
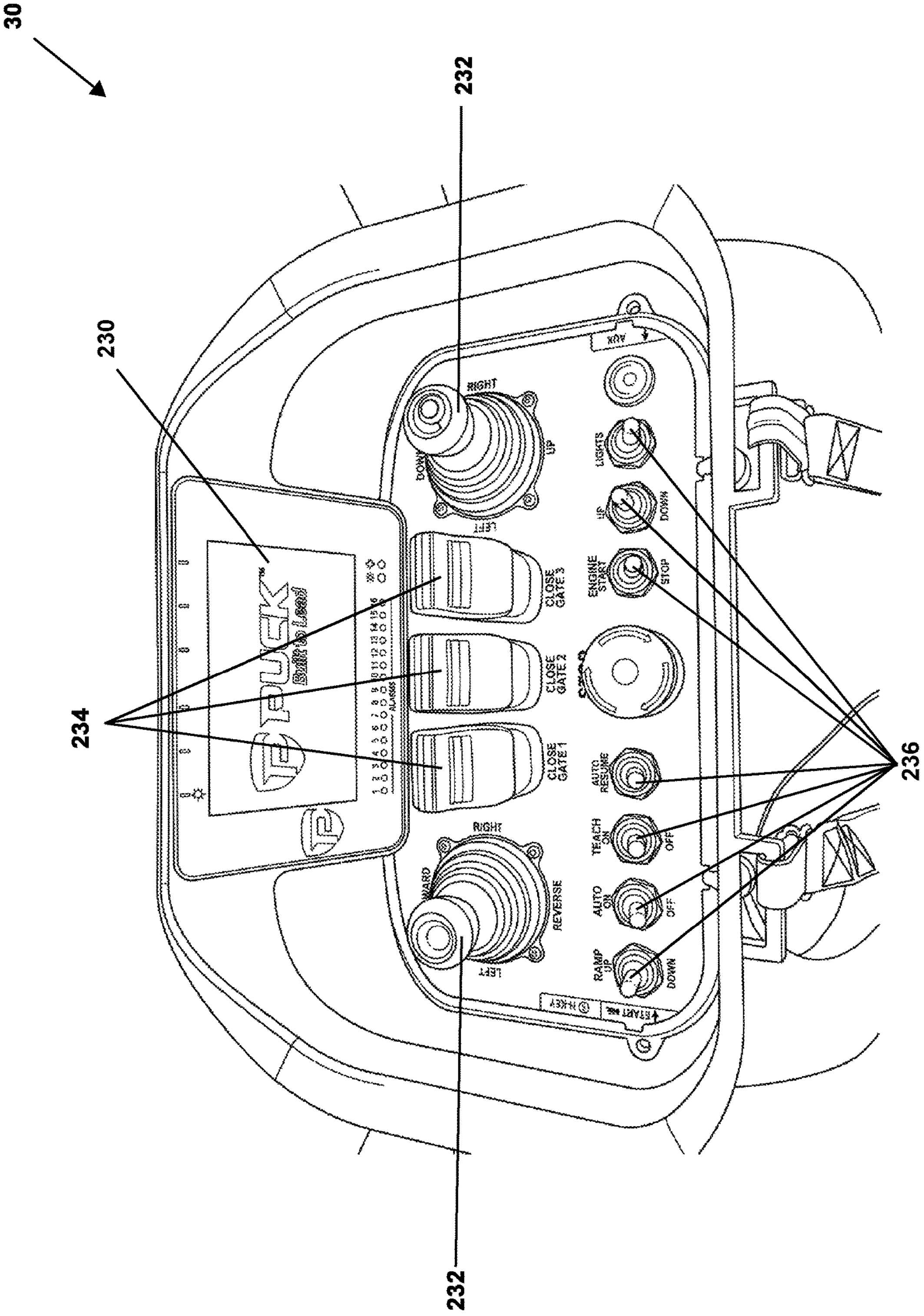
FIG. 53 is an elevation view of the wireless controller assembly of the self-propelled liquid delivery vehicle; the view showing the wireless controller assembly having a screen, joysticks, gate controls, and auxiliary switches.
Figure 54:
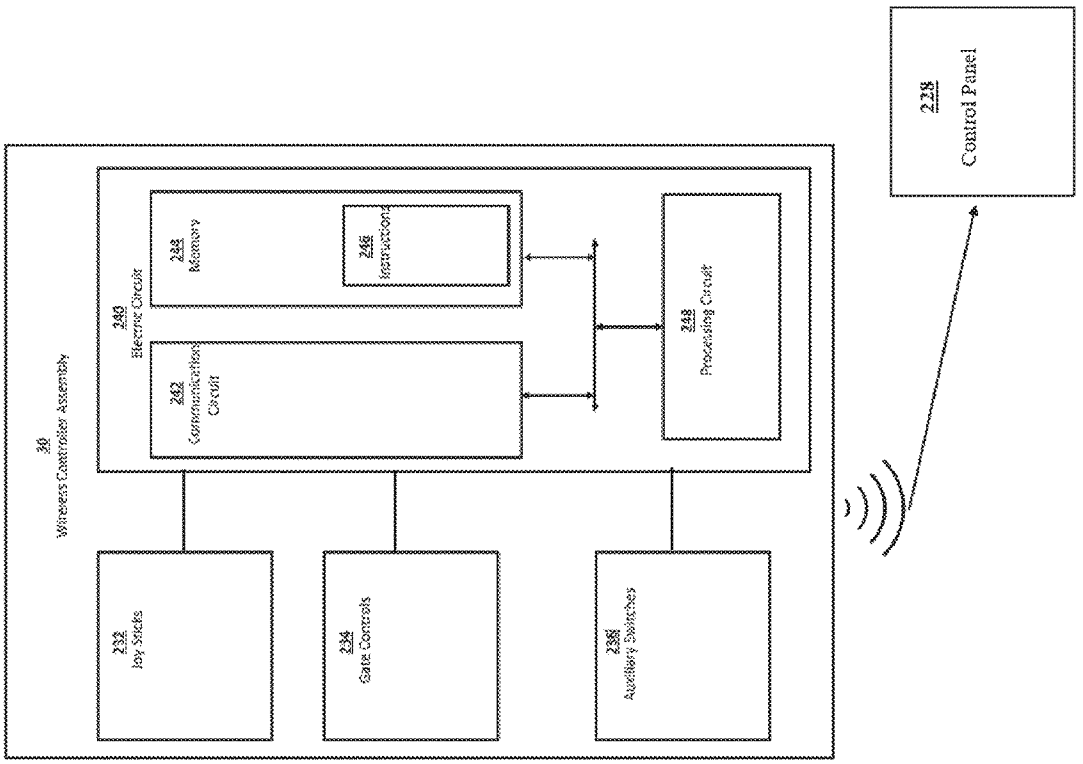
FIG. 54 is an electronic diagram showing the electrical components of the wireless controller assembly of the self-propelled liquid delivery vehicle; the view showing the wireless controller assembly having an electric circuit with a communications circuit, a memory with instructions, and a processing circuit in communication with the control panel of the power system of the self-propelled liquid delivery vehicle.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described as comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively" or "operably", such as when used as "operatively connected" or "operably engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of the manure lagoon agitation. However, the embodiments are not so limited. It is appreciated that the embodiments may be adapted for use in other applications which may be improved by the disclosed structures, arrangements and/or methods. The system is merely shown and described as being used in in the context of manure lagoon agitation for ease of description and as one of countless examples.

Self-Propelled Liquid Delivery Vehicle

With reference to the figures, a self-propelled liquid delivery vehicle 10 (or simply "vehicle 10") is presented. Vehicle 10 is formed of any suitable size, shape, and design and is configured to facilitate agitation of a manure lagoon. In the arrangement shown, as one example, vehicle 10 has a forward end 12, a rearward end 14, opposing left and right sides 16 (or simply "sides 16"), a top side 18, and a bottom side 20. In the arrangement shown, as one example, vehicle 10 includes a frame assembly 22, drive members 24 (or "track assemblies 24"), a liquid delivery system 26, a power system 28, and a wireless control assembly 30, among other components as is described herein. While vehicle 10 has been described according to the arrangement shown, as one example, any combination or arrangement may be used and is hereby contemplated for use.

Frame Assembly:

In the arrangement shown, as one example, vehicle 10 includes a frame assembly 22. Frame assembly 22 is formed of any suitable size, shape, and design and is configured to connect and carry various additional components of vehicle 10. In the arrangement shown, as one example, the frame assembly 22 has a top side 32, a bottom side 34, opposing front and back ends 36 (or simply "ends 36"), and opposing left and right sides 38 (or simply "sides 38"). In the arrangement show, as one example, frame assembly 22 includes support member 40, elongated members 42, and extension assembly 44.

In the arrangement shown, as one example, frame assembly 22 is formed primarily of metallic materials. As examples, frame assembly 22 may be formed of steel, aluminum, chromium, or any other metallic material, alloy, and/or composite or combination thereof. Alternatively, frame assembly 22 may be formed of a non-metallic material such as a plastic material, a fiberglass material, or any other non-metallic material and/or composite thereof. In one or more arrangements, frame assembly 22 may be formed of multiple pieces that are connected or assembled to one another such as through welding, screwing, bolting, friction fitting, or the like. Alternatively, in one or more arrangements, frame assembly 22 may be formed of a single, unitary member that is formed in a manufacturing process such as machining, extrusion, forming, additive manufacturing, casting, or the like to form a unitary and monolithic member. In the arrangement shown, as one example, frame assembly 22 is a single welded frame.

In the arrangement shown, as one example, when viewed from top side 32, frame assembly 22 includes support member 40, which generally extends from near one end 36 to near the opposing end 36, with an elongated member 42 at each of the opposing ends 36. In the arrangement shown, as one example, when viewed from top side 32, elongated members 42 extend from opposing side 38 to opposing side 38 and are generally rectangular in shape. In this arrangement, the frame assembly 22, when viewed from top side 32, is similar in shape to the letter "I" or "H," depending on the orientation of the frame assembly 22 when viewed.

In the arrangement shown, as one example, when viewed from an end 36, top side 32 extends in a generally flat and planar fashion from one side 38 to the opposing side 38. In this same view, opposing sides 38 extend in generally parallel planar spaced relation to one another. Also in this same view, bottom side 34 of frame assembly 22 begins at one side 38 and extends in generally parallel planar spaced relation to top side 32 for a distance before extending downward at an angle for a distance, then continuing in generally parallel planar spaced relation to top side 32 for a distance, before extending back up at an angle a distance, and then again continuing in generally parallel planar spaced relation to top side 32 until it reaches opposing side 38.

In the arrangement shown, as one example, when viewed from a side 38, top side 32 extends in a generally planar fashion from one end 36 to the opposing end 36, and bottom side 34 extends in generally parallel planar spaced relation to top side 32. In this same view, ends 36 generally extend downward from top side 32 in a generally perpendicular planar fashion a distance, before extending downward and at an angle inward for a distance, before extending at an even greater angle inward until end 36 meets bottom side 34.

Support Member: In the arrangement shown, as one example, frame assembly 22 includes support member 40. Support member 40 is formed of any suitable size, shape, and design and is configured to connect elongated members 42 and connect and carry various additional components of vehicle 10. In the arrangement shown, as one example, support member 40 has a top surface 46, a bottom surface 48, opposing ends 50, and opposing sides 52. In the arrangement shown, as one example, support member 40 also includes attachment openings 54.

In the arrangement shown, as one example, when viewed from top surface 46, support member 40 is generally rectangular in shape, with ends 50 extending in generally parallel planar spaced relation to each other and in generally perpendicular planar spaced relation to sides 52. In the arrangement shown, as one example, when viewed from an end 50, top surface 46 of support member 40 is a generally flat and planar surface, and bottom surface 48 of support member 40 extends in generally parallel planar spaced relation to top surface 46. In this view, opposing sides 52 of support member 40 extend downward from top surface 46 at an angle inward until they reach bottom surface 48. In the arrangement shown, as one example, when viewed from a side 52, top surface 46 is a generally flat and planar surface and bottom surface 48 extends in generally parallel planar spaced relation to top surface 46. In this view, opposing ends 50 extend downward and perpendicular to top surface 46 for a distance, before extending downward and at an angle inward for a distance, then extending downward and at an even greater angle inward until ends 50 reach bottom surface 48.

In the arrangement shown, as one example, support member 40 is formed primarily of metallic materials. As examples, support member 40 may be formed of steel, aluminum, chromium, or any other metallic material, alloy, and/or composite thereof. Alternatively, support member 40 may be formed of a non-metallic material such as a plastic material, a fiberglass material, or any other non-metallic material and/or composite thereof. In one or more arrangements, support member 40 may be formed of multiple pieces that are connected or assembled to one another such as through welding, screwing, bolting, friction fitting, or the like. Alternatively, in one or more arrangements, support member 40 may be formed of a single, unitary member that is formed in a manufacturing process such as machining, extrusion, forming, additive manufacturing, casting, or the like to form a unitary and monolithic support member 40.

In the arrangement shown, as one example, support member 40 includes attachment openings 54. Attachment openings 54 are formed of any suitable size, shape, and design and are configured to allow for the attachment of various components of vehicle 10 to support member 40. In the arrangement shown, as one example, attachment openings 54 are generally elongated openings in the shape of an oval. However, it is hereby contemplated that any other shape or configuration for attachment openings 54 may be used and are hereby contemplated for use, including openings in the shape of a circle, a square, a rectangle, or any other shape.

In the arrangement shown, as one example, support member 40 is connected to an elongated member 42 at each opposing end 50 of support member 40. In the arrangement shown, was one example, support member 40 and elongated members 42 are separate components which are joined together using an number of processes described herein. In this manner, support member 40 and elongated members 42 are connected together to form at least a portion of frame assembly 22.

Elongated Members: In the arrangement shown, as one example, frame assembly 22 includes elongated members 42. Elongated members 42 are formed of any suitable size, shape, and design and are configured to connect frame assembly 22 to drive members 24. In the arrangement shown, as one example, elongated members 42 include a top surface 56, a bottom surface 58, opposing ends 60, and opposing sides 62.

In the arrangement shown, as one example, elongated members 42 are generally elongated rectangular tubes. In this arrangement, as one example, when viewed from top surface 56, elongated members 42 are generally rectangular in shape, with opposing ends 60 extending in generally parallel planar spaced relation to one another, opposing sides 62 extending in generally parallel planar spaced relation to one another, and opposing sides 62 and opposing ends 60 extending in generally perpendicular planar relation to one another. Similarly, in this arrangement as one example, when viewed from an end 60, elongated members 42 are generally rectangular in shape, with top surface 56 and bottom surface 58 extending in generally parallel planar spaced relation to one another, opposing sides 62 extending in generally parallel planar spaced relation to one another, and opposing sides 62 extending in generally perpendicular planar relation to top surface 56 and bottom surface 58. Further, in this arrangement shown as one example, when viewed from a side 62, top surface 56 and bottom surface 58 extend in generally parallel planar spaced relation to one another, opposing ends 60 extend in generally parallel planar spaced relation to one another, and opposing ends 60 extend in generally perpendicular planar relation to top surface 56 and bottom surface 58. However, it is hereby contemplated that any other shape or configuration may be used and is hereby contemplated for use as elongated members 42.

In the arrangement shown, as one example, elongated members 42 are formed primarily of metallic materials. As examples, elongated members 42 may be formed of steel, aluminum, chromium, or any other metallic material, alloy, and/or composite thereof. Alternatively, elongated members 42 may be formed of a non-metallic material such as a plastic material, a fiberglass material, or any other non-metallic material and/or composite thereof. In one or more arrangements, elongated members 42 may be formed of a single, unitary member that is formed in a manufacturing process such as extrusion, forming, rolling, additive manufacturing, machining, or the like to form a unitary and monolithic member. Alternatively, elongated members 42 may be formed of multiple pieces that are connected or assembled to one another such as through welding, screwing, bolting, friction fitting, or the like.

In the arrangement shown, as one example, elongated members 42 are configured to telescope or slide within chambers 100 of track frame 76 of track assemblies 24. In order to facilitate smooth and efficient telescoping, in the arrangement shown as one example elongated members 42 include skid pads 64. Skid pads 64 are formed of any suitable size, shape, and design and are configured to allow for elongated members 42 to easily and smoothly telescope within drive members 24 without causing wear or damage to elongated members 42 or drive members 24. In the arrangement shown, as one example, each opposing side 62 of elongated member 42 includes a skid pad 64 on the top surface 56, bottom surface 58, and each opposing end 60.

In the arrangement shown, as one example, elongated members 42 include attachment members 66. Attachment members 66 are formed of any suitable size, shape, and design and are configured to facilitate connection between elongated members 42 and extension assembly 44. In the arrangement shown, as one example, attachment members 66 extend outward from an opposing end 50 on each elongated member 42. In this way, attachment members 66 extend out from the outer ends 36 of frame assembly 22. In the arrangement shown, as one example, attachment members 66 are a solid piece of material with an opening therein, which allows for a bolt or screw of the extension assembly 44 to extend through attachment member 66, thereby facilitating connection between extension assembly 44 and attachment member 66.

Extension Assembly: In the arrangement shown, as one example, frame assembly 22 includes extension assembly 44. Extension assembly 44 is formed of any suitable size, shape, and design and is configured to facilitate the movement of drive members 24 between an extended position and a retracted position. Said another way, in the arrangement shown as one example, extension assembly 44 is configured to facilitate the telescoping of elongated members 42 with chambers 100 of track frame 76 of track assemblies 24.

In the arrangement shown, as one example, extension assembly 44 is a hydraulic cylinder, however it is hereby contemplated that any other type of actuator, whether mechanical or electric, or system or method which allows for the movement of drive members 24 between an extended position and a retracted position may be used and is hereby contemplated for use, including the use a pneumatic cylinder, a motor to apply a force to move the drive members 24, or any other system or method. In the arrangement shown, as one example, extension assembly 44 is connected to attachment members 66 of elongated members 42 and to attachment members 104 of chamber 100 of drive members 24. In this way, extension assembly 44 also helps to facilitate connection between frame assembly 22 and drive members 24. In the arrangement shown, as one example, extension assembly 44 may be controlled remotely, or it may be controlled manually.

In the arrangement shown, as one example, frame assembly 22 connects to drive members 24 through elongated members 42. In this arrangement, elongated members 42 are sized and shaped to be inserted into chambers 100 of track frames 76. In this arrangement, as one example, skid pads 64 are inserted on to elongated members 42, then each side 62 of each elongated member 42 is inserted into chambers 100 of track frames 76. Once elongated members 42 are inserted into chambers 100, skid pads 102 are inserted into chambers 100. Next, extension assemblies 44 are connected to attachment members 66 of elongated members 42 and to attachment members 104 of chambers 100. With elongated members 42 inserted into chambers 100, and extension assemblies 44 connected to attachment members 66 and attachment members 104, frame assembly 22 and drive members 24 are operatively connected and extension assemblies 44 are able to facilitate the movement of drive members 24 between an extended position and a retracted position. Said another way, elongated members 24 are able to telescope within chambers 100 via the operation of extension assemblies 44.

While frame assembly 22 and its component parts have been describe according to the arrangement shown, as one example, it is hereby contemplated the any other size, shape, design, or configuration may be used in order to connect and carry various additional components of vehicle 10.

Drive Members:

In the arrangement shown, as one example, vehicle 10 includes drive members 24. Drive members 24 are formed of any suitable size, shape, and design and are configured to propel vehicle 10 while on land. In the arrangement shown, as one example, drive members 24 are a pair of track assemblies 24, however any other means of propelling vehicle 10 while on land may be used and are hereby contemplated for use, including the use of wheels as drive members 24. In the arrangement shown, as one example with drive members 24 being track assemblies 24, track assemblies 24 have a top side 68, a bottom side 70, opposing front and back ends 72 (or simply "ends 72"), and opposing left and right sides 74 (or simply "sides 74"). In the arrangement show, as one example, track assemblies 24 include a track frame 76, a first sprocket assembly 78 powered by motor 80, a second sprocket assembly 82, tracks 84, and a tensioning mechanism 86.

In the arrangement shown, as one example, vehicle 10 is configured to be transported, or drive itself, on roads and vehicle 10 is configured to be deployed in a reservoir or lagoon in order to perform various operations described herein. While vehicle 10 is in operation, it may be desirable for vehicle 10 to have a wider base in order to provide great stability of vehicle 10 to ensure vehicle 10 does not tip over when encountering obstacles when it is in operation. Additionally, vehicle 10 must be transported from site to site, which may be by trailer or by driving itself to each site. When traveling between sites, vehicle 10 may be required to travel on roads, so vehicle 10 must meet road width travel restrictions. In order to accommodate for road width travel restrictions and also provide stability when floating in a liquid, the drive members 24 (e.g. track assemblies 24) are configured to move between a retracted position and an extended position. In the arrangement shown, as one example, when vehicle 10 is traveling between sites on a road, either driving itself or traveling on a trailer, the track assemblies 24 are placed in the retracted position, thereby complying within road width travel restrictions. Then, in the arrangement shown as one example, when vehicle 10 is ready to perform various tasks such as, by way of example and not limitation, agitating a manure lagoon, track assemblies 24 may be moved to the extended position, thereby providing a wider base for vehicle 10 and increasing the stability of vehicle 10 while it is performing various operations, such as agitating a manure lagoon.

Track Frame: In the arrangement shown, as one example, each track assembly 24 includes a track frame 76. Track frame 76 is formed of any suitable size, shape, and design and is configured to provide a base around which tracks 84 rotate. In the arrangement shown, as one example, track frame 76 has a top wall 88, a bottom wall 90, an outer side wall 92, an inner side wall 94, a front end 95, and a back end 96. In the arrangement shown, as one example, track frame 76 also includes an interior cavity 97 with partitions 98, chambers 100 with skid pads 102 and attachment members 104, guides 106, and forward sprocket engagement members 108 and rearward sprocket engagement members 110.

In the arrangement shown, as one example, track frame 76 is formed primarily of metallic materials. As examples, track frame 76 may be formed of steel, aluminum, chromium, or any other metallic material, alloy, and/or composite thereof. Alternatively, track frame 76 may be formed of a non-metallic material such as a plastic material, a fiberglass material, or any other non-metallic material and/or composite thereof. In the arrangement shown, as one example, track frame 76 is formed of multiple pieces that are connected or assembled to one another through welding. However, any other process of assembling track frame 76 may be used, including screwing, bolting, friction fitting, or the like and, alternatively, track frame 76 may be formed out of a single, unitary member that is formed in a manufacturing process such as machining, extrusion, forming, additive manufacturing, casting, or the like to form a unitary and monolithic member.

In the arrangement shown, as one example, track frame 76 extends a height from the top wall 88 to the bottom wall 90, a width from the outer side wall 92 to the inner side wall 94, and a length from the front end 95 to the back end 96. In the arrangement shown, as one example, when viewed from top side 18 of vehicle 10, track frame 76 is generally rectangular in shape, with outer side wall 92 and inner side wall 94 extending in approximate parallel planar spaced relation to one other. At front end 95, connected to both the outer side wall 92 and the inner side wall 94, are forward sprocket engagement members 108, and at back end 96, connected to both the outer side wall 92 and inner side wall 94 are rearward sprocket engagement members 110. Forward sprocket engagement members 108 and rearward sprocket engagement members 110 extend outward from both outer side wall 92 and inner side wall 94 and the tops of forward sprocket engagement members 108 and rearward sprocket engagement members 110 are in approximate planar alignment with top wall 88 of track frame 76.

In the arrangement shown, as one example, when viewed from a side 16 of vehicle 10, track frame 76 is generally in the shape of an inverted trapezoid, with the top wall 88 and bottom wall 90 extending in approximate parallel spaced relation to one another and with top wall 88 extending a length that is longer than bottom wall 90. In this arrangement, as one example, the wall (not shown) at front end 95 and the wall (not shown) at back end 96 extend downward from top wall 88 at an angle inward until it meets bottom wall 90.

In the arrangement shown as one example, with drive members 24 being track assemblies 24, track frame 76 is a float. In this arrangement, track frame 76 has an interior cavity 97 which is completely or partially hollow. With track frame 76 completely or partially hollow, track frames 76 provide buoyance to vehicle 10, enough so that vehicle 10 is able to float on water or any other liquid or fluid. In this arrangement, track frames 76 provide the ability for vehicle 10 to float when in a manure lagoon in order to maneuver around the lagoon and provide sufficient agitation throughout the manure lagoon. In this arrangement, as one example, the track assemblies 24 serve as both the floats for vehicle 10 while vehicle 10 is operating in a fluid or liquid, and also as drive members 24 which propel vehicle 10 while vehicle 10 is on land.

In the arrangement shown as one example, where track frame 76 serves as a float for vehicle 10, interior cavity 97 is partially hollow and has partitions 98 installed therein. In the arrangement shown, as one example, partitions 98 are formed primarily of a metallic material, such as steel, aluminum, chromium, or any other metallic material, alloy, and/or composite thereof. Alternatively, partitions 98 may be formed of a non-metallic material such as a plastic material, a fiberglass material, or any other non-metallic material and/or composite thereof. In the arrangement shown, as one example, partitions 98 are welded to top wall 88, bottom wall 90, outer side wall 92, and inner side wall 94 within interior cavity 97. In this manner, partitions 98 form sealed compartments within the interior cavity 97 of track frame 76, and such sealed compartments are watertight. It is advantageous to have watertight sealed compartments within interior cavity 97 in situations where track frame 76 operates as a float for vehicle 10 because if any of outer side wall 92, inner side wall 94, top wall 88, bottom wall 90, or any other portion of track frame 76 is punctured while vehicle 10 is operating in a liquid, only one sealed compartment will fill with liquid, meaning the remaining compartments within interior cavity 97 remain sealed, and vehicle 10 will still be able to float. If track frame 76 did not contain partitions 98 forming sealed compartments within the interior cavity 97 of track float 76, if any portion of track float 76 were punctured while vehicle 10 was operating in a liquid, then the entire interior cavity 97 would fill with the liquid and vehicle 10 would sink.

Chambers: In the arrangement shown, track frame 76 includes chambers 100. Chambers 100 are formed of any suitable size, shape, and design and are configured to help facilitate connection between drive members 24 and frame assembly 22. In the arrangement shown, as one example, chambers 100 are generally rectangular tubes which extend through track frame 76 from the outer side wall 92 to inner side wall 94 and for a distance past inner side wall 94. To ensure that interior cavity 97 of track frame 76 is watertight and track frame 76 can float, in the arrangement shown, as one example, chambers 100 are welded to outer side wall 92 and inner side wall 94 such that no water can pass into interior cavity 97 at the point where chambers 100 meet outer side wall 92 or inner side wall 94. Additionally, because chambers 100 are tubes, any liquid which enters one end of chamber 100 will simply exit through that same end or the other end of the chamber 100. In this way, interior cavity 97 of track frame 76 is still watertight even with chambers 100 extending through track frame 76.

In the arrangement shown, as one example, chambers 100 are sized such that the aperture extending through chambers 100 are large enough to receive elongated members 42 therein and allow elongated members 42 to telescope or slide within chambers 100. Additionally, in the arrangement shown as one example, each track frame 76 has two chambers 100 extending therethrough and the chambers 100 are appropriately spaced apart such that each elongated member 42 of frame assembly 22 may be inserted into one of the chambers 100.

In the arrangement shown, as one example, chambers 100 include skid pads 102. Skid pads 102 are formed of any suitable size, shape, and design and are configured to reduce friction between chambers 100 and elongated members 42, thereby reducing wear and tear on chambers 100 and elongated members 42. In the arrangement shown, as one example, skid pads 102 are formed of a non-metallic material which has a low coefficient of friction, thereby allowing elongated members 42 to slide within chambers 100 with relative ease.

In the arrangement shown, as one example, skid pads 102 are generally rectangular members with a width that allows skid pads 102 to fit within the opening of chambers 100. In the arrangement shown, as one example, chambers 100 includes skid pads 102 on each of the upper, lower, left, and right interior surfaces of chambers 100 near the inner side wall 94 of track frame 76. In combination with skid pads 64 of elongated members 42, skid pads 102 also help facilitate the holding of, and proper alignment of, elongated members 42 within chambers 100 when drive members 24 are moved between an extended and retracted position.

In the arrangement shown, as one example, chambers 100 include attachment members 104. Attachment members 104 are formed of any suitable size, shape, and design and are configured to facilitate attachment of extension assemblies 44 to drive members 24. In the arrangement shown, as one example, attachment members 104 may be formed of steel, aluminum, chromium, or any other metallic material, alloy, and/or composite thereof. Alternatively, attachment members 104 may be formed of a non-metallic material such as a plastic material, a fiberglass material, or any other non-metallic material and/or composite thereof.

In the arrangement shown, as one example, attachment members 104 are connected to chambers 100 and inner side wall 94. More specifically, attachment members 104 are connected to inner side wall 94 and the portion of chamber 100 which extends a distance past inner side wall 94, thereby providing two means of connection and support for attachment members 104. In the arrangement shown, as one example, attachment members 104 have an opening which allows the extension assemblies 44 to be attached to attachment members 104 such as through a bolt or a pin. While attachment members 104 have been described according the arrangement shown, as one example, it is hereby contemplated that other methods or mechanisms may be used as attachment members 104 in order to attach extension assemblies 44 to chambers 100 and drive members 24.

Guides: As mentioned herein, track frame 76 provides a base around which tracks 84 rotate. In the arrangement shown, as one example, in order to facilitate proper alignment of tracks 84, track frame 76 includes guides 106. Guides 106 are formed of any suitable size, shape, and design, and are configured to help properly align tracks 84 as they rotate around track frame 76. In the arrangement shown, as one example, guides 106 may be formed of steel, aluminum, chromium, or any other metallic material, alloy, and/or composite thereof. Alternatively, guides 106 may be formed of a non-metallic material such as a plastic material, a fiberglass material, or any other non-metallic material and/or composite thereof. In the arrangement shown, as one example, each guide 106 is formed of a single, unitary member formed using any manufacturing process such as casting, additive manufacturing, forming, machining, or the like. Alternatively, each guide 106 may be formed of multiple pieces joined together such as through welding, screwing, bolting, friction fitting, or the like.

In the arrangement shown, as one example, guides 106 extend outward from both top wall 88 and bottom wall 90 of track frame 76. In the arrangement shown, as one example, there are two guides 106 extending outward from top wall 88, with one guide 106 on the outer side of top wall 88 and the other guide 106 on the inner side of top wall 88. In the arrangement shown, as one example, there are three guides 106 extending outward from bottom wall 90, with one guide 106 on the outer side of bottom wall 90, another guide 106 on the inner side of bottom wall 90, and an additional guide 106 located centrally between the inner and outer sides of bottom wall 90. Additionally, where bottom wall 90 meets the walls (not shown) on each of front end 95 and back end 96, the guides 106 which extend outward from the bottom wall 90 continue such that guides 106 also extend outward from at least a portion of the walls (not shown) on each of front end 95 and back end 96 of track frame 76.

While guides 106 have been described according to the arrangement shown, as one example, other arrangements can be used as guides 106 to help facilitate proper alignment of tracks 84 as they rotate around track frame 76. Additionally, while the number of guides 106 have been described according to the arrangement shown, as one example, any other number of guides 106 may extend outward from either top wall 88 and bottom wall 90, and the number of guides 106 extending outward from the top wall 88 may be the same or different than the number of guides 106 extending outward from the bottom wall 90.

In the arrangement shown, as one example, track frame 76 includes forward sprocket engagement members 108 and rearward sprocket engagement members 110. Forward sprocket engagement members 108 and rearward sprocket engagement members 110 are formed of any suitable size, shape, and design and are configured to facilitate engagement between track frame 76 and each of first sprocket assembly 78, sprocket motor 80, second sprocket assembly 82, and tensioning mechanism 86. In the arrangement shown, as one example, a forward sprocket engagement member 108 is connected to both the outer side wall 92 and the inner side wall 94 at the front end 95 of track frame 76. In the arrangement shown, as one example, a rearward sprocket engagement member 110 is connected to both the outer side wall 92 and inner side wall 94 at the back end 96 of track frame 76.

In the arrangement shown, as one example, both forward sprocket engagement members 108 and rearward sprocket engagement members 110 are generally ovular in shape. In the arrangement shown, as one example, the tops of forward sprocket engagement members 108 and rearward sprocket engagement members 110 are in approximate planar alignment with top wall 88 of track frame 76 such that the tops of forward sprocket engagement members 108 and rearward sprocket engagement members 110 and the surface of top wall 88 form a generally flat and smooth plane.

In the arrangement shown, as one example, forward sprocket engagement members 108 are configured to provide for the attachment of tensioning mechanism 86 and second sprocket assembly 82. In this arrangement, as one example, forward sprocket engagement members 108 include slots 112 which extend across forward sprocket engagement members 108. Slots 112 are of any suitable size, shape, and design and are configured to allow a bolt of tensioning mechanism 86 to be extended through slots 112 and allow for tensioning mechanism 86 to move laterally along slots 112. In the arrangement shown, as one example, slots 112 are elongated openings having generally round ends. In this arrangement, as one example, slots 112 allow for bolts connected to tensioning mechanism 86 to move along the length of slots 112, thereby moving second sprocket assembly 82 in order to properly tension tracks 84 around track frame 76.

In the arrangement shown, as one example, rearward sprocket engagement members 110 are configured to provide the attachment of sprocket motor 80 and first sprocket assembly 78. In the arrangement shown, as one example, rearward sprocket engagement members 110 contain openings 114. Openings 114 are formed of any suitable size, shape, and design and are configured to allow for the operable connection of sprocket motor 80 and first sprocket assembly 78 (specifically bearing 120 of first sprocket assembly 78) to track frame 76. In the arrangement shown, as one example, openings 114 are generally circular openings through the rearward sprocket engagement members 110. In this arrangement, sprocket motor 80 can be connected to rearward sprocket engagement members 110 on the outer side 16 of vehicle 10. Additionally, in this arrangement shown as one example, first sprocket assembly 78 can be connected to the inside of rearward sprocket engagement members 110. When sprocket motor 80 and first sprocket assembly 78 are connected to rearward sprocket engagement members 110, sprocket motor 80 is allowed to engage first sprocket assembly 78 due to openings 114 in rearward sprocket engagement members 110.

Sprocket Assemblies: In the arrangement shown, as one example, track assemblies 24 include first sprocket assembly 78 and second sprocket assembly 82. First sprocket assembly 78 and second sprocket assembly 82 are formed of any suitable size, shape, and design and are configured to facilitate the rotation of tracks 84 around track frame 76. In the arrangement shown, as one example, first sprocket assembly 78 connects to sprocket motor 80, which is configured to facilitate rotation of tracks 84 around track frame 76, and in this arrangement, first sprocket assembly 78 is a drive sprocket. In the arrangement shown, as one example, second sprocket assembly 82 is configured to connect to a tensioning mechanism 86 at each end of second sprocket assembly 82, and second sprocket assembly 82 is not connected to any motor, therefore in this arrangement second sprocket assembly 82 is an idler sprocket assembly. In the arrangement shown, as one example, first sprocket assembly 78 and second sprocket assembly 82 each include an axle 118, bearings 120, roller 122, and a pair of sprockets 124.

In the arrangement shown, as one example, first sprocket assembly 78 and second sprocket assembly 82 are formed primarily of metallic materials, such as steel, aluminum, chromium, or any other metallic material, alloy, and/or composite thereof. Alternatively, first sprocket assembly 78 and second sprocket assembly 82 may be formed of a non-metallic material such as a plastic material, a fiberglass material, or any other non-metallic material and/or composite thereof. In one or more arrangements, first sprocket assembly 78 and second sprocket assembly 82 are formed of multiple pieces that are connected or assembled to one another such as through welding, screwing, bolting, friction fitting, or the like. Alternatively, in one or more arrangements, first sprocket assembly 78 and second sprocket assembly 82 may be formed of a single, unitary member that is formed in a manufacturing process such as machining, extrusion, forming, additive manufacturing, or the like to form a unitary and monolithic member.

In the arrangement shown, as one example, first sprocket assembly 78 and second sprocket assembly 82 each include an axle 118. Axle 118 is formed of any suitable size, shape, and design, and is configured to help facilitate rotation of first sprocket assembly 78 and second sprocket assembly 82. In the arrangement shown, as one example, axle 118 is a cylindrical rod which extends along the length of first sprocket assembly 78 and second sprocket assembly 82. In this arrangement, the centerline of axle 118 is also the axis of rotation of first sprocket assembly 78 and second sprocket assembly 82. In the arrangement shown, as one example, axle 118 is formed primarily of metallic materials. As examples, axle 118 may be formed of steel, aluminum, chromium, or any other metallic material, alloy, and/or composite thereof. Alternatively, axle 118 may be formed of a non-metallic material such as a plastic material, a fiberglass material, or any other non-metallic material and/or composite thereof. In the arrangement shown, as one example, axles 118 are formed of a single component which connects at each end to a bearing 120 or motor 80.

In the arrangement shown, as one example, first sprocket assembly 78 and second sprocket assembly 82 include bearings 120. Bearings 120 are formed of any suitable size, shape, and design and are configured to facilitate connection between forward sprocket engagement members 108 and second sprocket assembly 80, and between rearward sprocket engagement members 110 and first sprocket assembly 78. In the arrangement shown, as one example, bearings 120 are generally circular members which include a base portion 134 having a first diameter which is configured to connect to forward sprocket engagement members 108 and/or rearward sprocket engagement members 110. In the arrangement shown, as one example, bearings 120 also include a second portion 136 with a second diameter which is smaller than the diameter of the base portion 134, and a third portion 138 with a diameter smaller than the diameter of the second portion 136. In the arrangement shown, as one example, bearings 120 includes an opening 140 which extends through the middle of base portion 134, second portion 136, and third portion 138. In the arrangement shown, as one example, opening 140 is a circular opening configured to receive axle 118 therein, however opening 140 can be any other size and shape in order to receive axle 118 therein and allow for the rotation of axle 118. In the arrangement shown, as one example, third portion 138 of bearings 120 connect to roller 122 of first sprocket assembly 78 and second sprocket assembly 82.

In the arrangement shown, as one example, first sprocket assembly 78 and second sprocket assembly 82 include roller 122. Roller 122 is formed of any suitable size, shape, and design and is configured to facilitate rotation of sprockets 124. In the arrangement shown, as one example, roller 122 is generally cylindrical in shape and connects to bearings 120 on each end of second sprocket assembly 80, and to a bearing 120 on one end of first sprocket assembly 78 and sprocket motor 80 on the other end of first sprocket assembly 78. In the arrangement shown, as one example, roller 122 rotates about axle 118, with an axis of rotation in alignment with the centerline of axle 118. In the arrangement shown, as one example, roller 122 is primarily formed of a metallic material such as steel, aluminum, chromium, or any other metallic material, alloy, and/or composite thereof. Alternatively, roller 122 may be formed of a non-metallic material such as a plastic material, a fiberglass material, or any other non-metallic material and/or composite thereof. In the arrangement shown, as one example, roller 122 is formed of a single piece of material and a pair of sprockets 124 extend outward from roller 122.

In the arrangement shown, as one example, first sprocket assembly 78 and second sprocket assembly 82 include a pair of sprockets 124. Sprockets 124 are formed of any suitable size, shape, and design and are configured to facilitate connection between first sprocket assembly 78 and second sprocket assembly 82 and tracks 84. In the arrangement shown, as one example, sprockets 124 are generally circular members which extend out from roller 122 and are formed of a pair of plates 126 connected by fasteners 128. In the arrangement shown, as one example, fasteners 128 are bolts, however any other form of fastening or connecting plates 126 together may be utilized as fasteners 128. Alternatively, sprockets 124 may be formed of a single, unitary member that is formed in a manufacturing process such as machining, extrusion, forming, additive manufacturing, or the like to form a unitary and monolithic member.

In the arrangement shown, as one example, plates 126 of sprockets 124 are generally circular members with protrusions 130 having contours 132. In the arrangement shown, as one example, the pair of plates 126 which form a sprocket 124 are aligned such that the protrusions 130 of plates 126 are aligned with one another. In the arrangement shown, as one example, protrusions 130 extend outward from the generally circular center of plates 126 in a generally square or rectangular manner. Said another way, protrusions 130 are rectangular protrusions. In the arrangement shown, as one example, protrusions 130 include contours 132.

Contours 132 are areas where material has been removed from protrusions 130 and are generally convex in shape. In the arrangement shown, as one example, contours 132 are positioned on the two interior corners of protrusions 130. In this arrangement, as one example, contours 132 form pockets within which links 148 of tracks 84 are able to lay. Said another way, each protrusion 130 includes two contours 132, one on each interior corner of protrusion 130. In this arrangement, as one example, the contours 132 on adjacent protrusions 130 of one plate 126 forming sprocket 124 and the contours 132 on adjacent protrusions 130 of the other plate 126 forming sprocket 124 form a pocket within which links 148 of tracks 84 are able to lay.

This configuration of sprockets 124 is advantageous because of the configuration of links 148 of tracks 84. Links 148 are part of chain 146 of tracks 84. Links 148 are configured such that adjacent links are generally positioned at a 90 degree angle from each other. Said another way, Links 148 alternate between being positioned vertically and positioned horizontally. In the arrangement shown, as one example, sprockets 124 are configured such that the horizontally positioned links 148 of chain 146 fit within the pockets formed by contours 132 of protrusions 130 of sprockets 124. Additionally, in the arrangement shown, as one example, the vertically positioned links 148 of chain 146 fit between the protrusions 130 of sprockets 124. In this configuration, as one example, sprockets 124 facilitate the smooth movement of chain 146 of tracks 84 in view of the alternating positioning of links 148 of chain 146. This configuration of sprockets 124 is also advantageous because the contours 132 create multiple points of connection with links 148 of chain 146 which reduces wear and tear on both plates 126 and links 148. In this way, the configuration shown as one example, contributes to a longer useful life of both sprockets 124 and chain 146 of tracks 84.

Sprocket Motor: In the arrangement shown, as one example, first sprocket assembly 78 is attached to sprocket motor 80. Sprocket motor 80 is formed of any suitable size, shape, and design is and configured to facilitate the rotation of first sprocket assembly 78, thereby causing the rotation of tracks 84 around track frame 76. In the arrangement shown, as one example, sprocket motor 80 is a hydrostatically driven motor which is driven by the engine 220 of power system 28. However, while sprocket motor 80 is a hydrostatically driven motor in the arrangement shown, as one example, any other type of motor may be used as sprocket motor 80, including, for example, an electric motor. In other words, any type motor which causes the rotation of first sprocket assembly 78 may be used as sprocket motor 80.

Tensioning Mechanism: In the arrangement shown, as one example, second sprocket assembly 82 connected to a tensioning mechanism 86 on each end. Tensioning mechanism 86 is formed of any suitable size, shape, and design and is configured to provide for the proper tensioning (i.e. tightening or loosening) of tracks 84 around track frame 76. In the arrangement shown, as one example, tensioning mechanism 86 connects to bolt plate 144 which helps facilitate connection between tensioning mechanism 86 and tracks 84. In the arrangement shown, as one example, tensioning mechanism 86 is a grease gun, however tensioning mechanism 86 may be any other type of mechanism which allows for tracks 84 to be tightened or loosened around track frame 76, such as a pneumatic cylinder or any other mechanism.

In the arrangement shown, as one example, tensioning mechanism 86 is positioned on the outside of forward sprocket engagement members 108 and bolts extend through bolt plate 144 and through slots 112 of forward sprocket engagement members 108 and facilitate connection with bearings 120 of second sprocket assembly 82. In this way, there is a tensioning mechanism 86 connected to each side of forward sprocket engagement members 108. In this way, when track 84 loosens around track frame 76, the tensioning mechanism 86 on each side of second sprocket assembly 82 can be activated, such that bolt plate 144 is moved outward along with bolts which connect tensioning mechanism 86 to second sprocket assembly 82. When the bolts connected to second sprocket assembly 82 move outward with bolt plate 144 when tensioning mechanism 86 is activated, second sprocket assembly 82 also moves outward and tightens tracks 84 around track frame 76.

Through first sprocket assembly 78, second sprocket assembly 82, sprocket motor 80, and tensioning mechanism 86, tracks 84 are operatively connected to and rotated around track frame 76, thereby causing movement of vehicle 10 when track assemblies 24 are used as drive members 24.

Tracks: In the arrangement shown, as one example, tracks assemblies 24 include tracks 84. Tracks 84 are formed of any suitable size, shape, and design and are configured to provide propulsion means for vehicle 10 while vehicle 10 is on land. In the arrangement shown, as one example, tracks 84 include a chain 146 comprised of links 148, cleats 150, wear blocks 152, fasteners 154 and saddle washers 156. In the arrangement shown, tracks 84 are formed of multiple pieces that are connected or assembled to one another through bolting, however any other means of connecting or assembling the multiple pieces may be used, including screwing, welding, friction fitting, or the like. Alternatively, tracks 84 may be formed of a single, unitary member that is formed in a manufacturing process such as machining, extrusion, forming, additive manufacturing, or the like to form a unitary and monolithic member.

In the arrangement shown, as one example, tracks 84 include a chain 146. Chain 146 is formed of any suitable size, shape, and design and is configured to form a continuous loop around track frame 76 and connect to cleats 150. In the arrangement shown, as one example, chain 146 is formed of multiple links 148. In the arrangement shown, as one example, links 148 are formed primarily of a metallic material such as steel, aluminum, chromium, or any other metallic material, alloy, and/or composite thereof. Alternatively, links 148 may be formed of a non-metallic material such as a plastic material, a fiberglass material, or any other non-metallic material and/or composite thereof. In the arrangement shown, as one example, links 148 are generally ovular members which have large openings in the middle thereof which facilitate connection to additional links 148. In the arrangement shown, as one example, adjacent links 148 are positioned such that one link 148 is approximately perpendicular, or at a 90 degree angle, relative to adjacent links 148. In this way, chain 146 is comprised of alternating vertical and horizontally positioned links 148.

In the arrangement shown, as one example, tracks 84 include fasteners 154 and saddle washers 156. Saddle washers 156 are formed of any suitable size, shape, and design and are configured to facilitate connection between chain 146 and cleats 150. In the arrangement shown, as one example, saddle washers 156 are generally rectangular members with recesses 158 on one surface of the saddle washer 156. In the arrangement shown, as one example, recesses 158 are generally round and convex recesses which allow a portion of a link 148 of chain 146 to fit within recesses 158 of saddle washer 156. In the arrangement shown, as one example, saddle washers 156 also include openings on the outer sides of recesses 158. In the arrangement shown, as one example, the openings are generally circular openings through which fasteners 154 may extend.

In the arrangement shown, as one example, one saddle washer 156 is placed on top of a horizontally positioned link 148 and another saddle washer 156 is placed below a link 148 such that the saddle washers 156 surround said link 148. Fasteners 154 are then inserted through the openings of saddle washers 156, thereby facilitating connection between saddle washers 156 and chain 146. Fasteners 154 are also inserted through cleats 150, thereby facilitating connection between chain 146 and cleats 150. Once fasteners 154 are inserted through saddle washers 156 and cleats 150, a nut is placed on one end of fasteners 154, thereby facilitating secured connection between chain 146 and cleats 150.

In the arrangement shown, as one example, tracks 84 include cleats 150. Cleats 150 are formed of any suitable size, shape, and design and are configured to engage the ground while vehicle 10 is on land and provide for the propulsion of vehicle 10 when tracks 84 are rotated around track frame 76 which vehicle 10 is on land. In the arrangement shown, as one example, cleats 150 are generally elongated members extending a length between opposing sides. In the arrangement shown, as one example, cleats 150 include outer walls 160 and a bottom wall 162. In the arrangement shown, as one example, outer walls 160 extend vertically up from bottom wall 162 and form a channel which extends along the length of cleats 150. In the arrangement shown, as one example, the top side of outer walls 160 engage the ground when vehicle 10 is on land, at least partially digging into the ground, and when tracks 84 are rotated around track frame 76, the engagement between outer walls 160 and the ground causes vehicle 10 to be propelled forward or rearward, depending on the direction of rotation of tracks 84. In the arrangement shown, as one example, bottom wall 162 provides for the connection of cleats 150 to chain 146 and for the connection of wear blocks 152 to tracks 84.

In the arrangement shown, as one example, tracks 84 include wear blocks 152. Wear blocks 152 are formed of any suitable size, shape, and design and are configured to reduce wear and tear on tracks 84, and more specifically cleats 150, and to help facilitate the alignment of tracks 84 as they are rotated around track frame 76. In the arrangement shown, as one example, wear blocks 152 are formed of a non-metallic material with a low coefficient of friction, such as plastic. In the arrangement shown, as one example, tracks 84 include three wear blocks 152, with a wear block 152 connected to the underside of bottom wall 162 of cleat 150 at each opposing side of cleat 150, and one wear block 152 connected to the underside of bottom wall 162 of cleat 150 at the middle of cleat 150. In the arrangement shown, as one example, the outer wear blocks 152 are generally L-shaped, which allows these wear blocks 152 to contact guides 106 of track frame 76. These L-shaped wear blocks 152 contact guides 106 on both the vertically and horizontally extending portions of wear blocks 152. When both vertically extending portions of these L-shaped wear blocks 152 contact guides 106, tracks 84 are in proper alignment with track frame 76. In the arrangement shown, as one example, the horizontally extending portions of these L-shaped wear blocks 152 and the centrally located wear block 152 are configured to provide a surface upon which tracks 84 can contact track frame 76. In the arrangement shown, as one example, because wear blocks 152 are made of a plastic material which can be easily replaced, wear and tear on tracks 84 is reduced and the useful life of tracks 84 is extended.

In the arrangement shown and described herein, tracks 84 are described as including chain 146 and cleats 150. Rather than utilizing tracks 84 formed of chain 146 and cleats 150, in alternative arrangements, as example, tracks 84 may be formed of a continuous non-metallic material forming a loop around track frame 76. In an alternative arrangement, as one example, tracks 84 may be rubber tracks which form a continuous loop around track frame 76 and include protrusions or teeth extending out of the interior and exterior surfaces of tracks 84 in order to facilitate operable engagement with first sprocket assembly 78 and second sprocket assembly 80, and also with the ground or floor system 10 is driving on.

In the arrangement shown and described herein, as one example, drive members 24 are a pair of track assemblies 24. However, vehicle 10 is not so limited and any other means of propelling vehicle 10 while on land may be utilized and are hereby contemplated for use, including the use of wheels as drive members 24.

In the arrangement shown, as one example, track assemblies 24 include a track frame 76 which serve as floats and the track frame 76 have an interior cavity 97 with partitions 98 forming sealed compartments therein. However, tracks frames 76 can be utilized in other manners when it is not necessary for vehicle 10 to float on water or other fluid or liquid. In an alternative arrangement, tracks frames 76 can have an interior cavity 97 which is completely hollow (i.e. no partitions 98) and which can be used to store materials therein, which could include water, other liquids, or dry chemicals to help in firefighting situations, as one example. So, while tracks frames 76 have been described according to the embodiment shown as one example, other uses for track frames 76 are hereby contemplated for use.

In the arrangement shown, as one example, when drive members 24 are track assemblies 24, which provide for propulsion of vehicle 10 while on land, and track frame 76 is a float, vehicle 10 can float on liquid. When vehicle 10 is floating on liquid, vehicle 10 can be propelled utilizing liquid delivery system 26.

Liquid Delivery System:

In the arrangement shown, as one example, vehicle 10 includes a liquid delivery system 26. Liquid delivery system 26 is formed of any suitable size, shape, and design and is configured to provide propulsion to vehicle 10 when vehicle 10 is floating on a liquid and also to provide agitation when vehicle 10 is used to agitate manure lagoons. In the arrangement shown, as one example, liquid delivery system 26 has a front end 164, a rear end 166, and opposing sides 168. In the arrangement shown, as one example, liquid delivery system 26 includes attachment components 170, a reservoir pump 172 powered by the reservoir pump motor 174, a conduit 176, a first nozzle 178, a second nozzle 180, a third nozzle 182, and an outflow hookup 184. In the arrangement shown, as one example, liquid delivery system 26 generally forms a continuous loop through which liquid is pumped.

In the arrangement shown, as one example, liquid delivery system 26 is configured to attach to frame assembly 22 through attachment components 170. In the arrangement shown, as one example, attachment components are generally portions of metallic material which extend out from liquid delivery system 26, and more specifically from conduit 176, and include openings through which bolts or other attachment means may be placed or positioned in order to attach liquid delivery system 26 to frame assembly 22.

Reservoir Pump: In the arrangement shown, as one example, liquid delivery system 26 brings liquid into the system through reservoir pump 172. Reservoir pump 172 is formed of any suitable size, shape, and design and is configured to be submerged into a reservoir, such as a manure lagoon, and pump liquid and/or sludge from the reservoir into liquid delivery system 26. In the arrangement shown, as one example, reservoir pump 172 is a centrifugal fluid impeller pump. In the arrangement shown, as one example, the reservoir pump 172 is driven by the reservoir pump motor 174. In the arrangement shown, as one example, reservoir pump 172 includes a housing 186, an inlet 188, impellers (not shown), an outlet 190, a flow sensor 192, and a control module 194. In the arrangement shown, as one example, reservoir pump 172 is able to chop up any solid material which comes into reservoir pump 172, thereby turning the solid material into sludge or smaller particles which can be transported through liquid delivery system 26.

In the arrangement shown, as one example, reservoir pump 172 includes a housing 186. Housing 186 is formed of any suitable size, shape, and design and is configured to encloses portions of reservoir pump 172. In the arrangement shown, as one example, housing 186 is a flexible bearing case that is generally circular in shape. In the arrangement shown, as one example, housing 186 is formed of multiple pieces that are connected or assembled to one another such as through welding, screwing, bolting, friction fitting, or the like.

In the arrangement shown, as one example, the impellers of reservoir pump 172 are driven by reservoir pump motor 174. Reservoir pump motor 174 is formed of any suitable size, shape, and design and is configured to provide power to reservoir pump 172. In the arrangement shown, as one example, reservoir pump motor 174 is a hydrostatically driven motor which is driven by the engine 220 of power system 28. However, while reservoir pump motor 174 is a hydrostatically driven motor in the arrangement shown, as one example, any other type of motor may be used as reservoir pump motor 174, including, for example, an electric motor. In other words, any type motor which provides power to reservoir pump 172 may be used as reservoir pump motor 174. In the arrangement shown, as one example, reservoir pump motor 174 rests on a platform 196, keeping reservoir pump motor 174 above and out of the reservoir when reservoir pump 172 is pumping liquid from the reservoir. In the arrangement shown, as one example, platform 196 is a metallic member, generally in the shape of a rectangle, which is configured to connect to frame assembly 22 and support reservoir pump motor 174.

In the arrangement shown, as one example, reservoir pump 172 includes inlet 188. Inlet 188 is formed of any suitable size, shape, and design and is configured to take in liquids, solids, and/or sludge from the reservoir when reservoir pump 172 is in operation. In the arrangement shown, as one example, when reservoir pump 172 is submerged in a reservoir and reservoir pump 172 is activated and liquids, solids, and/or sludge is pulled into reservoir pump 172 through inlet 188. When liquids, solids, and/or sludge are pulled in through inlet 188, the impellers (not shown) of reservoir pump 172 are rotating and the impellers force the solid, liquid, and/or sludge outward towards the interior walls of housing 186. When the liquids, solids, and/or sludge is forced outward by the impellers, the liquid will leave reservoir pump 172 through outlet 190. Outlet 190 is formed of any suitable size, shape, and design and is configured to connect to conduit 176 of liquid delivery system 26. In the arrangement shown, as one example, outlet 190 is a cylindrical tube extending upward from reservoir pump 172 to connect to conduit 176. In the arrangement shown, as one example, when reservoir pump 172 is in operation, the liquids, solids, and/or sludge which is brought in through inlet 188 travels through reservoir pump 172 to outlet 190, where it then enters into conduit 176.

In the arrangement shown, as one example, reservoir pump 172 includes a flow sensor 192 and a control module 194. In the arrangement shown, as one example, flow sensor 192 is formed of any suitable size, shape, and design and is configured to sense when reservoir pump 172 experiences a plug. In the arrangement shown, as one example, reservoir pump 172 can take in solid material and at least partially break down the solid material by chopping it into smaller pieces. While reservoir pump 172 is typically able to break down these solid materials, it is not always able to breach down all the solid material, and this solid material may cause a plug in reservoir pump 172. When it does, flow sensor 192 senses the plug and sends a signal to control module 194.

In the arrangement shown, as one example, reservoir pump 172 includes control module 194. Control module 194 is formed of any suitable size, shape, and design and is configured to receive the signal from flow sensor 192 and unplug reservoir pump 172. In the arrangement shown, as one example, when control module 194 receives a signal from flow sensor 192 that reservoir pump 172 is plugged, control module 194 will stop operation of the reservoir pump 172 and then reverse operation of reservoir pump 172 and more specifically, the impellers of reservoir pump 172 are reversed. When operation of the impellers of reservoir pump 172 is reversed, the flow of the liquid, sludge, and solid material within liquid delivery system 26 is reversed and pumped out of liquid delivery system 26 through reservoir pump 172. When this liquid, sludge, and solid material is pumped out of liquid delivery system 26 through reservoir pump 172, this flow will dislodge the material causing the plug. Once the plug is cleared from reservoir pump 172, the control module 194 will stop operation of the reservoir pump 172 and reverse operation again, thereby resuming the normal pumping of material into liquid delivery system 26 through reservoir pump 172. In this way, control module 194 allows for the automatic unplugging of reservoir pump 172 without any human intervention or labor.

In the arrangement shown, as one example, when liquid is pumped into liquid delivery system 26 through reservoir pump 172, liquid exits reservoir pump 172 through outlet 190 and enters conduit 176.

Conduit: In the arrangement shown, as one example liquid delivery system 26 includes a conduit 176. Conduit 176 is formed of any suitable size, shape, and design and is configured to provide passage of liquid through liquid delivery system 26 and connect various components of liquid delivery system 26. In the arrangement shown, as one example, conduit 176 is a cylindrical pipe which extends in a continuous loop around vehicle 10. In the arrangement shown, as one example, conduit 176 is formed primarily of a metallic material such as steel, aluminum, chromium, or any other metallic material, alloy, and/or composite thereof. Alternatively, conduit 176 may be formed of a non-metallic material such as a plastic material, a polyvinyl chloride material, a fiberglass material, or any other non-metallic material and/or composite thereof. In the arrangement shown, as one example, conduit 176 is formed of multiple pieces that are connected or assembled to one another such as through coupling, welding, friction fitting, or the like. In the arrangement shown, as one example, conduit 176 includes a first forward joint 198, a second forward joint 200, elbow joints 202, a first rearward joint 204, and a second rearward joint 206.

In the arrangement shown, as one example, conduit 176 includes first forward joint 198. First forward joint 198 is formed of any suitable size, shape, and design and is configured to connect conduit 176 to outlet 190 of reservoir pump 172 and to first nozzle 178. In the arrangement shown, as one example, first forward joint 198 is primarily formed of metallic material such as steel, aluminum, chromium, or any other metallic material, alloy, and/or composite thereof. Alternatively, first forward joint 198 may be formed of a non-metallic material such as a plastic material, a polyvinyl chloride material, a fiberglass material, or any other non-metallic material and/or composite thereof. In the arrangement shown, as one example, first forward joint 198 may be formed of multiple pieces that are connected or assembled to one another such as through welding, coupling, bolting, friction fitting, or the like. Alternatively, in one or more arrangements, first forward joint 198 may be formed of a single, unitary member that is formed in a manufacturing process such as machining, extrusion, forming, additive manufacturing, or the like to form a unitary and monolithic member.

In the arrangement shown, as one example, first forward joint 198 extends a length vertically, up from outlet 190 of reservoir pump 172. In the arrangement shown, as one example, first forward joint 198 includes three cylindrical openings, one at each of its top and bottom sides and one at its forward end. In the arrangement shown, as one example, first forward joint 198 connects to outlet 190 at its bottom opening, such that liquid which is pumped into liquid delivery system 26 flows through outlet 190 and into first forward joint 198. In the arrangement shown, as one example, first forward joint 198 connects to first nozzle 178 at its forward opening such that liquid flowing into first forward joint 198 can be pumped out through first nozzle 178. In the arrangement shown, as one example, first forward joint 198 connects to second forward joint 200 of conduit 176 at its top opening, such that water pumped into first forward joint 198 can be pumped through second forward joint 200 to the remainder of conduit 176. While first forward joint 198 has been described according to the arrangement shown, as one example, any other configuration or design of first forward joint 198 can be used and is hereby contemplated for use in order to connect reservoir pump 172, first nozzle 178, and conduit 176.

In the arrangement shown, as one example, conduit 176 includes second forward joint 200. Second forward joint 200 is formed of any suitable size, shape, and design and is configured to connect conduit 176, first forward joint 198, and third nozzle 182. In the arrangement shown, as one example, second forward joint 200 is primarily formed of metallic material such as steel, aluminum, chromium, or any other metallic material, alloy, and/or composite thereof. Alternatively, second forward joint 200 may be formed of a non-metallic material such as a plastic material, a polyvinyl chloride material, a fiberglass material, or any other non-metallic material and/or composite thereof. In the arrangement shown, as one example, second forward joint 200 may be formed of multiple pieces that are connected or assembled to one another such as through welding, coupling, bolting, friction fitting, or the like. Alternatively, in one or more arrangements, second forward joint 200 may be formed of a single, unitary member that is formed in a manufacturing process such as machining, extrusion, forming, additive manufacturing, or the like to form a unitary and monolithic member.

In the arrangement shown, as one example, second forward joint 200 extends primarily in a horizontal direction from near one side 16 of vehicle 10 to near the opposing side 16 of vehicle 10. In the arrangement shown, as one example, second forward joint 200 includes four cylindrical openings, one on each of the top, bottom, left, and right sides. In the arrangement shown, as one example, second forward joint 200 connects to first forward joint 198 at its bottom opening, such that liquid is able to flow into second forward joint 200 through first forward joint 198. In the arrangement shown, as one example, second forward joint 200 connects to third nozzle 182 at its top opening such that liquid flowing through second forward joint 200 can flow to and out third nozzle 182. In the arrangement shown, as one example, second forward joint 200 connects to elbow joints 202 of conduit 176 at its left and right openings such that liquid flowing through second forward joint 200 can flow to the remainder of conduit 176 through elbow joints 202. While second forward joint 200 has been described according to the arrangement shown, as one example, any other configuration or design of second forward joint 200 can be used and is hereby contemplated for use in order to connect conduit 176, first forward joint 198, and third nozzle 182.

In the arrangement shown, as one example, conduit 176 includes elbow joints 202. Elbow joints 202 are formed of any suitable size, shape, and design and are configured to allow for conduit 176 to form a loop. In the arrangement shown, as one example, elbow joints 202 are curved joints which form an angle of approximately 90 degrees. In this way, in the arrangement shown as one example, elbow joints 202 allow conduit 176 to be formed primarily of straight pipe members, while still forming a loop due to the angled nature of elbow joints 202. In the arrangement shown, as one example, an elbow joint 202 is connected to each of the left and right openings of second forward joint 200 and an elbow joint 202 is also connected at each of the left and right openings of first rearward joint 204. In this way, conduit 176 on the left and right sides 16 of vehicle 10 extend in a straight manner in approximate parallel spaced relation to one another. In the arrangement shown, as one example, second forward joint 200 and first rearward joint 204 also extend in a straight manner in approximate parallel spaced relation to one another and in approximate perpendicular relation to the portions of conduit 176 on the left and right sides 16 of vehicle 10. In the arrangement shown, as one example, elbow joints 202 are provided where second forward joint 200 meets the portion of conduit 176 on the left and right sides 16 of vehicle 10, and elbow joints 202 are provided where the first rearward joint 204 meets the portion of conduit 176 on the left and right sides 16 of vehicle 10. In this way, elbow joints 202 allow the generally straight members of conduit 176 to form a loop around vehicle 10.

In the arrangement shown, as one example, conduit 176 includes a first rearward joint 204. First rearward joint 204 is formed of any suitable size, shape, and design and is configured to connect conduit 176 to outflow hookup 184. In the arrangement shown, as one example, first rearward joint 204 is primarily formed of metallic material such as steel, aluminum, chromium, or any other metallic material, alloy, and/or composite thereof. Alternatively, first rearward joint 204 may be formed of a non-metallic material such as a plastic material, a polyvinyl chloride material, a fiberglass material, or any other non-metallic material and/or composite thereof. In the arrangement shown, as one example, first rearward joint 204 may be formed of multiple pieces that are connected or assembled to one another such as through welding, coupling, bolting, friction fitting, or the like. Alternatively, in one or more arrangements, first rearward joint 204 may be formed of a single, unitary member that is formed in a manufacturing process such as machining, extrusion, forming, additive manufacturing, or the like to form a unitary and monolithic member.

In the arrangement shown, as one example, first rearward joint 204 extends primarily in a horizontal direction from near one side 16 of vehicle 10 to near the opposing side 16 of vehicle 10. In the arrangement shown, as one example, first rearward joint 204 includes three cylindrical openings, one at each of its left and right sides and one at its rearward end. In the arrangement shown, as one example, first rearward joint 204 connects to outflow hookup 184 at its rearward opening such that liquid flowing through conduit 176 can be transferred to and expelled out of outflow hookup 184. In the arrangement shown, as one example, first rearward joint 204 connects to elbow joints 202 at each of its left and right openings such that liquid flowing through conduit 176 can flow into and out of first rearward joint 204. While first rearward joint 204 has been described according to the arrangement shown, as one example, any other configuration or design of first rearward joint 204 can be used and is hereby contemplated for use in order to connect conduit 176 and outflow hookup 184.

In the arrangement shown, as one example, conduit 176 includes second rearward joint 206. Second rearward joint 206 is formed of any suitable size, shape, and design and is configured to connect conduit 176 to second nozzle 180. In the arrangement shown, as one example, second rearward joint 206 is primarily formed of metallic material such as steel, aluminum, chromium, or any other metallic material, alloy, and/or composite thereof. Alternatively, second rearward joint 206 may be formed of a non-metallic material such as a plastic material, a polyvinyl chloride material, a fiberglass material, or any other non-metallic material and/or composite thereof. In the arrangement shown, as one example, second rearward joint 206 may be formed of multiple pieces that are connected or assembled to one another such as through welding, coupling, bolting, friction fitting, or the like. Alternatively, in one or more arrangements, second rearward joint 206 may be formed of a single, unitary member that is formed in a manufacturing process such as machining, extrusion, forming, additive manufacturing, or the like to form a unitary and monolithic member.

In the arrangement shown, as one example, second rearward joint 206 extends a distance from near rearward end 14 of vehicle 10 towards forward end 12 of vehicle 10. In the arrangement shown, as one example, second rearward joint 206 includes three cylindrical openings, one on each of the forward and rearward ends, and one opening up to the interior and lower side of conduit 176. In the arrangement shown, as one example, second rearward joint 206 connects to second nozzle 180 at its interior, lower opening such that liquid flowing through conduit 176 can be transferred to and expelled out from second nozzle 180. In the arrangement shown, as one example, the forward opening of second rearward joint 206 connects to a portion of conduit 176 along a side 16 of vehicle 10. In the arrangement shown, as one example, the rearward opening of second rearward joint 206 connects to an elbow joint 202. In this way, liquid flowing through conduit 176 can flow into and out of second rearward joint 206. While second rearward joint 206 has been described according to the arrangement shown, as one example, any other configuration or design of second rearward joint 206 can be used and is hereby contemplated for use in order to connect conduit 176 to second nozzle 180.

In the arrangement shown, as one example, conduit 176 is designed to carry liquid around liquid delivery system 26 such that liquid can flow out of first nozzle 178, second nozzle 180, third nozzle 182, and/or outflow hookup 184 in order to provide propulsion and directional control to vehicle 10 while vehicle 10 is floating on a liquid, and also to provide agitation to manure lagoons.

First Nozzle: In the arrangement shown, as one example, liquid delivery system 26 includes first nozzle 178. First nozzle 178 is formed of any suitable size, shape, and design and is configured to allow liquid to flow out of first nozzle 178 in order to provide propulsion and/or directional control to vehicle 10 while vehicle 10 is floating on a liquid. In multiple different uses, first nozzle 178 also provides a means for agitating liquid, sludge, and/or solid material within a reservoir, such as a manure lagoon. In the arrangement shown, as one example, first nozzle 178 is located on the bottom side 20 of vehicle 10 and is submerged in the reservoir of liquid while vehicle 10 is floating, therefore liquid flowing out of first nozzle 178 flows directly into the reservoir. In the arrangement shown, as one example, first nozzle 178 is configured to pitch toward either opposing side 16 in order to provide directional control to vehicle 10 while it is floating on a liquid. In the arrangement shown, as one example, there is one first nozzle 178, however first nozzle 178 may be a set of nozzles with any number of first nozzles 178 in alternative arrangements.

In the arrangement shown, as one example, first nozzle 178 is located at forward end 12 of vehicle 10 and connects to first forward joint 198 of conduit 176 through nozzle arm 208 of first nozzle 178. Nozzle arm 208 of first nozzle 178 is formed of any suitable size, shape, and design and is configured to connect first nozzle 178 to conduit 176. In the arrangement shown, as one example, nozzle arm 208 of first nozzle 178 is extremely similar to, if not identical to, elbow joints 202. In the arrangement shown, as one example, nozzle arm 208 of first nozzle 178 connects to the forward opening of first forward joint 198. In the arrangement shown, as one example, nozzle arm 208 of first nozzle 178 extends forward from first forward joint 198 before curving downward at approximately a 90 degree angle and then connecting to first nozzle 178, with first nozzle 178 pointing at least partially downward.

In the arrangement shown, as one example, first nozzle 178 includes a gate 210 where nozzle arm 208 of first nozzle 178 connects to the forward opening of first forward joint 198. Gate 210 of first nozzle 178 is formed of any suitable size, shape, and design and is configured to control the flow of liquid or other material to first nozzle 178. In the arrangement shown, as one example, gate 210 of first nozzle 178 is a hydraulic knife gate which is capable of being controlled remotely or manually, meaning the flow of liquid or other material to first nozzle 178 is able to be controlled remotely and controllable while vehicle 10 is being operated. In other words, the flow into and out of first nozzle 178 can be controlled and adjusted remotely while vehicle 10 is in operation.

In the arrangement shown, as one example, first nozzle 178 includes a ram 212 near the point where nozzle arm 208 of first nozzle 178 connects to the forward opening of first forward joint 198. Ram 212 of first nozzle 178 is formed of any suitable size, shape, and design and is configured to facilitate the pivoting of first nozzle 178 between multiple different angles. In the arrangement shown, as one example, ram 212 of first nozzle 178 is a hydraulic ram which is capable of being controlled remotely or manually, meaning the direction and/or angle at which first nozzle 178 is pointed can be adjusted while vehicle 10 is being operated. By way of example and not limitation, first nozzle 178 can be pointed toward the right side 16 of vehicle 10 with liquid being forced out of first nozzle 178 in order to push the forward end 12 of vehicle 10 toward the left. Once vehicle 10 is headed in the correct direction, ram 212 of first nozzle 178 can be activated to point first nozzle 178 generally straight downward in order to stop the propulsion of vehicle 10 to the left and, if vehicle 10 needs to be pushed back to the right, ram 212 of first nozzle 178 can be activated to point first nozzle 178 toward the left side 16 of vehicle and the liquid being forced out of first nozzle 178 causes the forward end 12 of vehicle 10 to turn back to the right.

Second Nozzle: In the arrangement shown, as one example, liquid delivery system 26 includes second nozzle 180. Second nozzle 180 is formed of any suitable size, shape, and design and is configured to allow liquid to flow out of second nozzle 180 in order to provide propulsion and/or directional control to vehicle 10 while vehicle 10 is floating on a liquid. In multiple different uses, second nozzle 180 also provides a means for agitating liquid, sludge, and/or solid material within a reservoir, such as a manure lagoon. In the arrangement shown, as one example, second nozzle 180 is located on the bottom side 20 of vehicle 10 and is submerged in the reservoir of liquid while vehicle 10 is floating, therefore liquid flowing out of second nozzle 180 flows directly into the reservoir. In the arrangement shown, as one example, second nozzle 180 is configured to pitch toward either forward end 12 or rearward end 14 in order to provide forward or rearward propulsion to vehicle 10 while it is floating on a liquid. In the arrangement shown, as one example, there are two second nozzles 180 (i.e. a set of second nozzles 180), however second nozzle 180 may be a single second nozzle 180, or a set of nozzles with any other number of second nozzles 180 in alternative arrangements.

In the arrangement shown, as one example, second nozzle 180 is located at rearward end 14 of vehicle 10 and connects to second rearward joint 206 of conduit 176 through nozzle arm 209. Nozzle arm 209 of second nozzle 180 is formed of any suitable size, shape, and design and is configured to connect second nozzle 180 to conduit 176. In the arrangement shown, as one example, nozzle arm 209 of second nozzle 180 is extremely similar to, if not identical to, nozzle arm 208 of first nozzle 178. In the arrangement shown, as one example, nozzle arm 209 of second nozzle 180 connects to the interior, downward opening of second rearward joint 206. In the arrangement shown, as one example, nozzle arm 209 of second nozzle 180 extends toward the interior of vehicle 10 before curving downward at approximately a 90 degree angle and then connecting to second nozzle 180, with second nozzle 180 pointing at least partially downward.

In the arrangement shown, as one example, second nozzle 180 also includes a gate 211 where nozzle arm 209 of second nozzle 180 connects to the interior, downward opening of second rearward joint 206. Gate 211 of second nozzle 180 is formed of any suitable size, shape, and design and is configured to control the flow of liquid or other material to second nozzle 180. In the arrangement shown, as one example, gate 211 of second nozzle 180 is a hydraulic knife gate which is capable of being controlled remotely or manually, meaning the flow of liquid or other material to second nozzle 180 is able to be controlled remotely and controllable while vehicle 10 is being operated. In other words, the flow into and out of second nozzle 180 can be controlled and adjusted remotely while vehicle 10 is in operation.

In the arrangement shown, as one example, second nozzle 180 also includes a ram 213 near the point where nozzle arm 209 of second nozzle 180 connects to the interior, downward opening of second rearward joint 206. Ram 213 of second nozzle 180 is formed of any suitable size, shape, and design and is configured to facilitate the pivoting of second nozzle 180 between multiple different angles. In the arrangement shown, as one example, ram 213 is a hydraulic ram which is capable of being controlled remotely or manually, meaning the direction and/or angle at which second nozzle 180 is pointed can be adjusted while vehicle 10 is being operated. By way of example and not limitation, second nozzle 180 can be pointed toward the rearward end 14 of vehicle 10 with liquid being forced out of second nozzle 180 in order to propel vehicle 10 forward. When vehicle 10 needs to be slowed down, ram 213 can be activated to point second nozzle 180 downward in order to stop the active forward propulsion of vehicle 10 and, if vehicle needs to be stopped quickly or reversed, ram 213 can be activated further such that second nozzle 180 is pointed toward the forward end 12 of vehicle 10 and the liquid being forced out of second nozzle 180 causes the forward propulsion of vehicle 10 to be slowed, stopped, and reversed as needed.

Third Nozzle: In the arrangement shown, as one example, liquid delivery system 26 includes third nozzle 182. Third nozzle 182 is formed of any suitable size, shape, and design and is configured to allow liquid to flow out of third nozzle 182 in order to provide a means for agitating liquid, sludge, and/or solid material within a reservoir, such as a manure lagoon, or on the banks of such reservoir. In the arrangement shown, as one example, third nozzle 182 is located toward the top side 18 of vehicle 10 and is not submerged in the reservoir of liquid while vehicle 10 is floating, therefore liquid flowing out of third nozzle 182 flows through the air. In the arrangement shown, as one example, third nozzle 182 is configured to pitch towards top side 18, bottom side 20, and opposing left and right sides 16 in order to provide directional control of the liquid flowing out third nozzle 182. In the arrangement shown, as one example, there is one third nozzle 182, however third nozzle 182 may be a single third nozzle 182, or a set of nozzles with any number of third nozzles 182 in alternative arrangements.

In the arrangement shown, as one example, third nozzle 182 is located at forward end 12 of vehicle 10 and connects to second forward joint 200 of conduit 176 through nozzle arm 214. Nozzle arm 214 is formed of any suitable size, shape, and design and is configured to connect third nozzle 182 to conduit 176. In the arrangement shown, as one example, nozzle arm 214 is formed of multiple metallic pieces that are connected or assembled to one another such as through welding, coupling, screwing, bolting, friction fitting, or the like. In the arrangement shown, as one example, nozzle arm 214 includes a number of elbow joints similar to elbow joints 202. In the arrangement shown, as one example, nozzle arm 214 first extends upward from the top opening of second forward joint 200 using an elbow joint which then curves toward a side 16 of vehicle 10 at approximately a 90 degree angle, then connects with another elbow joint which curves toward the forward end 12 of vehicle 10 at approximately a 90 degree angle. Nozzle arm 214 then extends generally straight forward a distance before curving again backward toward opposing side 16 of vehicle 10, then curving again toward forward end 12, once more toward side 16, then finally toward forward end 12, and then connecting to third nozzle 182, with third nozzle 182 pointing at least partially outward and forward from forward end 12.

In the arrangement shown, as one example, third nozzle 182 also includes a gate 215 where nozzle arm 214 connects to the top opening of second forward joint 200. Gate 215 of third nozzle 182 is formed of any suitable size, shape, and design and is configured to control the flow of liquid or other material to third nozzle 182. In the arrangement shown, as one example, gate 215 of third nozzle 182 is a hydraulic knife gate which is capable of being controlled remotely or manually, meaning the flow of liquid or other material to third nozzle 182 is able to be controlled remotely and controllable while vehicle 10 is being operated. In other words, the flow into and out of third nozzle 182 can be controlled and adjusted remotely while vehicle 10 is in operation.

In the arrangement shown, as one example, third nozzle 182 also includes a first ram 216 and a second ram 218. First ram 216 and second ram 218 are formed of any suitable size, shape, and design and are configured to facilitate the pivoting of third nozzle 182 between multiple different angles and orientations. In the arrangement shown, as one example, first ram 216 and second ram 218 are hydraulic rams which are capable of being controlled remotely or manually, meaning the direction and/or angle at which third nozzle 182 is pointed can be adjusted while vehicle 10 is being operated. By way of example and not limitation, third nozzle 182 can be pointed toward either side 16 of vehicle 10 by operating first ram 216 and third nozzle 182 can be pointed either upward or downward relative to vehicle 10 by operating second ram 218. In the arrangement shown, as one example, if there is crust (in other words a grouping of solid material) that has formed on the surface of the reservoir on which vehicle 10 is floating, first ram 216 and second ram 218 can be operated in order to point third nozzle 182 toward the crust in order to break up the crust using liquid flowing through liquid delivery system 26 and out third nozzle 182. Additionally, in the arrangement shown, as one example, first ram 216 and second ram 218 can be operated in order to point third nozzle 182 toward areas along the bank of the reservoir in which vehicle 10 is floating in order to wash any liquid, solid, and/or sludge on the bank back into the reservoir.

In alternative arrangements, third nozzle 182 can be used in an identical manner in order to aid in putting out fires or in order to direct water or other liquid away from a certain areas. In this way, the first ram 216 and second ram 218 can be operated in order to point third nozzle 182, for example, toward a fire and liquid or other fire suppressant material can be expelled out of third nozzle 182 toward the fire in order to put the fire out.

Outflow Hookup: In the arrangement shown, as one example, liquid delivery system 26 includes outflow hookup 184. Outflow hookup 184 is formed of any suitable size, shape, and design and is configured to provide a way for the liquid pumped through liquid delivery system 26 to be moved to an external location. In the arrangement shown, as one example, outflow hookup 184 is a male hydro outflow hookup which can connected to a hose. In the arrangement shown, as one example, outflow hookup 184 includes a gate 221 and a cap 219. Cap 219 is formed of any suitable size, shape, and design and is configured to screw into outflow hookup 184 when outflow hookup 184 is not being used to transfer liquid to an external location.

In the arrangement shown, as one example, outflow hookup 184 is located at rearward end 14 of vehicle 10 and connects to the rearward opening of first rearward joint 204 of conduit 176. In the arrangement shown, as one example, outflow hookup 184 also includes a gate 221 where outflow hookup 184 connects to the rearward opening of first rearward joint 204. Gate 221 of outflow hookup 184 is formed of any suitable size, shape, and design and is configured to control the flow of liquid or other material to outflow hookup 184. In the arrangement shown, as one example, gate 221 of outflow hookup 184 is a hydraulic knife gate which is capable of being controlled remotely or manually, meaning the flow of liquid or other material to outflow hookup 184 is able to be controlled remotely and controllable while vehicle 10 is being operated. In other words, the flow into and out of outflow hookup 184 can be controlled and adjusted remotely while vehicle 10 is in operation.

In the arrangement shown, as one example, when vehicle 10 is being operated in a reservoir and the liquid in the reservoir needs to be moved to a different location, a hose can be connected to outflow hookup 184. When a hose is connected to outflow hookup 184, the gate 221 of outflow hookup 184 can be actuated and opened in order to allow liquid pumped into the liquid delivery system 26 by reservoir pump 172 to flow out or liquid delivery system 26 through outflow hookup 184. In one arrangement of vehicle 10, where vehicle 10 is floating on a manure lagoon, the manure within the lagoon can be pumped to a tank, a tanker vehicle, or directly to a field by connecting a hose to outflow hookup 184 and opening gate 221 of hookup 184 in order to allow the manure to flow to the external tank, tanker vehicle, or field.

While liquid delivery system 26 has been described according to the arrangement shown, as one example, liquid delivery system 26 is not so limited. For example, any other configuration of set up of liquid delivery system 26 may be used and is hereby contemplated for use, including having a liquid delivery system 26 with any number of reservoir pumps 172, or any number of nozzles, including first nozzle 178, second nozzle 180, third nozzle 182, and additional nozzles of any number and any set of nozzles with any number of nozzles therein. Additionally, while liquid delivery system 26 is described as delivering liquid, the liquid delivery system 26 may also be used to delivery other types of materials, including sludges, solid particulate materials, a mixture of solid and liquid materials, dry chemicals, or any other type of materials.

In the arrangement shown, as one example, liquid delivery system 26, specifically the reservoir pump motor 174 is connected to, and powered by power system 28 of vehicle 10.

Power System:

In the arrangement shown, as one example, vehicle 10 includes a power system 28. Power system 28 is formed of any suitable size, shape, and design and is configured to provide power to vehicle 10 and each of its components. In the arrangement shown, as one example, power system 28 includes an engine 220, a pump drive 222, fuel tanks 224, a header tank 226, and control panel 228.

In the arrangement shown, as one example, power system 28 includes an engine 220. Engine 220 is formed of any suitable side, shape, and design and is configured to provide power to the sprocket motor 80 on each track assembly 24, to reservoir pump motor 174, and to all other components of vehicle 10 needing power. In the arrangement shown, as one example, engine 220 may be a CAT® Tier 4 engine of varying horsepower, designed and manufactured by Caterpillar. However, any other type of engine from any other manufacturer or designer can be used as engine 220 of vehicle 10. In various alternative arrangements, engine 220 may be any other type of engine or motor, such as an electric motor, a diesel motor, a solar powered motor, or any other types of engine, motor, or power source.

In the arrangement shown, as one example, power system 28 includes pump drive 222. Pump drive 222 is formed of any suitable size, shape, and design and is configured to provide hydraulic fluid to the hydraulic components of vehicle 10 including, in the arrangement shown as one example, gate 210 of first nozzle 178, gate 211 of second nozzle 180, gate 215 of third nozzle 182, ram 212 of first nozzle 178, ram 213 of second nozzle 180, first ram 216 and second ram 281 of third nozzle 182, as well as tensioning mechanisms 86 connected to each track assemblies 24, and extension assemblies 44 of frame assembly 22.

In the arrangement shown, as one example, engine 220 utilizes gas, therefore vehicle 10 includes fuel tanks 224 and a header tank 226. Fuel tanks 224 are formed of any suitable size, shape, and design and are configured to hold gas therein. In the arrangement shown, as one example, a fuel tank 224 is provided on each side 16 of vehicle 10 and each fuel tank 224 connects to header tank 226. Header tank 226 is formed of any suitable size, shape, and design and is configured to serve as a reserve gas tank which is advantageous when fuel is low and vehicle 10 is being operated at an angle. In the arrangement shown, as one example, header tank 226 is gravity fed from fuel tanks 224 or, said another way, fuel feeds into header tank 226 from fuel tanks 224 and fuel can be taken from header tank 226 when vehicle 10 is operating at an angle where fuel tanks 224 are not able to provide fuel to engine 220 due to placement of the fuel lines.

In the arrangement shown, as one example, the function of power system 28 and the operation of vehicle 10 can be remotely controlled via wireless control assembly 30.

Wireless Control Assembly:

In the arrangement shown, as one example, vehicle 10 includes a wireless control assembly 30. Wireless control assembly 30 is formed of any suitable size, shape, and design and is configured to control the operation of vehicle 10 and the function of power system 28, as well as read diagnostic information provided by engine 220 and various sensors on vehicle 10, including flow sensor 192 of the liquid delivery system 26. In the arrangement shown, as one example, wireless control assembly 30 includes a screen 230, joysticks 232, gate controls 234, and auxiliary switches 236. Additionally, in the arrangement shown as one example, wireless control assembly 30 includes an electronic circuit 240, a communication circuit 242, memory 244 with instructions 246, and a processing circuit 248.

In the arrangement shown, as one example, wireless control assembly 30 includes screen 230. Screen 230 is formed of any suitable size, shape, and design and is configured to display signals and visual indicators to a user operating vehicle 10.

In the arrangement shown, as one example, wireless control assembly 30 includes joysticks 232. Joysticks 232 are formed of any suitable size, shape, and design and are configured to control the angle at which first nozzle 178, second nozzle 180, and/or third nozzle 182 are directed. In the arrangement shown, as one example, wireless control assembly 30 also includes gate controls 234. Gate controls 234 are formed of any suitable size, shape, and design and are configured to control gate 210 of first nozzle 178, gate 211 of second nozzle 180, gate 215 of third nozzle 182, and gate 221 of outflow hookup 184. In the arrangement shown, as one example, gate 210, gate 211, gate 215, and/or gate 221 may be moved between a fully open position, a fully closed position, or any position in between the fully open position and the fully closed position, and this positioning is controlled using gate controls 234. In the arrangement shown, as one example, wireless control assembly 30 also includes auxiliary switches 236. Auxiliary switches 236 are formed of any suitable size, shape, and design and are configured to control the operation of auxiliary systems which include, but are not limited to, autosteer teaching, engine start and stop, lights, and the like.

In the arrangement shown, as one example, wireless control assembly 30 may be used to set parameters for autosteer of vehicle 10. In the arrangement shown, as one example, wireless control 30 can be operated by a user to direct vehicle 10 to certain points in a reservoir. Once vehicle 10 is located at that point on the reservoir, the user can set that point as an outer parameter of the reservoir, and this process can be repeated until the outer parameter is set. Once the outer parameters are set, the user can then flip the autosteer auxiliary switch 236 and vehicle will operate on its own within the outer parameters. Vehicle 10 will utilize sensors such as GPS in order to stay within the outer parameters and sensors can be included in gate 210, gate 211, and gate 215 in order to make gate 210, gate 211, and gate 215 smart gates which automatically control the amount of liquid passing through first nozzle 178, second nozzle 180, and/or third nozzle 182, respectively, in order to provide the proper flow of liquid to safely and adequately agitate the reservoir in which vehicle 10 is operating.

In the arrangement shown, as one example, wireless control assembly 30 also includes electronic circuit 240. Electronic circuit 240 is formed of any suitable size, shape, design, technology, and in any arrangement and is configured to facilitate retrieval and processing of data or information from various sensors of vehicle 10 mentioned herein, as well as the joysticks 232, gate controls 234, and auxiliary switches 236 of wireless control assembly 30, and communication of said data or information to control panel 228 of vehicle 10. In the arrangement shown, as one example, electronic circuit 240 includes a communication circuit 242, a processing circuit 248, and a memory 244 with instructions 246 (or software code) which facilitates the operation of system 10.

In one or more arrangements, electronic circuit 240 includes communication circuit 242. Communication circuit 242 is formed of any suitable size, shape, design, technology, and in any arrangement and is configured to facilitate communication with control panel 228 of vehicle 10. In one or more arrangements, as examples, communication circuit 242 may include a transmitter (for one-way communication) or transceiver (for two-way communication). In some various arrangements, as examples, communication circuit 242 may be configured to communicate with control panel 228 and/or various components of system 10 and wireless control assembly 30 using various wired and/or wireless communication technologies and protocols over various networks and/or mediums including, but not limited to, IsoBUS, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, 4G, 5G, FM/VHF/UHF networks, and/or any other communication protocol, technology or network.

In various arrangements, as examples, electronic circuit 240 and/or communication circuit 242 may be configured to communicate data from joysticks 232, gate controls 234, and auxiliary switches 236 of wireless control assembly 30 to control panel 228 when a user moves any of joysticks 232, gate controls 234, or auxiliary switches 236, and/or in response to any other stimuli, command, or event.

In the arrangement shown, as one example, electronic circuit 240 includes processing circuit 248. Processing circuit 248 may be any computing device that receives and processes information and outputs commands, for example, according to instructions 246 stored in memory 244. For instance, in various arrangements as examples, processing circuit 248 may be discreet logic circuits or programmable logic circuits configured for implementing the operations or activities described herein. In certain arrangements, such a programmable circuit may include one or more programmable integrated circuits (e.g. field programmable gate arrays and/or programmable ICs). Additionally or alternatively, such a programmable circuit may include one or more processing circuits (e.g. a computer, microcontroller, system-on-chip, smart phone, server, and/or cloud computing resources). For instance, computer processing circuits may be programmed to execute a set (or sets) of instructions stored in and accessible from memory 244. Memory 244 may be any form of information storage such as flash memory, ram memory, dram memory, a hard drive, or any other form of memory.

In one or more arrangements, as examples, processing circuit 248 and memory 244 may be formed of a single combined unit. Alternatively, in various arrangements as examples, processing circuit 248 and memory 244 may be formed of separate but electronically connected components. In further alternative arrangements, as examples, processing circuit 248 and memory 244 may each be formed of multiple separate but communicatively connected components. Instructions 246 is any form of instructions or rules that direct how processing circuit 248 is to receive, interpret, and respond to information to operate as described herein. Instructions 246 (or software code) are stored in memory 244 and accessible to processing circuit 248.

In Operation:

Vehicle 10 can be operated by a user in order to agitate a reservoir, such as a manure lagoon. In this operation, the vehicle 10 can be driven on a trailer to the site of a lagoon. Once the vehicle 10 is at the site of the lagoon, vehicle 10 can be driven off the trailer using drive members 24 and wireless control assembly 30. In the arrangement shown, as one example, drive members 24 are track assemblies 24. When vehicle 10 with track assemblies 24 is driven to the site of the lagoon on a trailer, the track assemblies 24 must be placed in a retracted position to meet street legal width requirements. Once vehicle 10 is at the site of the lagoon and off the trailer, track assemblies 24 can continue to stay in the retracted position, or track assemblies 24 may be moved to an extended position using wireless control assembly 30. While track assemblies 24 are in a retracted position, the majority of elongated members 42 of frame assembly 22 are positioned within chambers 100 of track frame 76. When track assemblies 24 are moved to an extended position, elongated members 42 telescope or slide within chambers 100 until the desired width between track assembly 24 is reached. With track assemblies 24 in an extended position, vehicle 10 has improved stability and can be float within the lagoon or reservoir in a more stable manner.

In the arrangement shown, as one example, vehicle 10 is driven into the lagoon or reservoir using tracks 84. When the user utilizes joysticks 232 of wireless control assembly 30 in order to drive vehicle 10 forward, electronic circuit 240 or wireless control assembly 30 sends a signal to the control panel 228 of power system 28 which causes engine 220 to provide power to the sprocket motor 80 of one or both track assemblies 24. When power is provided to one or both sprocket motors 80, the first sprocket assembly 78 of one or both track assemblies 24 are rotated about their axis of rotation. When one or both first sprocket assemblies 78 are rotated, the links 148 of chain 146 of tracks 84 are pulled forward or backward, depending on the desired direction of travel, due to the contact between links 148 and the plates 126 of first sprocket assembly 78. As first sprocket assembly 78 rotates and links 148 are pulled, chain 146 is rotated around track frame 76. As chain 146 is rotated around track frame 76, cleats 150, which are connected to chain 146 through saddle washers 156, begin to move as they also engage the ground and cause vehicle 10 to be propelled forward or backward, depending on the desired direction of travel. As first sprocket assembly 78 rotates, it makes contact with new links 148 of chain 146. The horizontally oriented links 148 fall within the pockets formed by the contours 132 of protrusions 130 extending outward from plates 126 which form sprockets 124, and the vertically oriented links 148 rest within the gap between protrusions 130 of the pair of plates 126 which form sprockets 124. As forward sprocket assembly 78 continues to rotate and connect with new links 148 of chain 146, tracks 84 continue to rotate around track frame 76 and vehicle 10 continues to move forward or rearward.

In the arrangement shown, as one example, the sprocket motor 80 of one track assembly 24 can be controlled independently of the sprocket motor 80 of the other track assembly 24. The independent operation of sprocket motor 80 allows for directional control of vehicle 10 while it is being driven on land. That is, when the left sprocket motor 80 is operated without operation of the right sprocket motor 80, or the left sprocket motor 80 is operated at a higher speed then the right sprocket motor 80, vehicle 10 will generally travel toward the right. Conversely, when the right sprocket motor 80 is operated without operation of the left sprocket motor 80, or the right sprocket motor 80 is operated at a higher speed than the left sprocket motor 80, vehicle 10 will generally travel toward the left.

Once the user drives vehicle 10 into the reservoir or lagoon, track assemblies 24 also act as floats and provide buoyancy to vehicle 10, causing vehicle 10 to float in the reservoir or lagoon. With vehicle 10 floating in the reservoir, the user can activate reservoir pump 172. With reservoir pump 172 activated, liquid from the reservoir is pulled into reservoir pump 172 through inlet 188 and the impellers (not shown) of reservoir pump 172 direct the liquid through outlet 190 and into conduit 176. With liquid in conduit 176, the user can open, close, or partially open and/or close gate 210 of first nozzle 178, gate 211 of second nozzle 180, and/or gate 215 of third nozzle 182. If user wishes to propel vehicle 10 forward, user can open gate 211 of second nozzle 180 and operate ram 213 of second nozzle 180 to point second nozzle 180 backward. This will cause liquid to be force out of second nozzle 180 rearward which causes vehicle 10 to be propelled forward. Conversely, if user wishes to propel vehicle 10 backward, or stop the forward motion of vehicle 10, user can activate ram 213 to point second nozzle 180 forward, which will cause liquid to be forced out of second nozzle 180 in a forward direction which causes vehicle 10 to move rearward and/or stop the forward movement of vehicle 10.

Similarly, the user can operate gate 210 and ram 212 of first nozzle 178 to point first nozzle 178 to either the left side of vehicle 10, which will cause liquid to be forced out of first nozzle 178 the left, which will cause the vehicle 10 to move to the right. Conversely, the user can operate ram 212 of first nozzle 178 to point first nozzle 178 to the right side of vehicle 10, which will cause liquid to be forced out of first nozzle 178 to the right, which will cause the vehicle 10 to move to the left. In this arrangement, as one example, user can control the propulsion and direction of travel of vehicle 10 while vehicle 10 is floating on a reservoir through the use of liquid delivery system 26. Additionally, the forcing of liquid out of first nozzle 178, second nozzle 180, and/or third nozzle 182 provides agitation to the reservoir in which vehicle 10 is floating.

If user desires to pump liquid away from the reservoir in which vehicle 10 is being operated, a hose can be connected to outflow hookup 184. With a hose connected to outflow hookup 184, the user can open gate 221 of outflow hookup 184 and operate reservoir pump 172. When reservoir pump 172 is operated, liquid will be pulled into liquid delivery system through inlet 188, the impellers (not shown) of reservoir pump 172 direct the liquid through outlet 190, into conduit 176 and finally to outflow hookup 184. Once liquid flows through outflow hookup 184, it will travel through the hose to an external location, such as to a tank, a tanker vehicle, or other desired area.

Once the reservoir has been adequately agitated, or the liquid in the reservoir has been pumped out to the desired level of the user, the user can propel vehicle 10 to the bank of the reservoir and proceed to drive vehicle 10 out of the reservoir using a combination of the fluid delivery system 26 and drive members 24. Once vehicle 10 is able to use tracks 84 to propel vehicle 10 out of the reservoir, the user can shut off the reservoir pump 172 and vehicle 10 will be fully operated by the tracks 84.

Additionally, the user can operate vehicle 10 using autosteer according to the description provided herein. In this arrangement, as one example, the user drives vehicle 10 into the reservoir and proceeds to set the outside parameters. Once the outside parameters are set, the user can then turn on autosteer via the wireless control assembly 30 and vehicle 10 will automatically travel across the reservoir and agitate the reservoir.

Additional Attachments:

In alternative arrangements, as examples, additional attachments can be included to vehicle 10. Such additional attachments can be connected to the attachment openings 54 of support member 40 of frame assembly 22. One such attachment, as one example can be a blade attachment positioned on the front of the vehicle 10. With the blade attachment, vehicle 10 can be used to grade a reservoir or other piece of land in order to smooth the land or reservoir, or to reduce the slope of the land or bank of a reservoir. Additionally, the blade attachment could be used to remove unwanted objects from certain areas. Another example of using the blade attachment can be in a snow removal situation, where the blade attachment is attached to vehicle and vehicle 10 is operated to remove snow from a driveway or other surface.

Additional attachments can also include, as examples, things such as buckets to scope up dirt and other items, trailers in order to haul or move items, and any other additional attachment which can be used in any number of different ways. Each of these attachments can be included on vehicle 10 without departing from the scope of the claims.

Alternative Arrangements:

While vehicle 10 has been disclosed in the arrangement shown, as one example, as related to agitation of manure lagoons, vehicle 10 is no so limited. Vehicle 10 can be used in different applications and in different arrangements without departing from the scope of the claims. One such use is in a firefighting situation. In such an application, vehicle 10 may be used to carry water or other fire suppression materials to fires in difficult terrains, and the vehicle 10 can be operated remotely to reduce risk to firefighters involved. In this situation, liquid delivery system 26 can be used to spray water, foam, or other fire suppressant materials, whether they be dry chemicals, particulate solid material, liquid, or any other type of material, onto the fire to put out the fire. Additionally, the fire suppressant material can be carried within track assemblies 24 of vehicle 10 when drive members 24 are track assemblies 24. Additionally, vehicle 10 can refill liquid and delivery liquid from nearby lakes, rivers, ponds, or other water sources and pump the water to tanker trucks or directly to areas where the water is needed to fight fires.

In another alternative use, vehicle 10 can be used in quarries, mines, ravines, or other low areas to remove flood waters from said areas. In this arrangement, vehicle 10 can be driven into the quarry, mine, ravine, or other territory using drive members 24, and vehicle 10 can use reservoir pump 172 to pump the water out of the area. A hose be connected to outflow hookup 184 to pump the water away from the area, or track assemblies 24 can be used to store the water in interior cavity 97 and transport the water away when vehicle 10 leave the area.

In each of the above example applications, and in any other alternative use for vehicle 10, vehicle 10 can be operated on land and can float on water due to track assemblies 24. However, floating is not necessary for vehicle 10, and vehicle 10 can be designed and configured such that track assemblies 24 can be used as storage space for any types of materials, including liquids, solids, particulate material, foams, plasmas, or any other type of material. Any such use of vehicle 10 is hereby contemplated and vehicle 10 may be operated in this arrangement, as one example, without departing from the scope of the claims.

From the above discussion it will be appreciated that the vehicle 10 presented herein improves upon the state of the art. Specifically, in one or more arrangements, a self-propelled liquid delivery vehicle 10 is presented which: improves upon the state of the art; is safe to operate; is able to comply with road width travel restrictions; is able expand in order to provide stability when in operation; is relatively easy to build; is relatively friendly to build; can be built relatively quickly and efficiently; is easy to operate; is relatively cost friendly to manufacture; is relatively easy to transport; is aesthetically appealing; is robust; is water resistant; is relatively inexpensive; is not easily susceptible to wear and tear; has a long useful life; is efficient to use and operate.

What is claimed:

1. A self-propelled liquid delivery vehicle comprising:
- a frame assembly;
- a pair of track assemblies;
  - the pair of track assemblies operatively connected to the frame assembly;
- a power system;
  - the power system operatively connected to the frame assembly;
  - wherein the power system is configured to provide power to the vehicle;
- a liquid delivery system;
  - the liquid delivery system operatively connected to the frame assembly;
  - wherein the liquid delivery system is configured to pump liquid;
  - wherein the liquid delivery system includes an outflow hookup to facilitate pumping of liquid away from the self-propelled liquid delivery vehicle;
- wherein the pair of track assemblies are configured to facilitate propulsion of the self-propelled liquid delivery vehicle when on land;
- wherein the pair of track assemblies are configured to facilitate floating of the self-propelled liquid delivery vehicle when in a liquid.

2. The self-propelled liquid delivery vehicle of claim 1 further comprising:

at least one extension assembly;

wherein the at least one extension assembly is configured to connect to the frame assembly;

wherein the at least one extension assembly is configured to connect to the pair of track assemblies;

wherein the at least one extension assembly is configured to move the pair of track assemblies between a retracted position and an extended position.

3. The self-propelled liquid delivery vehicle of claim 1 wherein the pair of track assemblies are movable between a retracted position and an extended position; wherein when the pair of track assemblies are in the retracted position the self-propelled liquid delivery vehicle complies with road width travel restrictions.

4. The self-propelled liquid delivery vehicle of claim 1 wherein the pair of track assemblies are movable between a retracted position and an extended position; wherein when the pair of track assemblies are in the extended position the self-propelled liquid delivery vehicle has a wider base that provides greater stability to the self-propelled liquid delivery vehicle when in operation.

5. A self-propelled liquid delivery vehicle comprising:

a frame assembly;

the frame assembly having elongated members;

a pair of track assemblies:

the pair of track assemblies operatively connected to the frame assembly;

wherein each of the pair of track assemblies have a track frame;

wherein the elongated members of the frame assembly are configured to be inserted into the track frame of each of the pair of track assemblies;

wherein the pair of track assemblies are movable between a retracted position and an extended position;

wherein when the pair of track assemblies are moved between the retracted position and the extended position, the elongated members of the frame assembly telescope within the track frame of each of the pair of track assemblies;

a power system;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid;

wherein the pair of track assemblies are configured to facilitate propulsion of the self-propelled liquid delivery vehicle when on land;

wherein the pair of track assemblies are configured to facilitate floating of the self-propelled liquid delivery vehicle when in a liquid.

6. The self-propelled liquid delivery vehicle of claim 1 wherein the liquid delivery system includes at least one nozzle, and wherein the at least one nozzle of the liquid delivery system is configured to facilitate agitation of a manure lagoon.

7. The self-propelled liquid delivery vehicle of claim 1 wherein the liquid delivery system includes a plurality of nozzles, wherein the self-propelled liquid delivery vehicle is configured to float in a liquid, and wherein the plurality of nozzles are configured to provide for propulsion and directional control when the self-propelled liquid delivery vehicle is floating in the liquid.

8. A self-propelled liquid delivery vehicle comprising:

a frame assembly;

a pair of track assemblies:

the pair of track assemblies operatively connected to the frame assembly;

a power systems;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid;

wherein the pair of track assemblies are configured to facilitate propulsion of the self-propelled liquid delivery vehicle when on land;

wherein the pair of track assemblies are configured to facilitate floating of the self-propelled liquid delivery vehicle when in a liquid;

wherein the liquid delivery system includes an outflow hookup and wherein the outflow hookup is configured to connect to a hose to facilitate pumping of liquid away from the self-propelled liquid delivery vehicle.

9. The self-propelled liquid delivery vehicle of claim 1 wherein the self-propelled liquid delivery vehicle is configured to be controlled from a remote location by a wireless control assembly.

10. A self-propelled liquid delivery vehicle comprising:

a frame assembly;

drive members;

the drive members operatively connected to the frame assembly;

wherein the drive members are configured to facilitate propulsion of the self-propelled liquid delivery vehicle when on land;

a power system;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid;

at least one extension assembly;

wherein the at least one extension assembly is configured to connect to the frame assembly;

wherein the at least one extension assembly is configured to connect to the drive members;

wherein the at least one extension assembly is configured to move the drive members laterally between a retracted position and an extended position.

11. The self-propelled liquid delivery vehicle of claim 10 wherein when the drive members are in the retracted position the self-propelled liquid delivery vehicle complies with road width travel restrictions.

12. The self-propelled liquid delivery vehicle of claim 10 wherein when the drive members are in the extended position the self-propelled liquid delivery vehicle has a wider base that provides greater stability to the self-propelled liquid delivery vehicle when in operation.

13. The self-propelled liquid delivery vehicle of claim 10 wherein the drive members are a pair of track assemblies and wherein the pair of track assemblies are configured to facilitate floating of the self-propelled liquid delivery vehicle when in a liquid.

14. A self-propelled liquid delivery vehicle comprising:

a frame assembly;

the frame assembly having elongated members;

drive members;

the drive members operatively connected to the frame assembly;

wherein the drive members are configured to facilitate propulsion of the self-propelled liquid delivery vehicle when on land;

a power system;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid;

at least one extension assembly;

wherein the at least one extension assembly is configured to connect to the frame assembly;

wherein the at least one extension assembly is configured to connect to the drive members;

wherein the at least one extension assembly is configured to move the drive members between a retracted position and an extended position;

wherein the drive members are a pair of track assemblies;

wherein each of the pair of track assemblies have a track frame;

wherein the elongated members of the frame assembly are configured to be inserted into the track frame of each of the pair of track assemblies;

wherein when the pair of track assemblies are moved between the retracted position and the extended position, the elongated members of the frame assembly telescope within the track frame of each of the pair of track assemblies.

15. The self-propelled liquid delivery vehicle of claim 10 wherein the liquid delivery system includes at least one nozzle, and wherein the at least one nozzle of the liquid delivery system is configured to facilitate agitation of a manure lagoon.

16. The self-propelled liquid delivery vehicle of claim 10 wherein the liquid delivery system includes a plurality of nozzles, wherein the self-propelled liquid delivery vehicle is configured to float in a liquid, and wherein the plurality of nozzles are configured to provide for propulsion and directional control when the self-propelled liquid delivery vehicle is floating in the liquid.

17. A self-propelled liquid delivery vehicle comprising:

a frame assembly;

drive members;

the drive members operatively connected to the frame assembly;

wherein the drive members are configured to facilitate propulsion of the self-propelled liquid delivery vehicle when on land;

a power system;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid;

at least one extension assembly;

wherein the at least one extension assembly is configured to connect to the frame assembly;

wherein the at least one extension assembly is configured to connect to the drive members;

wherein the at least one extension assembly is configured to move the drive members laterally between a retracted position and an extended position;

wherein the liquid delivery system includes an outflow hookup and wherein the outflow hookup is configured to connect to a hose to facilitate pumping of liquid away from the self-propelled liquid delivery vehicle.

18. The self-propelled liquid delivery vehicle of claim 10 wherein the self-propelled liquid delivery vehicle is configured to be controlled from a remote location by a wireless control assembly.

19. A self-propelled liquid delivery vehicle comprising:

a frame assembly;

the frame assembly having at least one extension assembly;

a pair of track assemblies;

the pair of track assemblies operatively connected to the frame assembly;

wherein the pair of track assemblies are configured to facilitate propulsion of the self-propelled liquid delivery vehicle when on land;

a power system;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid;

wherein the liquid delivery system includes an outflow hookup to facilitate pumping of liquid away from the self-propelled liquid delivery vehicle;

wherein the at least one extension assembly is configured to connect to the frame assembly;

wherein the at least one extension assembly is configured to connect to the pair of track assemblies;

wherein the at least one extension assembly is configured to move the pair of track assemblies between a retracted position and an extended position;

wherein the pair of track assemblies are configured to facilitate floating of the self-propelled liquid delivery vehicle when in a liquid.

20. The self-propelled liquid delivery vehicle of claim 19 wherein when the pair of track assemblies are in the retracted position the self-propelled liquid delivery vehicle complies with road width travel restrictions.

21. The self-propelled liquid delivery vehicle of claim 19 wherein when the pair of track assemblies are in the extended position the self-propelled liquid delivery vehicle has a wider base that provides greater stability to the self-propelled liquid delivery vehicle when in operation.

22. A self-propelled liquid delivery vehicle comprising:

a frame assembly;

the frame assembly having elongated members;

the frame assembly having at least one extension assembly;

a pair of track assemblies;

the pair of track assemblies operatively connected to the frame assembly;

wherein each of the pair of track assemblies have a track frame;

wherein the elongated members of the frame assembly are configured to be inserted into the track frame of each of the pair of track assemblies;

a power system;

the power system operatively connected to the frame assembly;

wherein the power system is configured to provide power to the vehicle;

a liquid delivery system, the liquid delivery system operatively connected to the frame assembly;

wherein the liquid delivery system is configured to pump liquid;

wherein the at least one extension assembly is configured to connect to the frame assembly, wherein the at least one extension assembly is configured to connect to the pair of track assemblies;

wherein the at least one extension assembly is configured to move the pair of track assemblies between a retracted position and an extended position;

wherein when the pair of track assemblies are moved between the retracted position and the extended position, the elongated members of the frame assembly telescope within the track frame of each of the pair of track assemblies;

wherein the pair of track assemblies are configured to facilitate floating of the self-propelled liquid delivery vehicle when in a liquid.

23. The self-propelled liquid delivery vehicle of claim 19 wherein the liquid delivery system includes at least one nozzle, and wherein the at least one nozzle of the liquid delivery system is configured to facilitate agitation of a manure lagoon.

24. The self-propelled liquid delivery vehicle of claim 19 wherein the liquid delivery system includes a plurality of nozzles, wherein the self-propelled liquid delivery vehicle is configured to float in a liquid, and wherein the plurality of nozzles are configured to provide for propulsion and directional control when the self-propelled liquid delivery vehicle is floating in the liquid.

25. A self-propelled liquid delivery vehicle comprising:

a frame assembly;

the frame assembly having at least of one extension assembly;

a pair of track assemblies;

the pair of track assemblies operatively connected to the frame assembly;

wherein the pair of track assemblies are configured to facilitate propulsion of the self-propelled liquid delivery vehicle when on land;

a power system;

the power system operatively connected to the frame assembly;

wherein the power system is configured to provide power to the vehicle;

a liquid delivery system;

the liquid delivery system operatively connected to the frame assembly;

wherein the liquid delivery system is configured to pump liquid:

wherein the at least one extension assembly is configured to connect to the frame assembly;

wherein the at least one extension assembly is configured to connect to the pair of track assemblies;

wherein the at least one extension assembly is configured to move the pair of track assemblies between a retracted position and an extended position;

wherein the pair of track assemblies are configured to facilitate floating of the self-propelled liquid delivery vehicle when in a liquid;

wherein the liquid delivery system includes an outflow hookup and wherein the outflow hookup is configured to connect to a hose to facilitate pumping of liquid away from the self-propelled liquid delivery vehicle.

26. The self-propelled liquid delivery vehicle of claim 19 wherein the self-propelled liquid delivery vehicle is configured to be controlled from a remote location by a wireless control assembly.

* * * * *